Jan. 25, 1966 R. L. McINTYRE ETAL 3,231,864

DIGITAL COMPUTER

Filed May 11, 1961 40 Sheets-Sheet 1

INVENTORS
ROBERT L. McINTYRE
CHARLES F. SAUNDERS
DALE V. SCHMIDT

BY [signature]

ATTORNEY

FIG. 2

COMPUTER WORD

LSD (P0) — MSD (P20) — SIGN DIGIT (P21)

| P0 | P1 | P2 | P3 | P4 | P5 | P6 | P7 | P8 | P9 | P10 | P11 | P12 | P13 | P14 | P15 | P16 | P17 | P18 | P19 | P20 | P21 |
|---|---|---|---|---|---|---|---|---|---|---|---|---|---|---|---|---|---|---|---|---|---|

FIG. 3

INSTRUCTION WORD (UPPER-W1)

<table>
<tr><td>P0</td><td>P1</td><td>P2</td><td>P3</td><td>P4</td><td>P5</td><td>P6</td><td>P7</td><td>P8</td><td>P9</td><td>P10</td><td>P11</td><td>P12</td><td>P13</td><td>P14</td><td>P15</td><td>P16</td><td>P17</td><td>P18</td><td>P19</td><td>P20</td><td>P21</td></tr>
<tr><td colspan="9">β OPERAND ADDRESS</td><td colspan="9">α OPERAND ADDRESS</td><td colspan="4" rowspan="2">ORDER CODE</td></tr>
<tr><td colspan="6">SECTOR ADDRESS</td><td colspan="3">TRACK ADDRESS</td><td colspan="6">SECTOR ADDRESS</td><td colspan="3">TRACK ADDRESS</td></tr>
</table>

FIG. 4

INSTRUCTION WORD (LOWER-W2)

<table>
<tr><td>P0</td><td>P1</td><td>P2</td><td>P3</td><td>P4</td><td>P5</td><td>P6</td><td>P7</td><td>P8</td><td>P9</td><td>P10</td><td>P11</td><td>P12</td><td>P13</td><td>P14</td><td>P15</td><td>P16</td><td>P17</td><td>P18</td><td>P19</td><td>P20</td><td>P21</td></tr>
<tr><td colspan="9">σ OPERAND ADDRESS</td><td colspan="9">δ INSTRUCTION ADDRESS</td><td colspan="4" rowspan="2">ORDER CODE</td></tr>
<tr><td colspan="6">SECTOR ADDRESS</td><td colspan="3">TRACK ADDRESS</td><td colspan="6">SECTOR ADDRESS</td><td colspan="3">TRACK ADDRESS</td></tr>
</table>

FIG. 5

LOGIC SYMBOLS (A) FLIP-FLOPS

B1, B2 MULTIPLIER DIGIT STORAGE
C1, C2 CARRY CONTROL FOR TWO FLIP-FLOP INPUT ADDER
D1-D6 DELAY AND MISCELLANEOUS CONTROLS
J1-J5 BIT TIMING COUNTER FLIP-FLOPS

K1 SCAN FOR α OPERAND, δ INSTRUCTION
K2 SCAN FOR β OPERAND, σ OPERAND

L1, L2, L3 } TRACK SELECTION FOR READ AMPLIFIER X1 (FIG. 1)

L4, L5, L6 } TRACK SELECTION FOR READ AMPLIFIER X2 (FIG. 1)

N1, N2, N3 } TRACK SELECTION FOR READ AMPLIFIERS (X3-X4) (FIG. 1)

Q1, Q2, Q3, Q4 } ORDER CODE FLIP-FLOPS

Q5, Q6 } LOGIC CODE FLIP-FLOPS

K3, K4, K5, K6 } CONTROL FLIP-FLOPS FOR COMPUTER STATES

FIG. 6

LOGIC SYMBOLS (B)
EMITTER FOLLOWERS

| | |
|---|---|
| #A1 | ADDER-SUBTRACTOR |
| #A2 | ADDER |
| #F1 | FIRST WORD PRODUCT |
| #F2 | FIRST WORD DIVISION OR SQUARE ROOT |
| #F3 | LOGIC SIGNAL |
| #F4 | STORE OR SHIFT |
| #I1 | INSTRUCTION MEMORY |
| #I2 | INPUT SIGNAL FOR STORE OPERATION |
| #Q1 | SPECIES WHENQ FLIP-FLOP ARE SET |
| #R1 | SOURCE OF MULTIPLIER AND DIVISOR |
| #Ta | COMPUTER IN "HOLD" |
| #Tb | SIGNAL FOR INSTRUCTION SYNC. |

FIG. 7

LOGIC SYMBOLS (C)

*S1 COMPUTE
*$\overline{S1}$ HOLD } CONTROL SWITCH

*S2 PREPARE TO STEP
*$\overline{S2}$ COMPLETE THE STEP } "ONE SHOT" SWITCH

*S3 SIGNAL FOR CLEARING INSTUCTION REGISTER DURING STARTUP
*S4 SIGNAL FOR CONTROLING REAL TIME AND VELOCITY INPUT

I1 CONNECTED TO V1
I2, I3, I4 } WIRED TO CONECTOR FOR MISCELLANEOUS INPUT FROM OUTSIDE COMPUTER
} INPUT TO COMPUTER IN STORE OR TRANSFER

M0-M12
*M0-*M12 } ANALOG/DIGITAL CONVERTER BRUSHES

#M1, #M2, #M3 COMMONS FOR AZIMUTH, HEIGHT, AND PITCH CONVERTERS z1 CONNECTED TO #Z1
z2 " " #Z2 } OUTPUT FROM COMPUTER IN STORE OR TRANSFER

Z3-Z10 WIRED TO CONNECTOR FOR MISCELLANEOUS OUTPUT

*Fc MEMORY FILL CONTROL

#yb INPUT TO $w_1$

#yc INPUT TO $w_2$

#yd INPUT TO $d_4$

#ye INPUTTO $d_3$ yf CONTROL FOR ACCUMULATOR FILL

FIG. 9

ORDER CODE

| UPPER ORDER | | LOWER ORDER | L1 | L2 | Q1 | Q2 | Q3 | Q4 |
|---|---|---|---|---|---|---|---|---|
| | | | | | ORDER FLIP-FLOPS | | | |
| CONTROL-(SETS FLIP-FLOPS AND EXTERNAL EQUIPTMENT) | Ct | CONTROL- (SETS FLIP-FLOPS AND EXTERNAL EQUIPTMENT) | | | 1 | 0 | 1 | 0 |
| DIVISION $(A+\beta\div\alpha)$ ($\beta$ NEED NOT EXIST) (A-NUMBER STORED IN BOTH THE M.S.D.& L.S.D.ACCUMULATORS) | Dv | DIVISION $(A\div\tau)$ | | | 1 | 0 | 0 | 0 |
| SPECIAL-SUBTRACT $(A-\alpha+\beta)$ ($\beta$ NEED NOT EXIST) | Sus | SPECIAL SUBTRACT $(\tau-A)$ | | | 0 | 0 | 0 | 0 |
| SQUARE ROOT $(\sqrt{\beta^2+A})$ | Sq | SQUARE ROOT $(\sqrt{\tau^2+A})$ | | | 1 | 1 | 0 | 0 |
| CLEAR & ADD $(\alpha+\beta)$ | Ac | CLEAR & ADD $(\tau)$ | | | 0 | 1 | 1 | 1 |
| ADD $(\alpha+\beta+A)$ | Ad | ADD $(\tau+A)$ | | | 0 | 0 | 1 | 1 |
| SUBTRACT- $(A_m-\alpha+\beta)$ ($A_m$ NUMBER STORED IN M.S.D. ACCUMULATOR) | Su | SUBTACT $(\tau+A_m)$ | | | 1 | 0 | 1 | 1 |
| EXTRACT $A_m\cdot\alpha$ or $(A_m+\beta)\cdot\alpha$ or $A_m\cdot(\alpha+\beta)$ ($\beta$ NEED NOT EXIST) | Ex | EXTRACT $(A_m\cdot\tau)$ | | | 1 | 1 | 1 | 1 |
| MULTIPLICATION $(\alpha\cdot\beta+A)$ $\alpha$ MULTIPLIER $\beta$ MULTIPLICAND | Ma | MULTIPLICATION $(\tau\cdot N+A)$ (N-NUMBER STORED IN MULTIPLIER REGISTER WHEN NOT IN USE) | X | X | 0 | 0 | 0 | 1 |
| MULTIPLICATION $(A_m+\beta)(N)$ $\beta$ SECT < $\alpha$ SECT; $(A_m)(N)+\beta$ ·· $\beta$ SECT = $\alpha$ SECT; $(A_m)(N)$ -- $\beta$ SECT > $\alpha$ SECT | Mb | MULTIPLICATION $A_m\cdot N+\tau$* * WILL WAIT AND USE IF WITHIN 32 WORD TIMES | 1 | 0 | 1 | 0 | 0 | 1 |
| MULTIPLICATION $(A_m+\beta)(A_m)$ - $\beta$ SECT < $\alpha$ SECT; $(A_m)(N)+\beta$ -- $\beta$ SECT = $\alpha$ SECT; $(A_m)(N)$ -- $\beta$ SECT > $\alpha$ SECT | Mb | MULTIPLICATION $A_m\cdot N+\tau$* * WILL WAIT AND USE IF WITHIN 32 WORD TIMES | 1 | 1 | 1 | 0 | 0 | 1 |
| MULTIPLICATION $(A_m+\beta)^2$ -- $\beta$ SECT < $\alpha$ SECT; $A_m^2+\beta$ ---- $\beta$ SECT = $\alpha$ SECT; $A_m{}^2$ ---- $\beta$ SECT > $\alpha$ SECT | Mb | MULTIPLICATION $A_m\cdot N+\tau$* * WILL WAIT AND USE IF WITHIN 32 WORD TIMES | 0 | 1 | 1 | 0 | 0 | 1 |
| MULTIPLICATION $\alpha\ A_m+\beta$ | Mc | MULTIPLICATION $\tau\ A_m$ | X | X | 0 | 1 | 0 | 1 |
| MULTIPLICATION $\alpha^2+\beta^2+A$ | Md | MULTIPLICATION $A_m^2+\tau$ | X | X | 1 | 1 | 0 | 1 |
| BRANCH | Br | BRANCH | X | X | 0 | 1 | 1 | 0 |
| STORE | St | STORE | X | X | 1 | 1 | 1 | 0 |
| SHIFT | Sh | | X | X | 0 | 1 | 1 | 0 |
| TRANSFER | Tr | | X | X | 0 | 0 | 1 | 0 |

FIG. 10A CONTROL STATES

| $K_3$ | $K_4$ | $K_5$ | $K_6$ | REPRESENTATION |
|---|---|---|---|---|
| 0 | 0 | 0 | 0 | 00 |
| 1 | 0 | 0 | 0 | 10 |
| 0 | 1 | 0 | 0 | 20 |
| 1 | 1 | 0 | 0 | 30 |
| 0 | 0 | 1 | 0 | 40 |
| 1 | 0 | 1 | 0 | 50 |
| 0 | 1 | 1 | 0 | 60 |
| 1 | 1 | 1 | 0 | 70 |
| 0 | 0 | 0 | 1 | 01 |
| 1 | 0 | 0 | 1 | 11 |
| 0 | 1 | 0 | 1 | 21 |
| 1 | 1 | 0 | 1 | 31 |
| 0 | 0 | 1 | 1 | 41 |
| 1 | 0 | 1 | 1 | 51 |
| 0 | 1 | 1 | 1 | 61 |
| 1 | 1 | 1 | 1 | 71 |

Jan. 25, 1966 R. L. McINTYRE ETAL 3,231,864

DIGITAL COMPUTER

Filed May 11, 1961 40 Sheets-Sheet 12

Jan. 25, 1966 R. L. McINTYRE ETAL 3,231,864

DIGITAL COMPUTER

Filed May 11, 1961 40 Sheets-Sheet 16

Jan. 25, 1966 R. L. McINTYRE ETAL 3,231,864

DIGITAL COMPUTER

Filed May 11, 1961 40 Sheets-Sheet 18

Jan. 25, 1966 R. L. McINTYRE ETAL 3,231,864

DIGITAL COMPUTER

Filed May 11, 1961 40 Sheets-Sheet 20

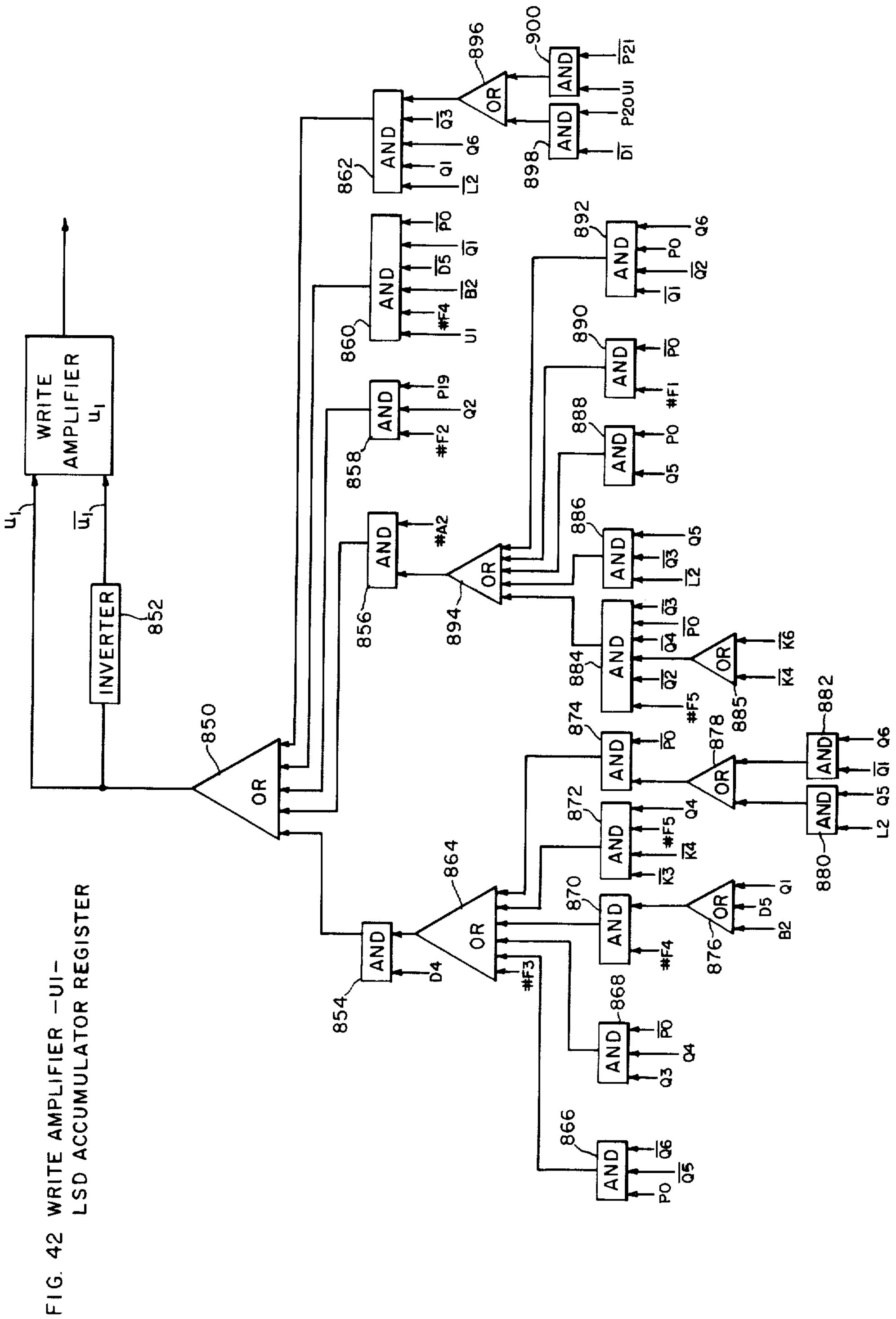
FIG. 42 WRITE AMPLIFIER –UI– LSD ACCUMULATOR REGISTER

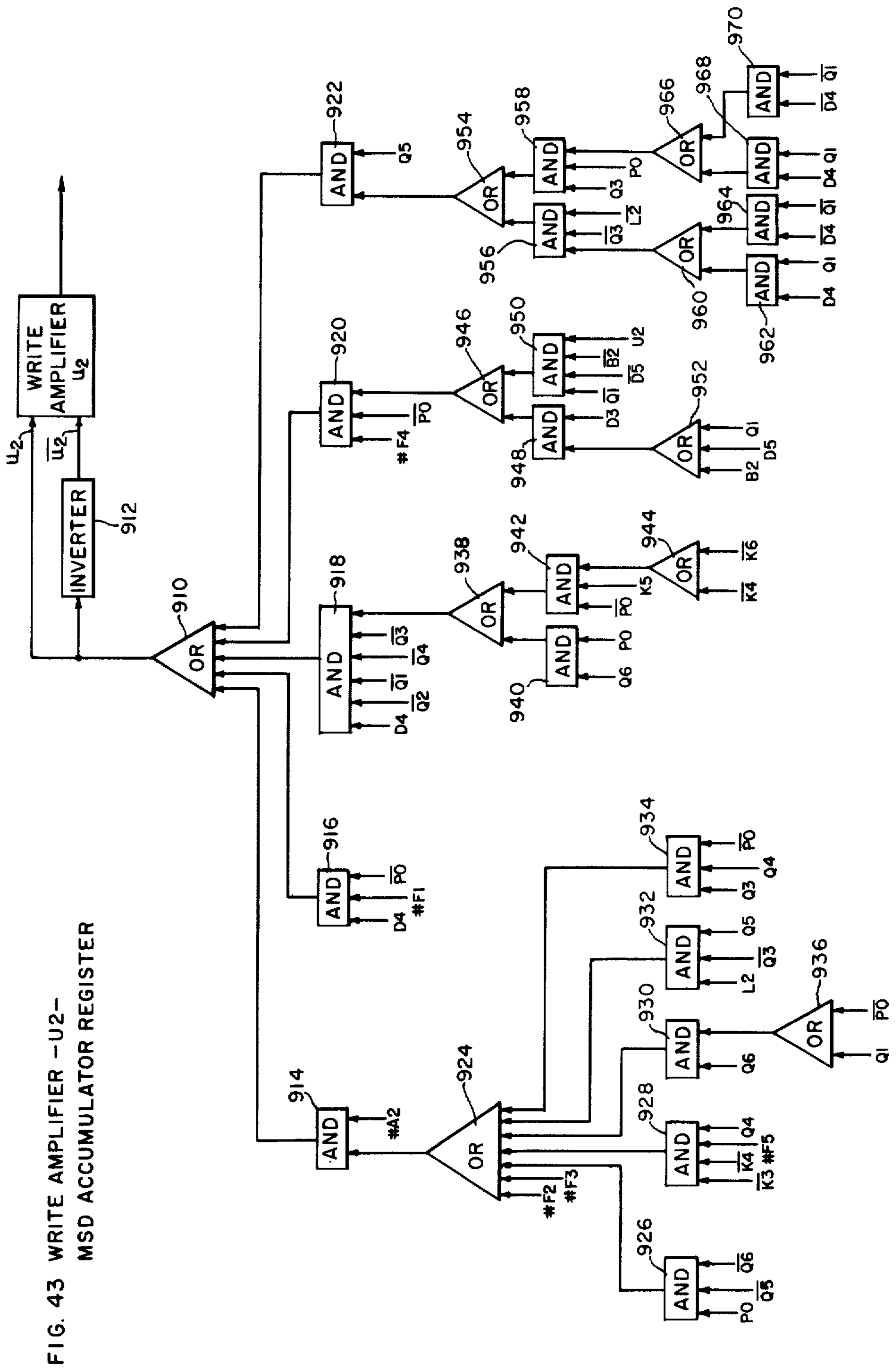
FIG. 43 WRITE AMPLIFIER –U2– MSD ACCUMULATOR REGISTER

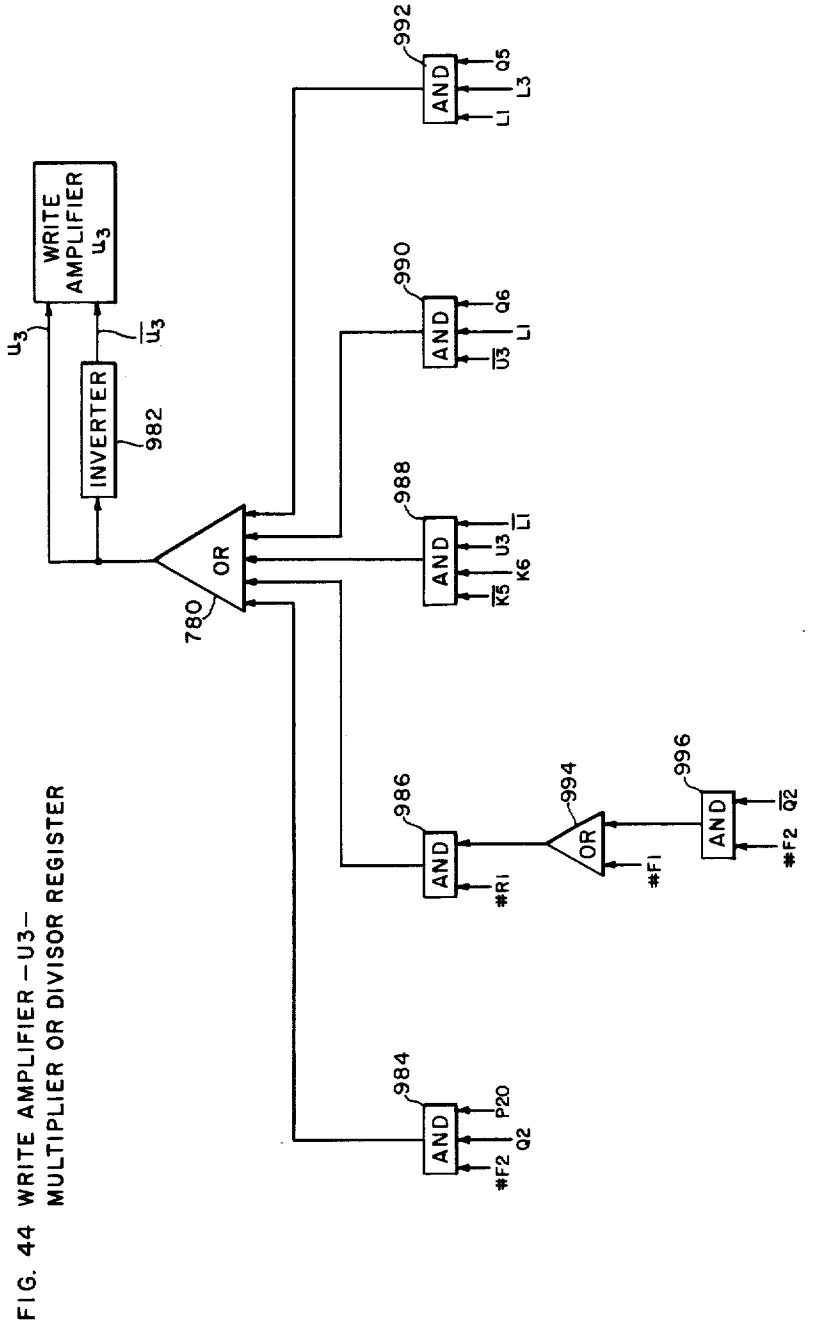
FIG. 44 WRITE AMPLIFIER — U3— MULTIPLIER OR DIVISOR REGISTER

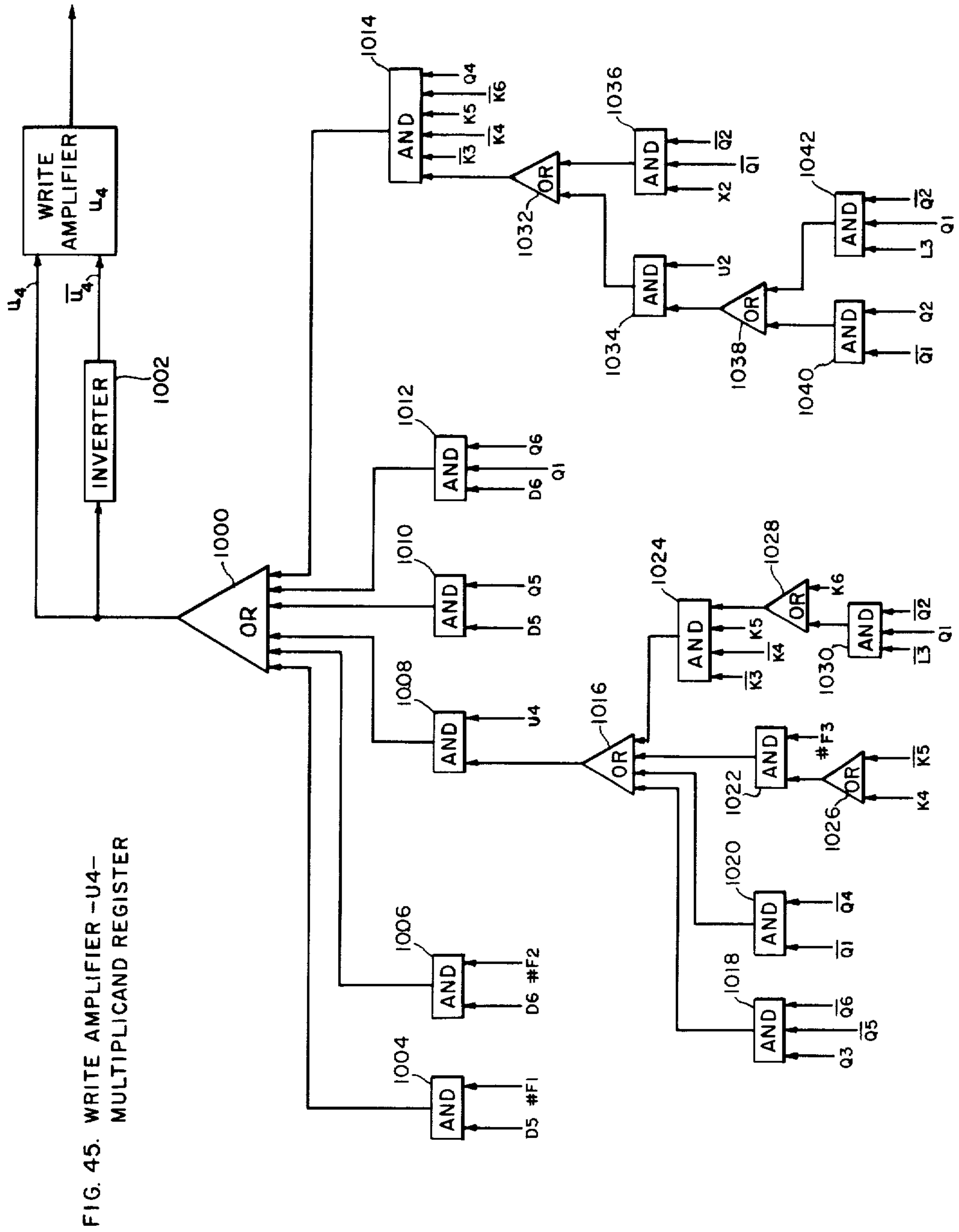
FIG. 45. WRITE AMPLIFIER -U4- MULTIPLICAND REGISTER

DIGITAL COMPUTER
Filed May 11, 1961 40 Sheets-Sheet 30
FIG. 46 WRITE AMPLIFIER -WI- UPPER INSTRUCTION REGISTER
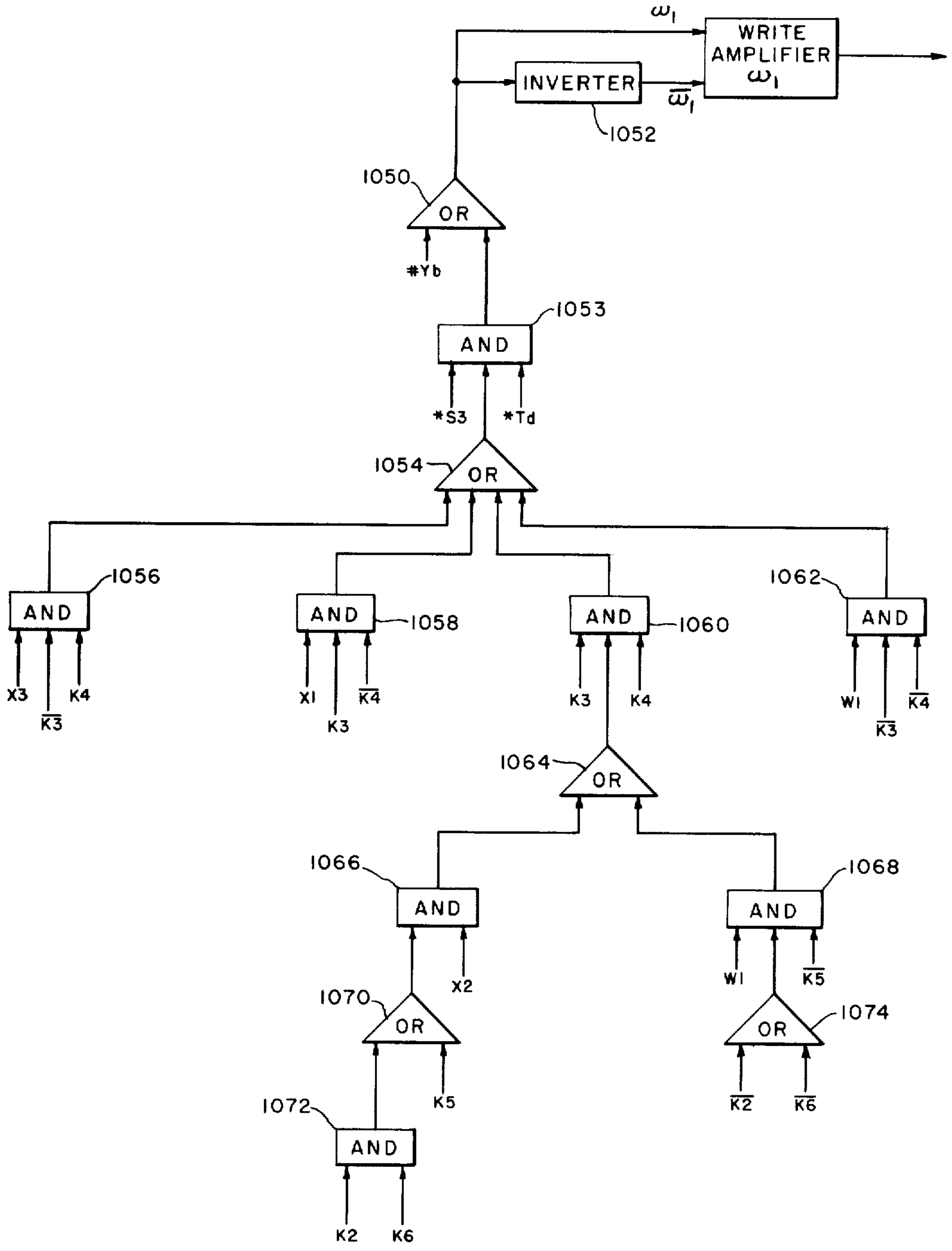

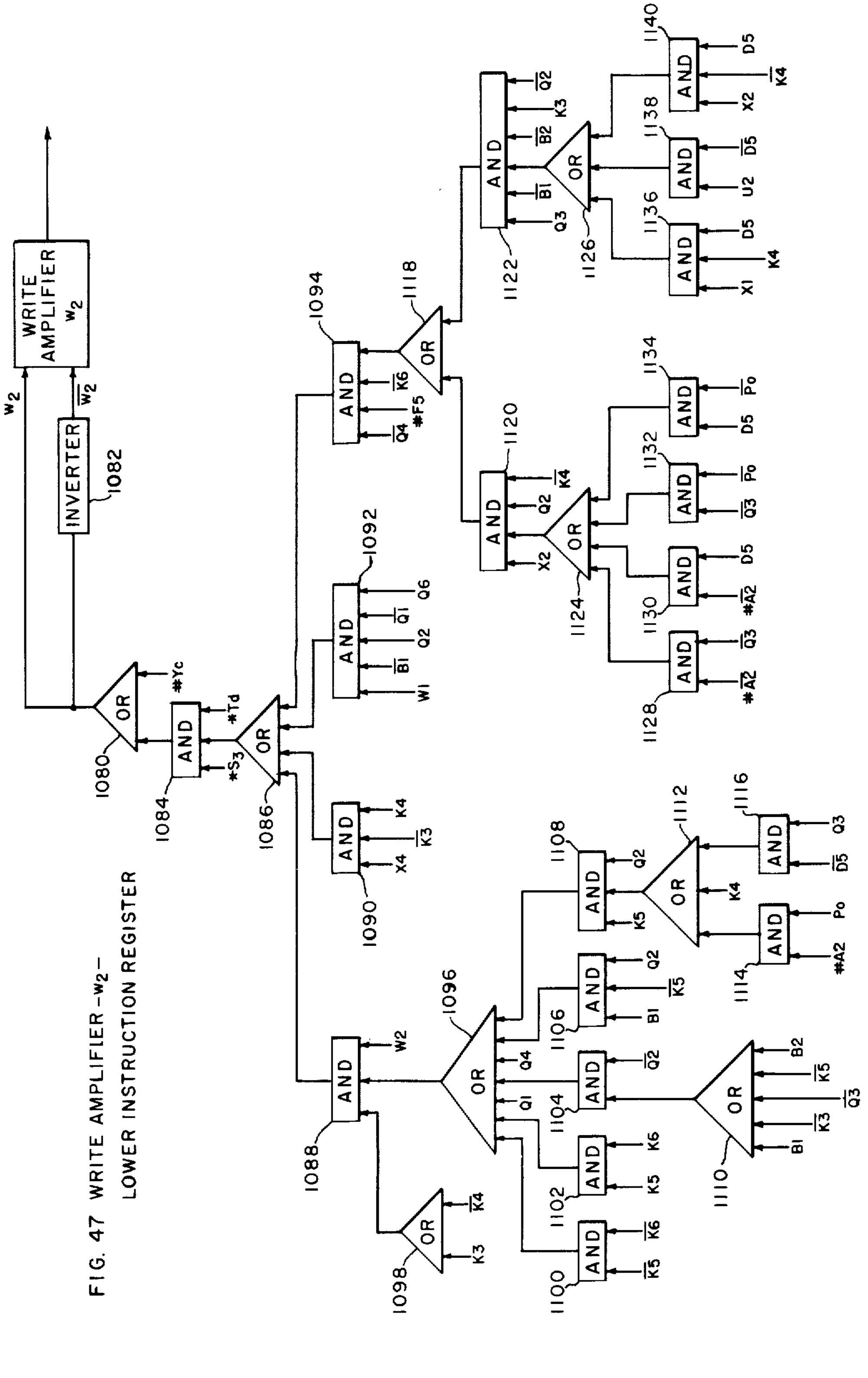
FIG. 47 WRITE AMPLIFIER -$w_2$- LOWER INSTRUCTION REGISTER

FIG. 48 WRITE AMPLIFIER—$x_1$—
SCRATCH PAD MEMORY
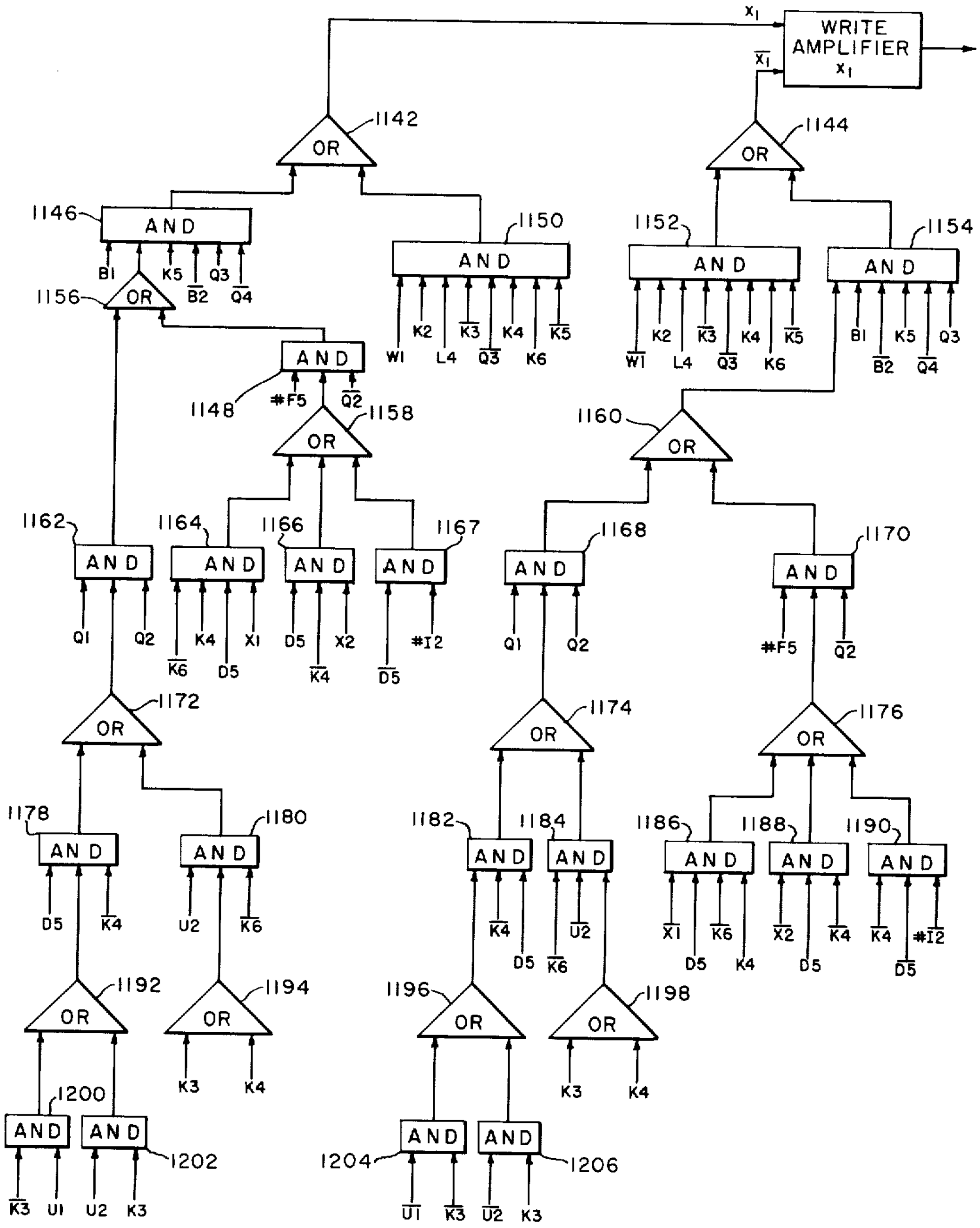

FIG. 49 WRITE AMPLIFIER -$x_2$- SCRATCH PAD MEMORY
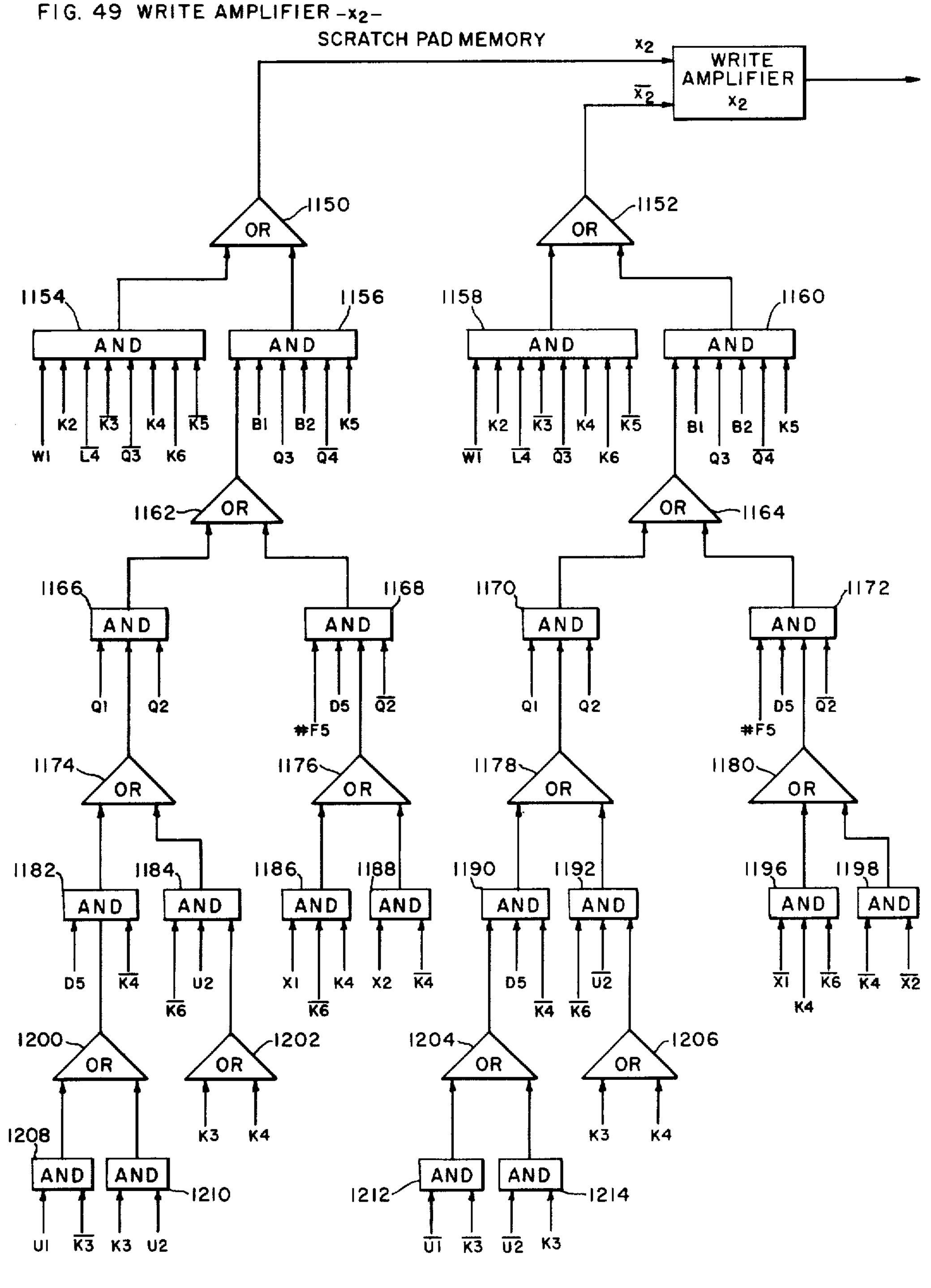

FIG. 50 EMITTER FOLLOWER-#A1-
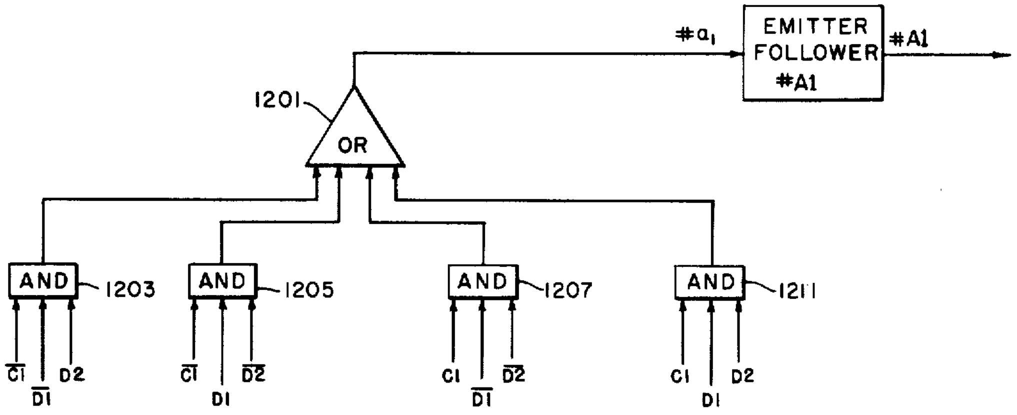
FIG. 51 EMITTER FOLLOWER-#A2-
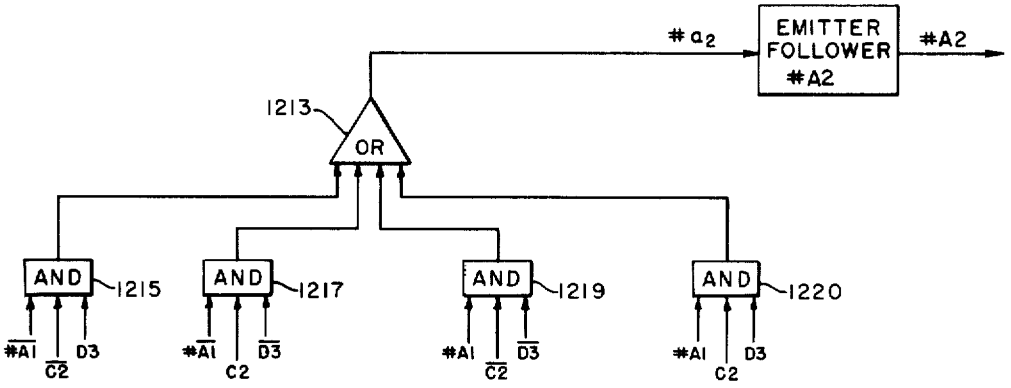

Jan. 25, 1966 R. L. McINTYRE ETAL 3,231,864

DIGITAL COMPUTER

Filed May 11, 1961 40 Sheets-Sheet 40

United States Patent Office 3,231,864

Patented Jan. 25, 1966

3,231,864

DIGITAL COMPUTER

Robert L. McIntyre, Elmsford, N.Y., and Charles F. Saunders, Sunland, and Dale V. Schmidt, Pacoima, Calif., assignors to General Precision Inc., a corporation of Delaware Filed May 11, 1961, Ser. No. 109,331
6 Claims. (Cl. 340—172.5)

The present invention relates to an electronic digital computer and it relates more particularly to an electronic digital computer of the general purpose type.

The general purpose computer of this invention is ideally suited for use in vehicle guidance systems. However, the computer is constructed to have general purpose utility and to be usable in a wide range of applications.

An important object of the present invention is to provide a digital computer which is extremely rapid in its operation, and which is capable of performing a maximum number of calculations with a minimum number of separate instructions.

The general purpose computer, to be described, is primarily advantageous in that it is constructed to utilize a particular code structure which reduces the time required to perform many computer operations. This particular code structure permits single instructions to select three operands, for example, and also to identify the address of the next instruction. This technique permits the search for the next instruction to be carried out while the operations required by the present instruction are being performed. In this manner the next instruction may be selected and introduced to the instruction register as the final operation of the present instruction is being carried out. This enables the dead time between the execution of the successive instructions to be reduced essentially to zero.

In the embodiment of the invention to be described the improved assembly for utilizing the code structure described in the preceding paragraph also serves to increase the calculation capabilities of each instruction by orders of magnitude of two to three, as compared with most prior art general purpose computers of this general type. For example, this increased calculating capability of the computer of the present invention enables the computer to perform a complete vector magnitude resolution from a single instruction.

The embodiment of the present invention to be described is also advantageous in that it incorporates a new and improved arithmetic unit. The arithmetic unit to be described is rapid and accurate and it is predicated on algorithms and operating principles which enable it to establish maximum volumetric efficiency and minimum weight characteristics.

The general purpose computer to be described is capable, for example, of performing additions or subtractions of two or three numbers at any one time with zero access time. It is also capable of dividing a double word length number by a single word length number to provide full single word length accuracy in the answer. It is further capable of taking the square root of a double word length number to full single length accuracy.

The computer to be described also incorporates a new and improved structure for utilizing an unusual order code which permits the transfer of arithmetic information within the arithmetic unit and of providing temporary storage for the information within the arithmetic unit, so that recourse need not always be taken to the main memory for any additional information which may be required for any particular arithmetic operation.

The above and other advantages of the invention will be more fully appreciated from a consideration of the following specification when taken in conjunction with the accompanying drawings in which:

FIGURE 2 is a schematic diagram of a multi-bit computer word of the type utilized in the computer to be described;

FIGURES 3 and 4 are schematic representations of upper and lower instruction words utilized in the computer;

FIGURE 5 is a list of the logic symbols to be used to designate different flip-flops utilized in the computer to be described;

FIGURE 6 is a list of logic symbols to be used to identify different emitter followers included in the computer;

FIGURE 7 is a list of the logic symbols used to identify various controls used in the computer;

FIGURE 9 is a table representing a typical order code for use by the computer to be described;

Figure 1:
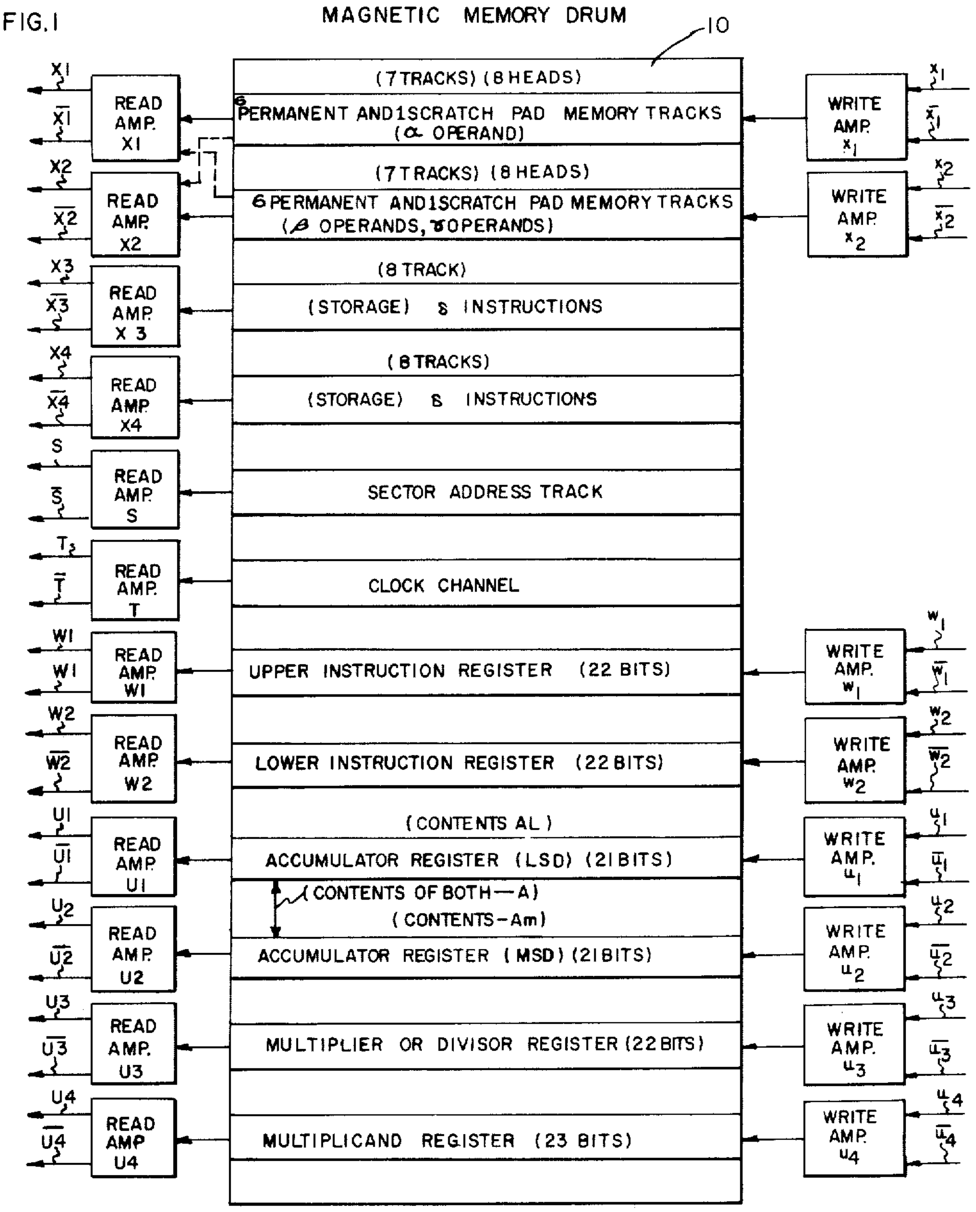
FIGURE 1 is a schematic block diagram of the magnetic memory drum assembly utilized by the embodiment of the invention to be described, and of various circuit components which are associated with the magnetic memory drum.
Figure 10:
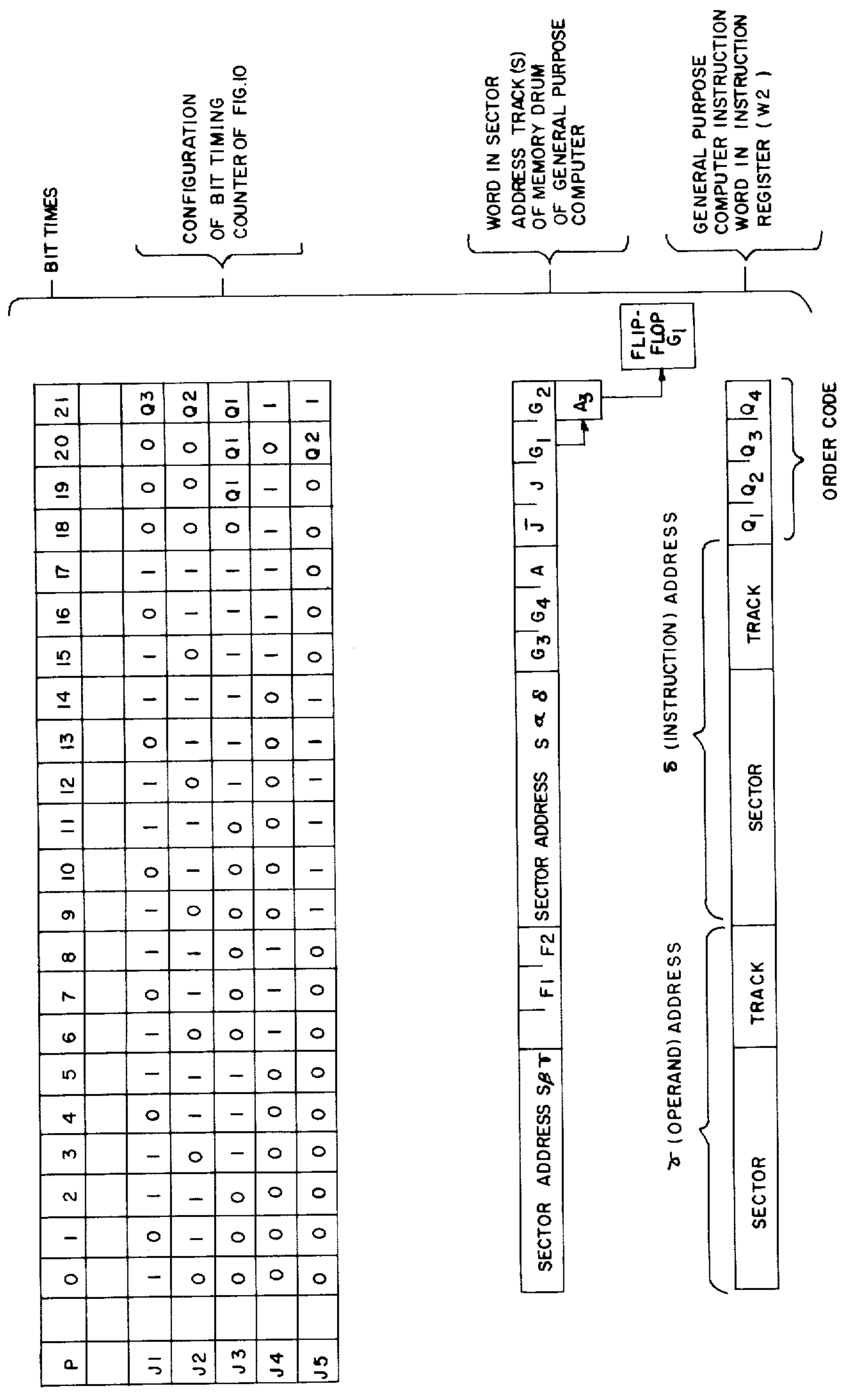
Figure 11:
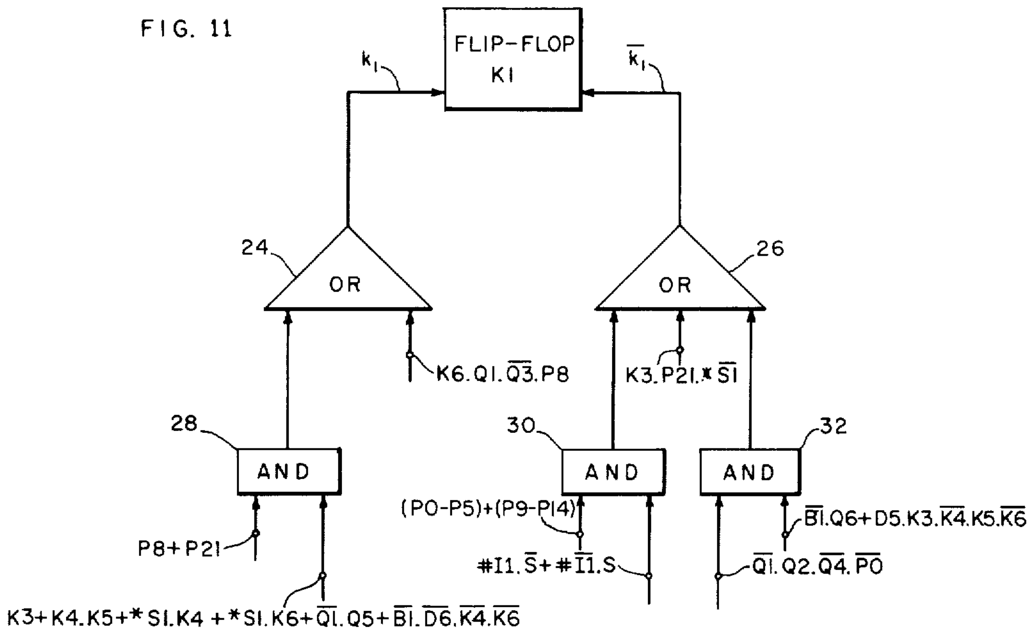
Figure 12:
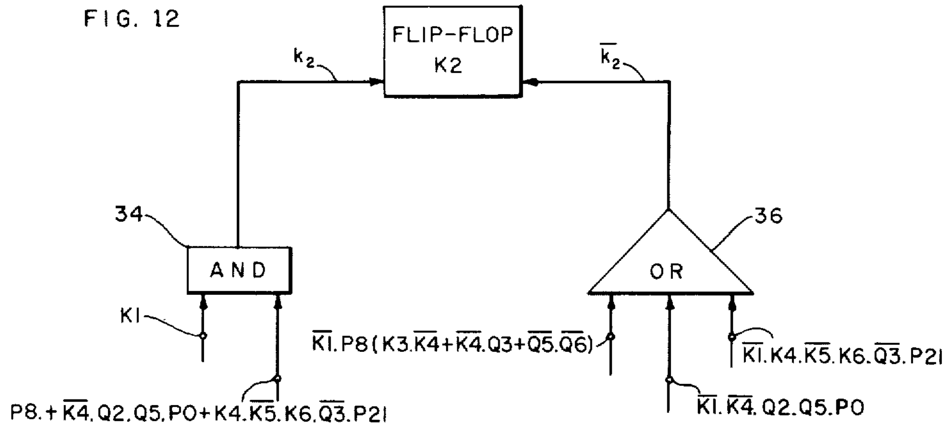
Figure 17:
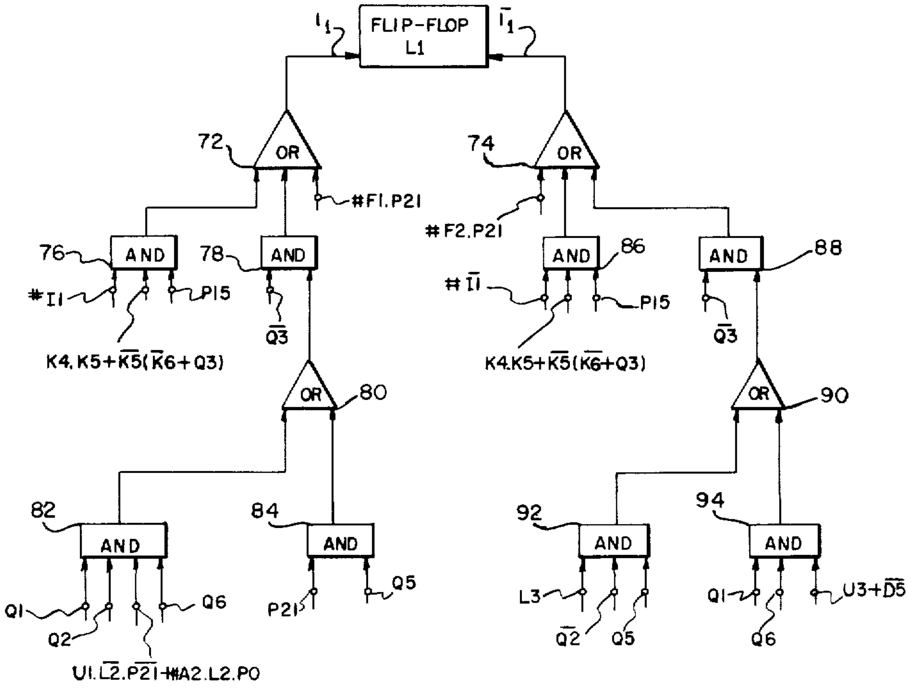
Figure 18:
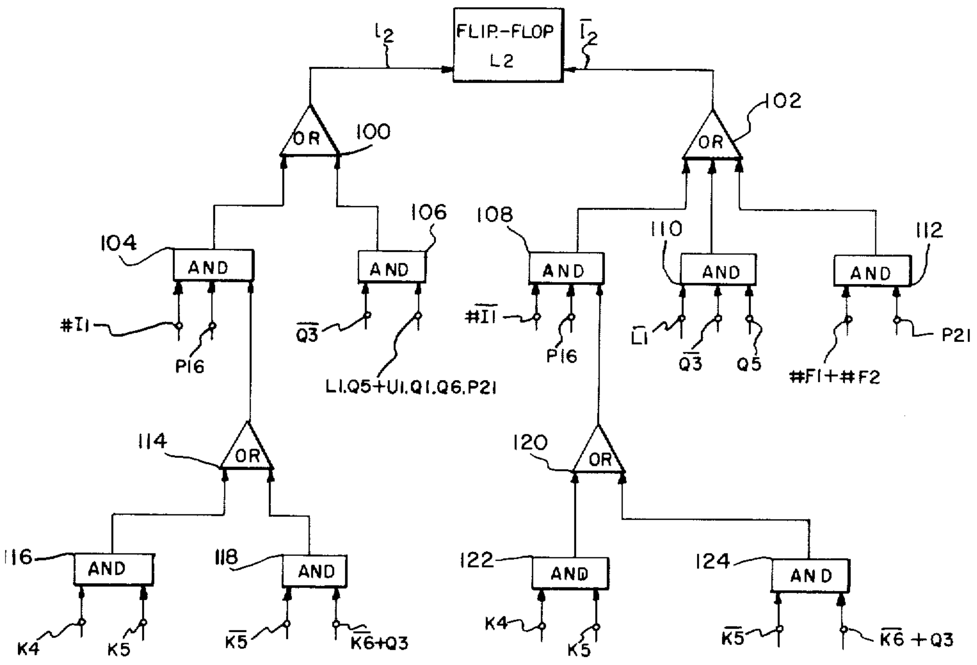
Figure 19:
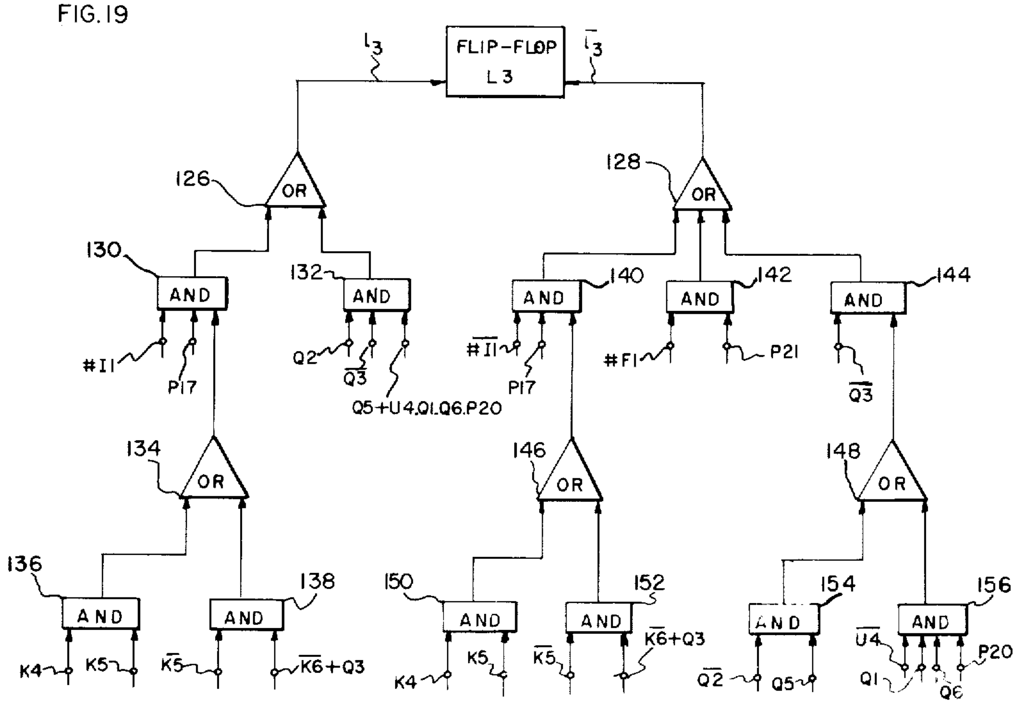
Figure 20:
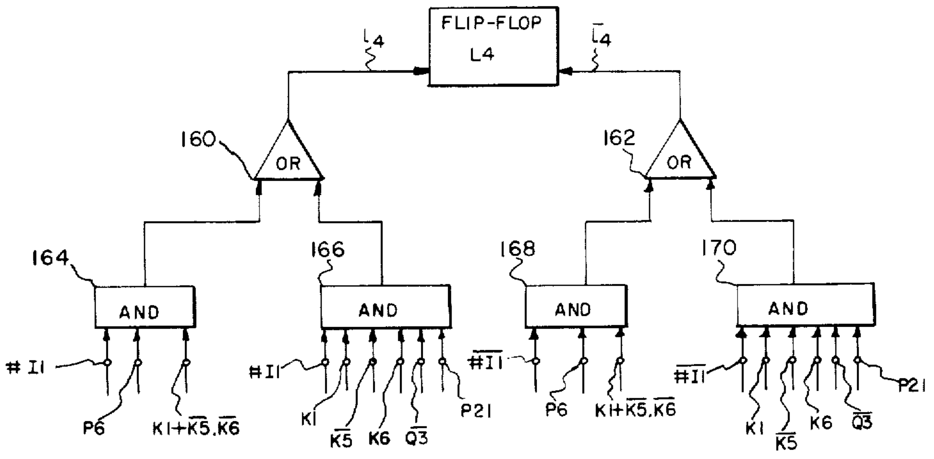
Figure 21:
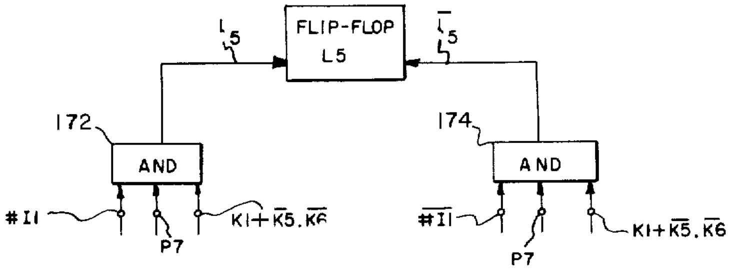
Figure 22:
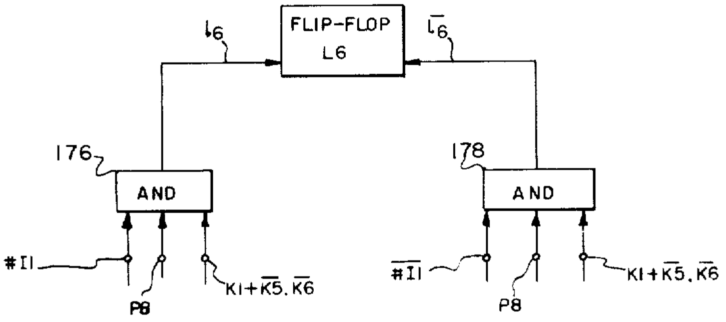
Figure 23:
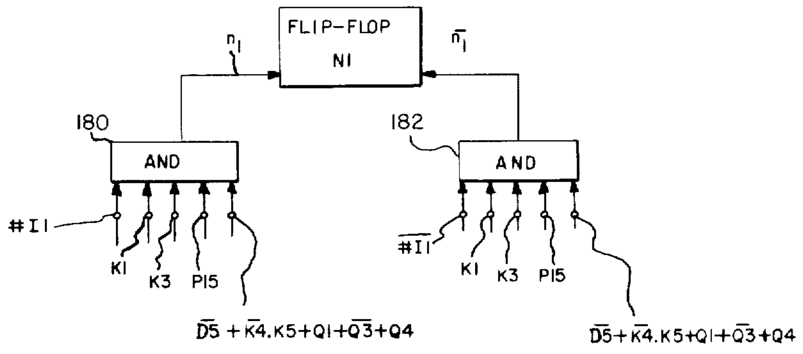
Figure 24:
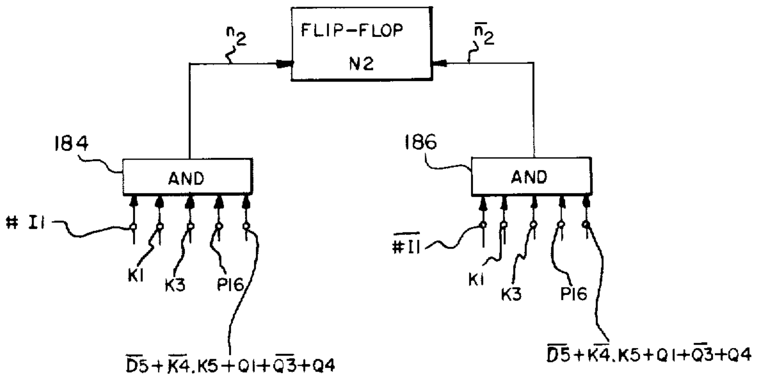
Figure 25:
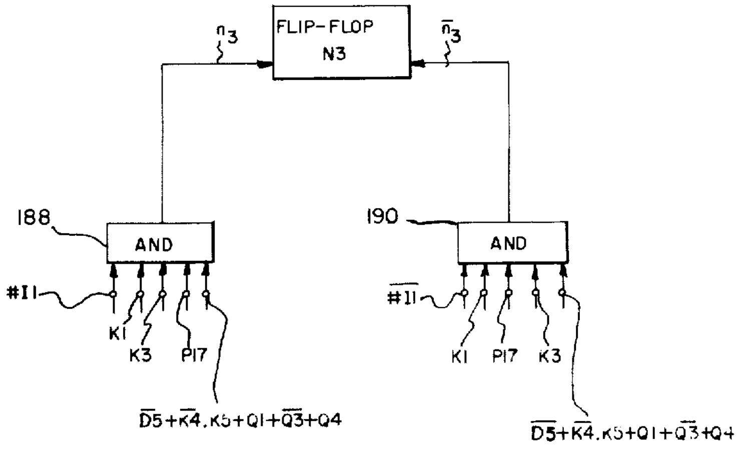
Figure 30:
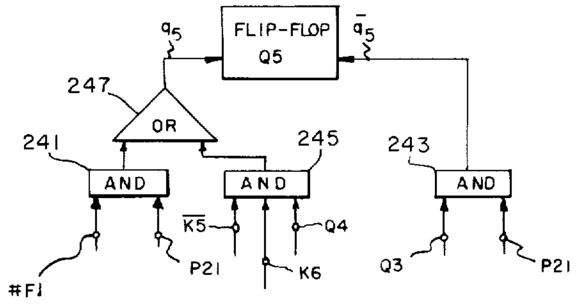
Figures 31, 32:
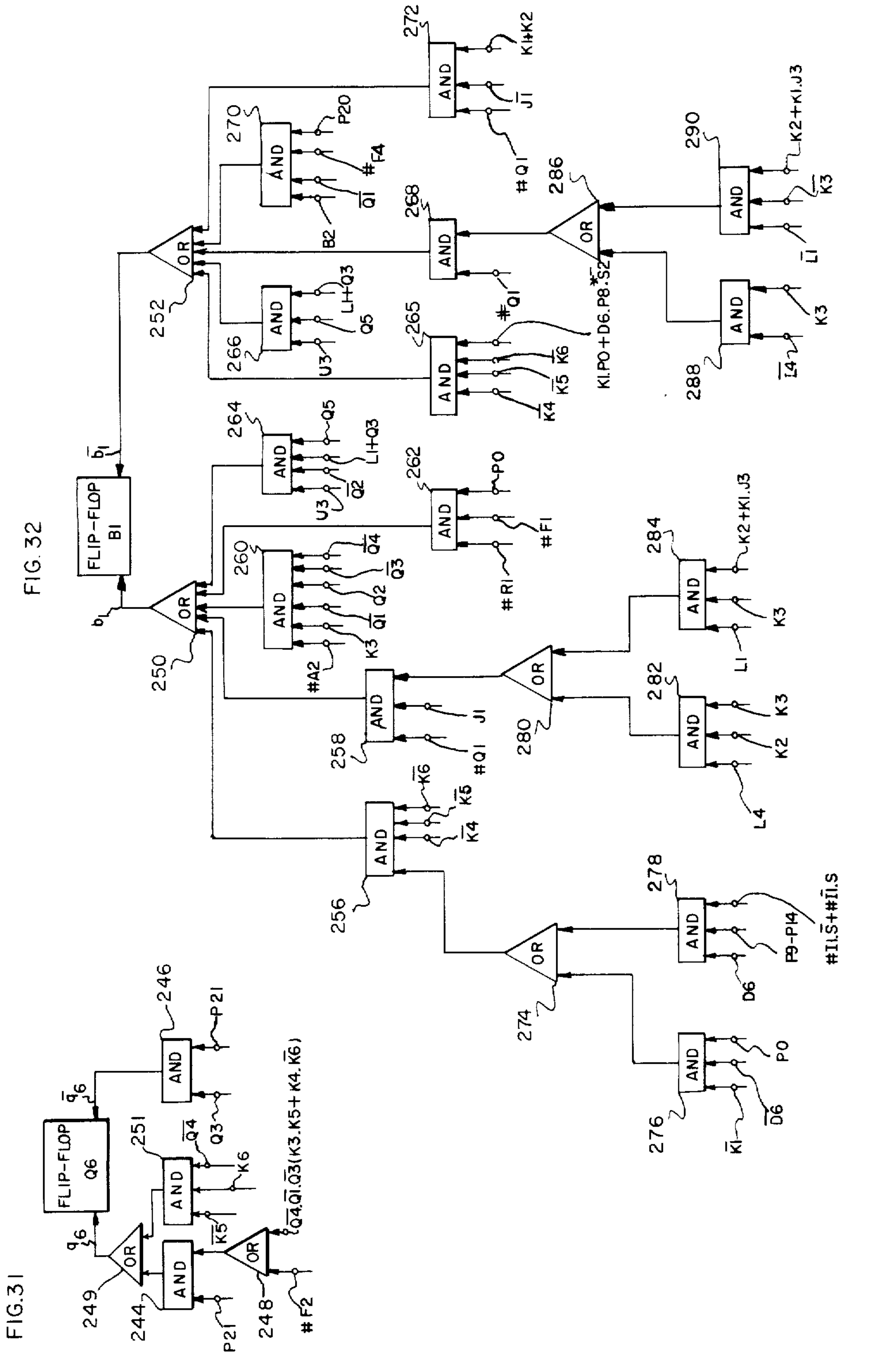
Figure 33:
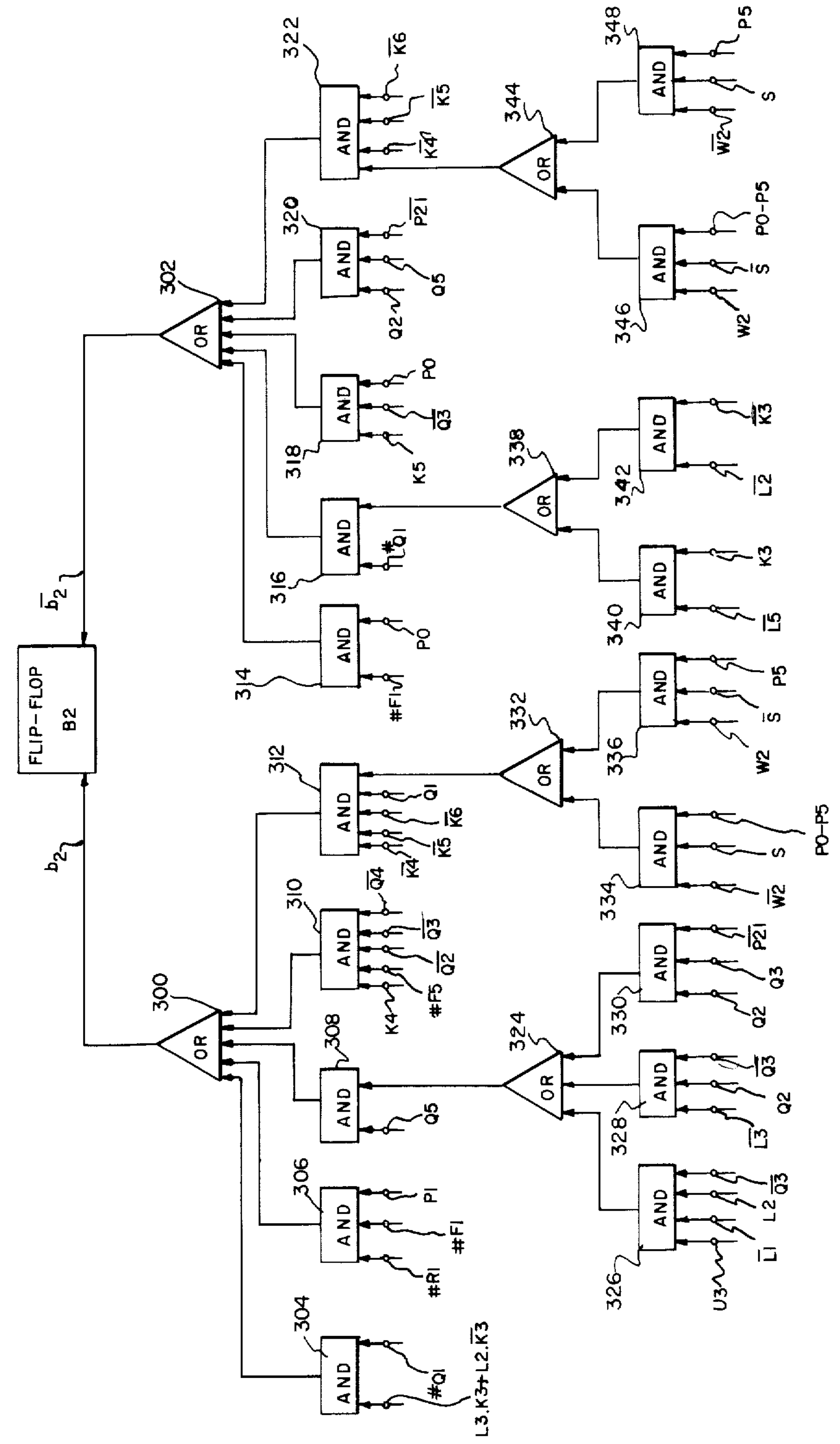
Figure 34:
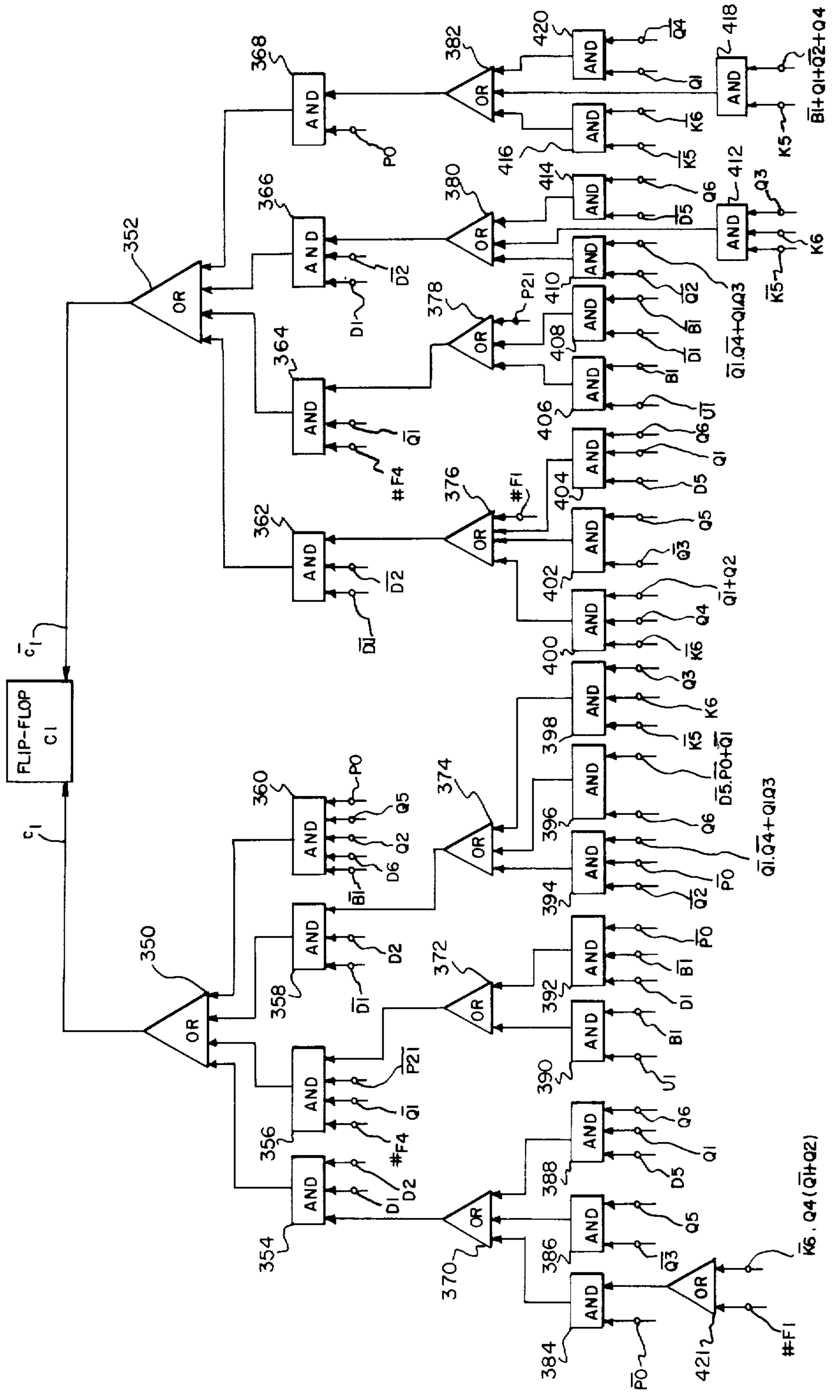
Figure 35:
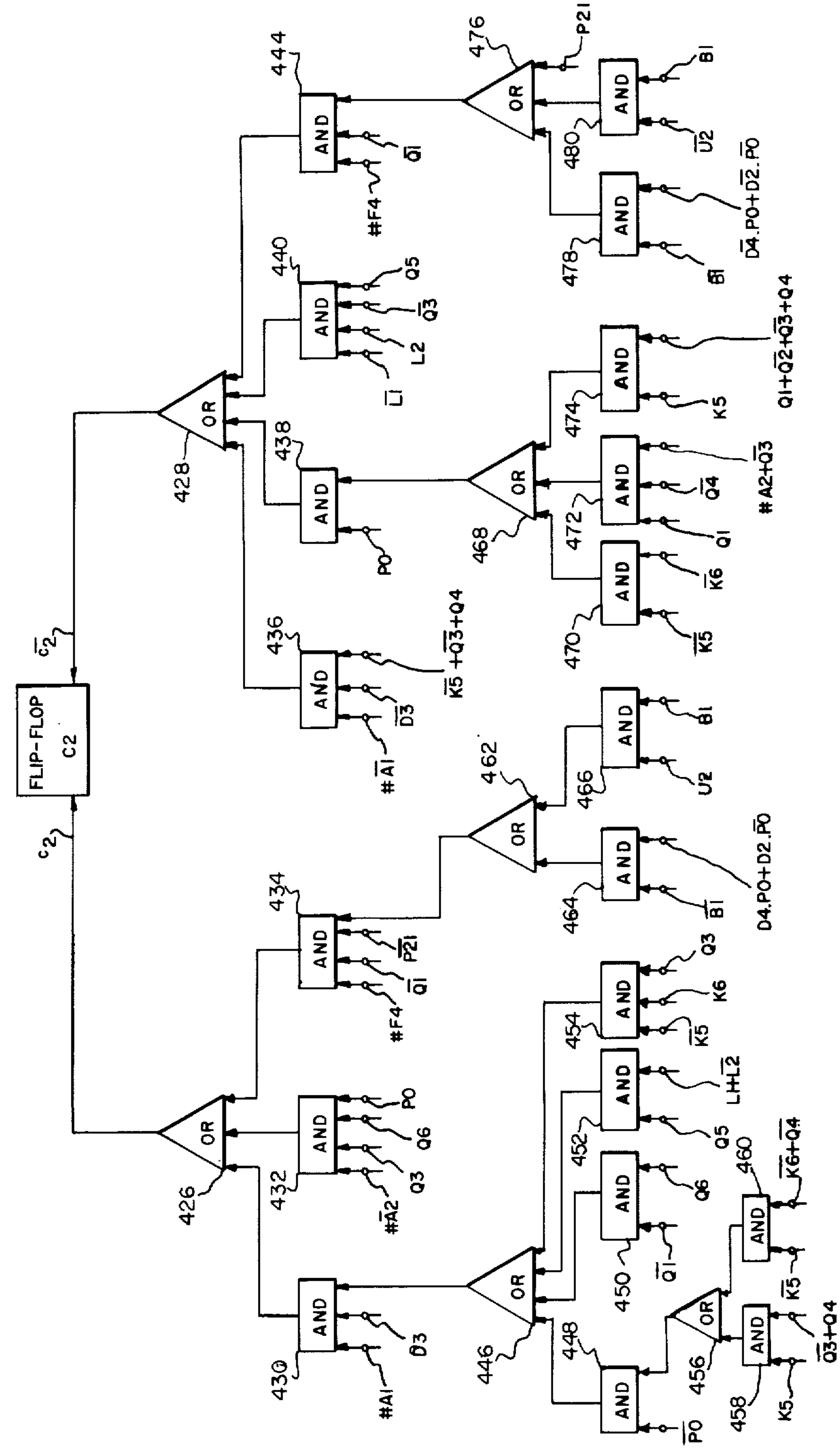
Figure 50A:
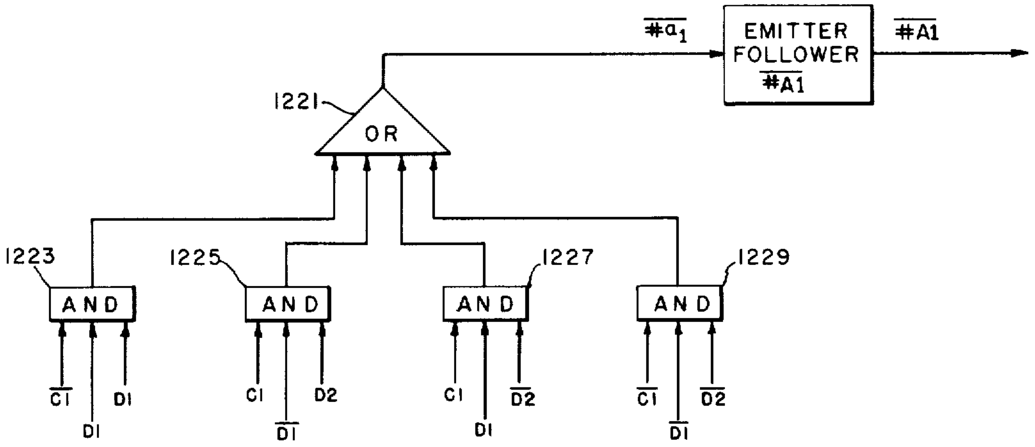
Figure 51A:
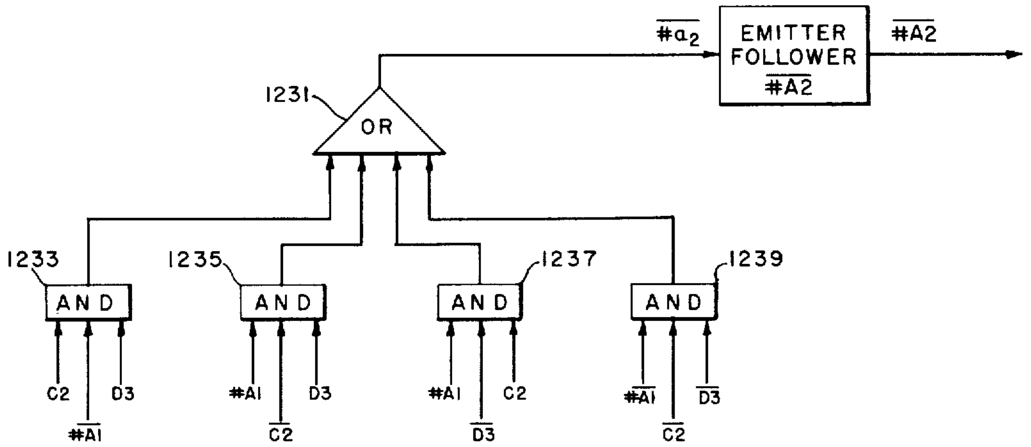
Figures 57, 57A:
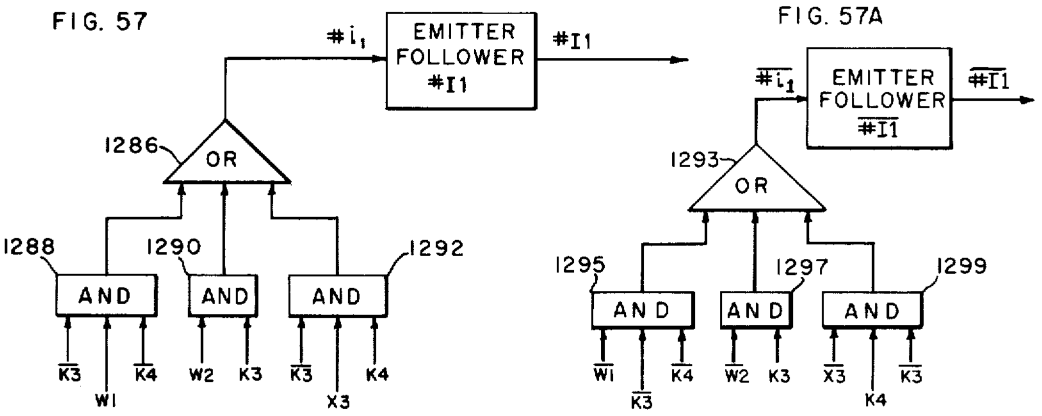
Figure 58:
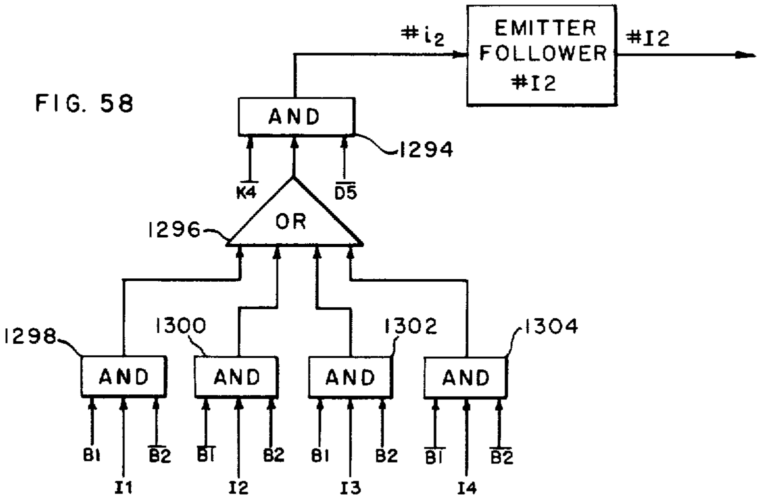
Figure 59:
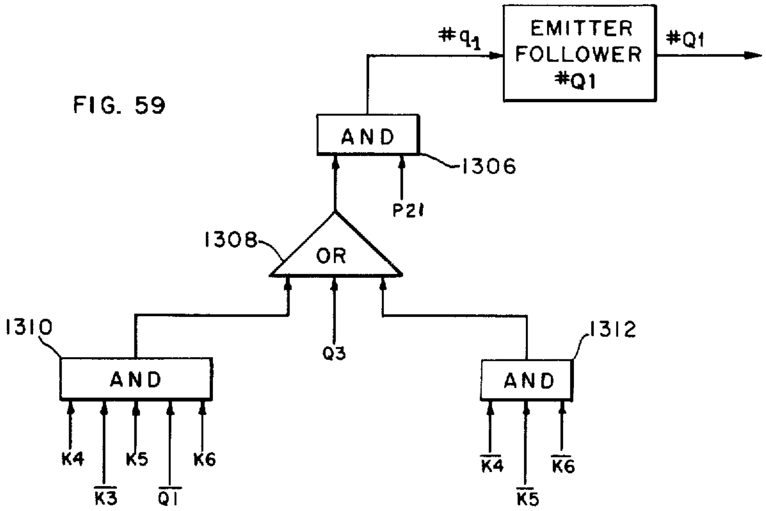
Figure 60:
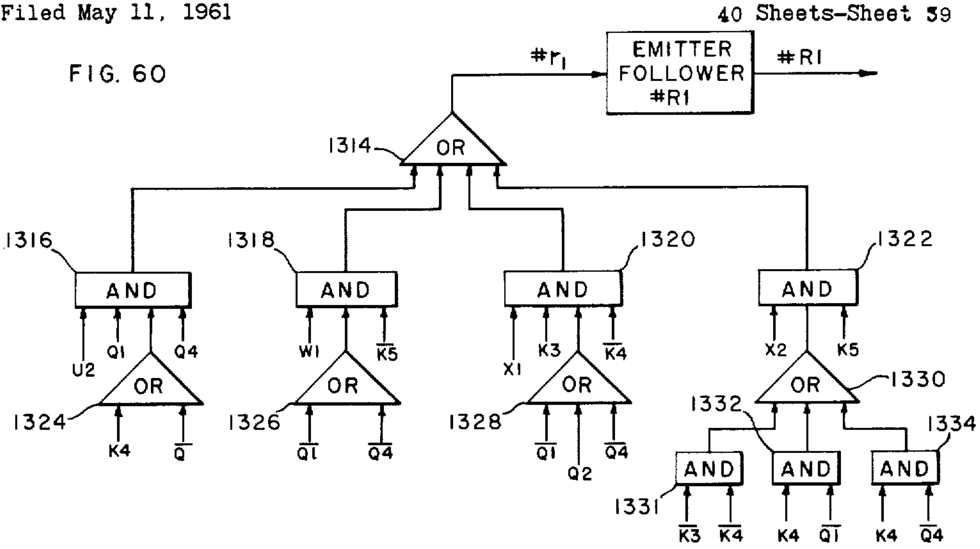
Figures 61, 62, 62A, 63:
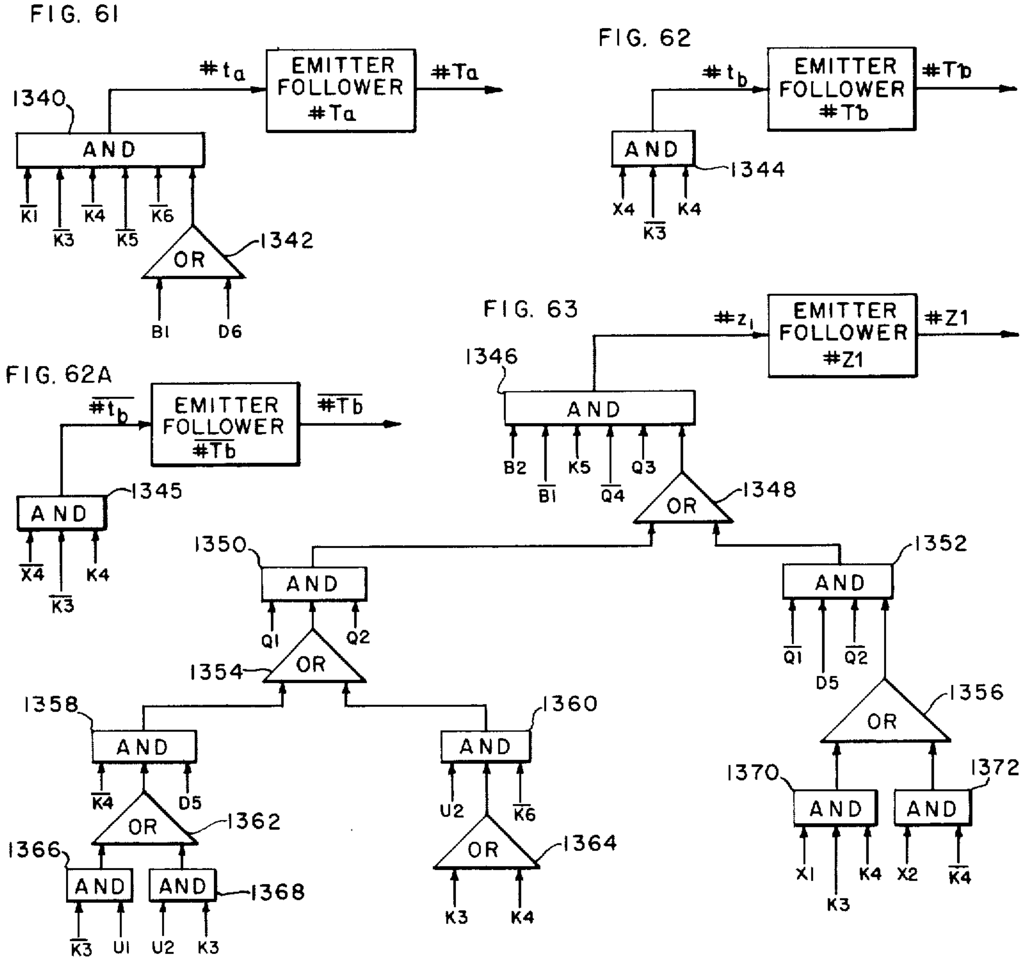
Figure 63A:
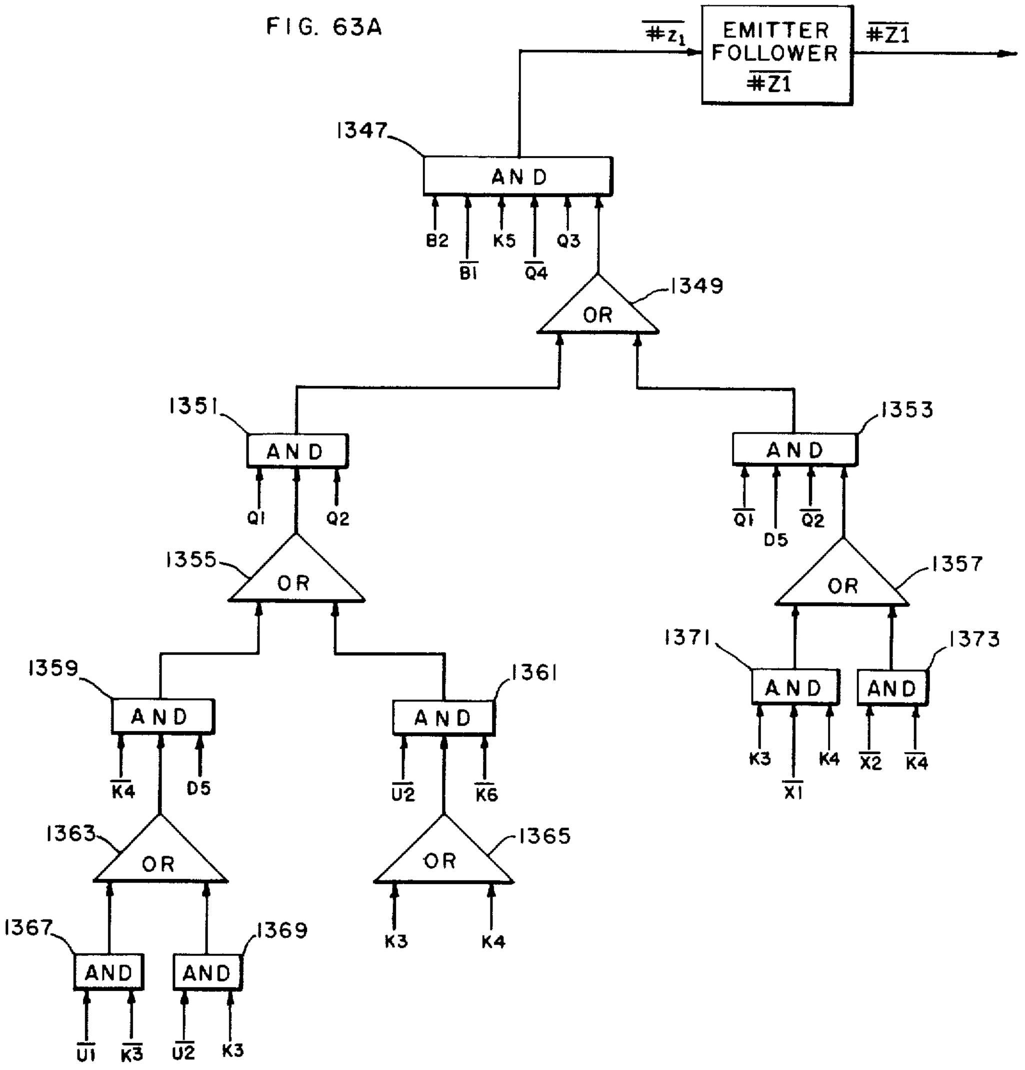

FIGURE 10 includes a table representing the various configurations of a bit time counter included in the computer to be described, and also showing the composition of a word in a particular track of the memory drum as compared with the different bit times represented by the different configurations of the bit timing counter, and also illustrating the composition of a typical instruction word in one of the two instruction registers of the computer;

FIGURE 10*a* is a table representing the different control states of the computer;

FIGURE 11 is a logic diagram of a control flip-flop K1 and of the logic associated with that flip-flop;

FIGURE 12 is a block diagram of a control flip-flop K2 and of the logic components associated with that flip-flop;

FIGURES 13–16 are respective block diagrams of a group of control flip-flops K3–K5 and of the logic components associated with the respective ones of the flip-flops;

FIGURES 17, 18 and 19 are diagrams of a group of track selector flip-flops L1, L2 and L3, and of the logic control components associated therewith;

FIGURES 20, 21 and 22 illustrate a plurality of track selection flip-flops L4, L5 and L6, and further illustrate the logic components associated with those flip-flops;

FIGURES 23, 24 and 25 illustrate a further group of track selection flip-flops N1–N3 and the logic associated therewith;

FIGURES 26 through 29 are directed to a group of order code flip-flops and illustrate the logic components used for controlling the flip-flops;

FIGURES 30 and 31 illustrate a pair of logic code flip-flops Q5 and Q6 and the components associated therewith;

FIGURES 32 and 33 illustrate the logic components associated with a pair of flip-flops B1 and B2, respectively, these flip-flops being used for multiplier digit storage;

FIGURES 34 and 35 illustrate the logic associated with a pair of carry control flip-flops C1 and C2 for an adder to be used in the embodiment of the invention to be described;

FIGURES 36–41 illustrate the logic components associated with a plurality of delay and miscellaneous flip-flops D1–D6;

FIGURE 42 illustrates the logic associated with a write amplifier $u_1$ which is coupled to the least significant digit accumulator register of FIGURE 1;

FIGURE 43 illustrates the logic control system associated with a write amplifier $u_2$ which is coupled to the most significant digit accumulator register of FIGURE 1;

FIGURE 44 illustrates the logic associated with a write amplifier $u_3$ which is coupled to the multiplier or divisor register of FIGURE 1;

FIGURE 45 shows the logic circuitry associated with a write amplifier $u_4$ coupled to the multiplicand register of FIGURE 1;

FIGURE 46 illustrates the logic associated with the write amplifier $w_1$ of the upper instruction register of FIGURE 1;

FIGURE 47 shows the logic control system associated with the write amplifier $w_2$ which is coupled to the lower instruction register of FIGURE 1;

FIGURE 48 illustrates the logic control circuitry coupled to the write amplifier $x_1$ of the first scratch pad memory of FIGURE 1;

FIGURE 49 shows the logic control system coupled to the write amplifier $x_2$ of the second scratch pad memory of FIGURE 1;

FIGURES 50 and 51 illustrate the logic components which are coupled to a pair of emitter followers #A1 and #A2;

FIGURES 50A and 51A illustrate the logic associated with a pair of emitter followers $\overline{\#A}$ and $\overline{\#A2}$;

FIGURES 52–56 show the logic associated with a plurality of emitter followers #F1–#F5;

FIGURES 57 and 58 show the logic associated with a pair of emitter followers #I1 and #I2;

FIGURE 57A shows the logic associated with an emitter follower #I1;

FIGURE 59 illustrates the logic control circuitry and components which are coupled to an emitter follower #Q1;

FIGURE 60 shows the logic associated with an emitter follower #R1;

FIGURE 61 shows the logic associated with an emitter follower #T*a*;

FIGURE 62 shows the logic which is coupled to an emitter follower $\overline{\#Tb}$;

FIGURE 62*a* shows the logic associated with an emitter follower $\overline{\#Tb}$;

FIGURE 63 shows the logic circuitry associated with an emitter follower #Z1; and FIGURE 63*a* shows the logic associated with an emitter follower $\overline{Z1}$.

As illustrated in FIGURE 1, the computer of the invention includes a magnetic memory drum 10 of usual construction. As noted above, the computer is primarily of the general purpose type. It is particularly suited for applications where power availabilities are limited, space is at a premium, weight must be kept to a minimum, and environmental conditions are subject to wide changes.

The magnetic memory drum 10 is used to synchronize the computer; and it is also used for receiving, storing and transmitting instructions and data for the computer. The drum may be slotted across its width so that every binary bit is mechanically defined, as well as electrically. The drum is divided, for example, into fifty peripheral tracks, with sixty-four sectors in each track. Each sector is capable of receiving and storing a 22-bit computer word. A total of 43 read heads and 11 write heads provide access, for example, to and from the entire drum in the constructed embodiment of the invention. These read and write heads are not illustrated in FIGURE 1, because the manner in which they are used to couple the various write amplifiers to the drum, and to couple the drum to the various read amplifiers, is well known.

The output of every read head associated with the magnetic memory drum 10 is introduced to a corresponding preamplifier. Since the power introduced to the head by the drum bit is very small, the preamplifiers provide power increases to overcome signal attenuation in the transmission from the particular read head to the corresponding main read amplifier. These preamplifiers, likewise, are not illustrated in FIGURE 1. They may conveniently be a transistorized emitter follower stage, so that although no voltage gain is effective, a current gain is obtained to charge wiring capacities.

In order to maintain constant clock frequency in the computer corresponding, for example, to a 140 kilocycle bit frequency, the drum may be driven by a synchronous motor at a speed, for example, of 6000 r.p.m. The magnetic memory drum 10 includes a clock channel, as illustrated in FIGURE 1. An appropriate read head and preamplifier respond to the clock signal in the clock channel and introduce the clock signal to the read amplifier T. The input to the clock read amplifier T is, for example, a 140 kilocycle sine wave, which is generated by the clock read head and amplified by the clock preamplifier. The purposes of the read amplifier T is to transform the sine wave into a series of voltage pulses which may be used to synchronize operations of the computer with the memory drum 10. The input voltage to the clock read amplifier T is amplified to an appropriate level and is transformed into pulses. These pulses in turn are used to trigger a flip-flop in the read amplifier T, so as to provide the terms T and $\overline{T}$.

A plurality of additional read amplifiers are included in the system of FIGURE 1. These read amplifiers may, for example, be transistorized, and each may be direct current coupled to its associated read head. Each read amplifier has an output circuit which is gated by the clock pulses from the read amplifier T, and a flip-flop is included in the output circuit. The function of each read amplifier is to operate on the alternating current bit signals read from the drum by its corresponding read head, and to interpret each bit signal as a "1" or a "0." The input sine wave introduced to one of the read amplifiers by its corresponding read head is successively amplified and clipped so that it becomes essentially a square wave train. This train is then split into two voltages of opposite phase, and these are gated into each side of the flip-flop which is included in the output circuit of the read amplifier. Depending on whether a "1" or "0" is being read from the drum, one side or the other of the flip-flop input will be "high" and, when the next clock pulse arrives, the corresponding side of the flip-flop output will be set high. In order to provide sufficient output power, two stages of amplification are included in each read amplifier.

A plurality of write amplifiers are also included in the system of FIGURE 1 in correspondence with corresponding write heads. Each write amplifier consists, for example, of a power stage on each side of a center tap of its associated write head winding. The write amplifier provides currents to the write head, and these currents generate magnetic flux in the write head and effect a magnetization of the drum bit in a "zero" or "one" orientation.

As illustrated in FIGURE 1, six tracks of the memory drum 10 are used to provide a permanent memory for the $\alpha$ operands, and one track is used to provide a first temporary storage, "scratch pad," memory track. The write head associated with the write amplifier $x_1$ is coupled to the first scratch pad memory track.

As also illustrated in FIGURE 1, an additional six tracks of the memory drum 10 are used to provide a permanent memory for the $\beta$ operands and for the $\gamma$ operands, and one track is used to provide a second temporary storage "scratch pad," memory track. The write head associated with the write amplifier $x_2$ is coupled to the second scratch pad memory track.

The read amplifier X1 may be selectively coupled by a suitable matrix to the read heads associated with any one of the permanent memory tracks containing the $\alpha$ operands, and it may also be selectively coupled to the read heads associated with the first and second scratch pad memory tracks.

The read amplifier X2, on the other hand, may be selectively coupled by a suitable matrix to the read heads associated with any one of the permanent memory tracks containing the $\beta$ operands and $\gamma$ operands, and the read amplifier X2 may also be selectively coupled to the read heads associated with the first and second scratch pad memory tracks.

Eight tracks on the memory drum 10 serve as a permanent storage for a first group of the instructions $\delta$, and these tracks are coupled through a suitable selection matrix to a read amplifier X3. An additional group of eight tracks on the drum serve as a permanent storage for a second group of the instructions $\delta$, and this last group of tracks is coupled through an appropriate selection matrix to a read amplifier X4.

The magnetic drum 10 of FIGURE 1 also includes a sector address track which is coupled to a read amplifier S. The sector address track has binary numbers recorded on it which are used to identify the different sector positions in each of the tracks of the magnetic memory drum 10.

The memory drum also serves as a circulating storage for an upper instruction register and for a lower instruction register. A write amplifier $w_1$ is coupled to the write head associated with the upper instruction register track, and a write amplifier $w_2$ is coupled to the write head associated with the lower instruction register track. The read head associated with the upper instruction register track is coupled to a read amplifier W1, and the read head associated with the lower instruction register track is coupled to a read amplifier W2.

The drum 10 also serves as a circulating storage means for the accumulator register of the computer. A first track on the drum serves as a storage for the most significant digits (MSD) of the accumulator register, and a second track on the drum serves as a storage for the least significant digits (LSD) of the register. A write amplifier $u_2$ is coupled to the write head associated with the most significant digit track of the accumulator register, and a write amplifier $u_1$ is coupled to the write head associated with the least significant digit track of the accumulator register. The read head associated with the most significant digit track of the accumulator register is coupled to a read amplifier U2, and the read head associated with the least significant digit track of the accumulator register is coupled to a read amplifier U1.

The drum 10 also has a track which serves as a circulating storage means for the multiplier or divisor register of the computer. A write amplifier $u_3$ is coupled to the write head associated with that track, and the read head associated with the multiplier or divisor register track is coupled to a read amplifier U3. The multiplicand register of the computer also uses a track on the memory drum 10 as a circulating storage means. A write amplifier $u_4$ is coupled to the write head associated with the multiplicand register track, and the read head associated with that track is coupled to an appropriate read amplifier U4.

The composition of the multi-digit word used in the computer to be described is shown in FIGURE 2. It will be observed that the computer word is composed of twenty-two binary bits, with the least significant bit being disposed at the left. The binary bit at the extreme right of the computer word in FIGURE 2 represents the sign digit.

As shown in FIGURES 3 and 4 the instruction word used in the computer is actually composed of 44 bits. The word is broken up into what shall be termed the "upper instruction word" (W1) and the "lower instruction word" (W2). The upper instruction word, contains the address of a desired one of the $\beta$ operands, and it also contains the address of a desired one of the $\alpha$ operands. The lower instruction word contains the address of a desired one of the $\gamma$ operands, and it contains the address of the next instruction $\delta$ to be executed.

The addresses of the three operands and of the next instruction included in the upper and lower instruction words, each are represented by a group of nine binary bits, six binary bits of each group designate the sector address, and three binary bits of each group designate the track address. The four most significant bits of the upper instruction word of FIGURE 3, and of the lower instruction word of FIGURE 4, indicate respectively the particular order code for the instruction being executed. This permits one particular operation to be carried out on the $\alpha$ and $\beta$ operands, and a different operation to be subsequently carried out on the $\gamma$ operand. It also permits a search to be made for the next instruction $\delta$ while the latter of these operations are being carried out.

FIGURE 5 lists a group of symbols which will be used in the ensuing description to identify the various flip-flops which are used in the computer to be described. A group of emitter followers is also used in the computer, and these will be identified by the logic symbols listed in FIGURE 6. A further group of logic symbols is listed in FIGURE 7, and these latter logic symbols refer to various inputs and control elements in the computer. The order code of FIGURE 9 lists a typical set of instructions and operations which may be carried out by a particular embodiment of the computer; and the various configurations to which the order code flip-flops Q1, Q2, Q3 and Q4 are set by the order code portions of the instructions so as to carry out these operations are also illustrated in FIGURE 9.

As described in detail in the copending application Serial No. 53,120, filed August 31, 1960, a group of flip-flops J1, J2, J3, J4 and J5 is connected as a bit timing counter, and this counter is synchronized by the magnetic memory drum 10 of FIGURE 1. The counter moves from one configuration to the next as the drum rotates, and it assumes a different configuration for each bit time of each computer and instruction word recorded on the drum and used in the computer. The various configurations of the bit timing counter for the bit times extending from P0 to P21 are shown by the table of FIGURE 10.

As also fully explained in the copending application, the flip-flops J1–J5 of the bit timing counter are also used to store the order code, so that the order code flip-flops Q1, Q2, Q3 and Q4 may all be set at P21 time to permit each succeeding instruction to be executed.

A typical instruction word in the lower instruction register of FIGURE 1 is also shown in FIGURE 10, and it will be noted from FIGURES 4 and 10 that the order code in that word appears at P18, P19, P20 and P21 digit times. The Q1 digit of the order code is stored in the J3 flip-flop of the bit counter until P21 bit time. Likewise, the Q2 digit is stored in the J5 and J2 flip-flops until P21 bit time, and the Q3 digit is stored in the J1 flip-flop until P21 bit time. Therefore, all these digits are available at P21 bit time to set the order code flip-flops Q1–Q4 for the next word time.

As also described in detail in the copending application Serial No. 53,120, filed August 31, 1960, the sector address channel or track of the magnetic memory drum 10 of FIGURE 1 has a sector word recorded in each sector, and these sector words identify the different sectors of each track on the drum. These sector words are recorded at the P0–P5 bit positions and at the P9–P14 bit positions in each sector, the words in any particular sector being the same at the two bit positions. The sector words are used for comparison with selected sector addresses for sector selection purposes in the different tracks of the memory drum 10. Various other binary bits, designated F1, F2, G3, G4, A, J, $\overline{J}$, G1, G2 and A3 are also recorded at otherwise vacant bit positions in the different word positions of the sector address track. These other symbols are used in the input-output system of the computer which is described in detail in the co-pending application Serial No. 53,120, filed August 31, 1960.

Figure 8:
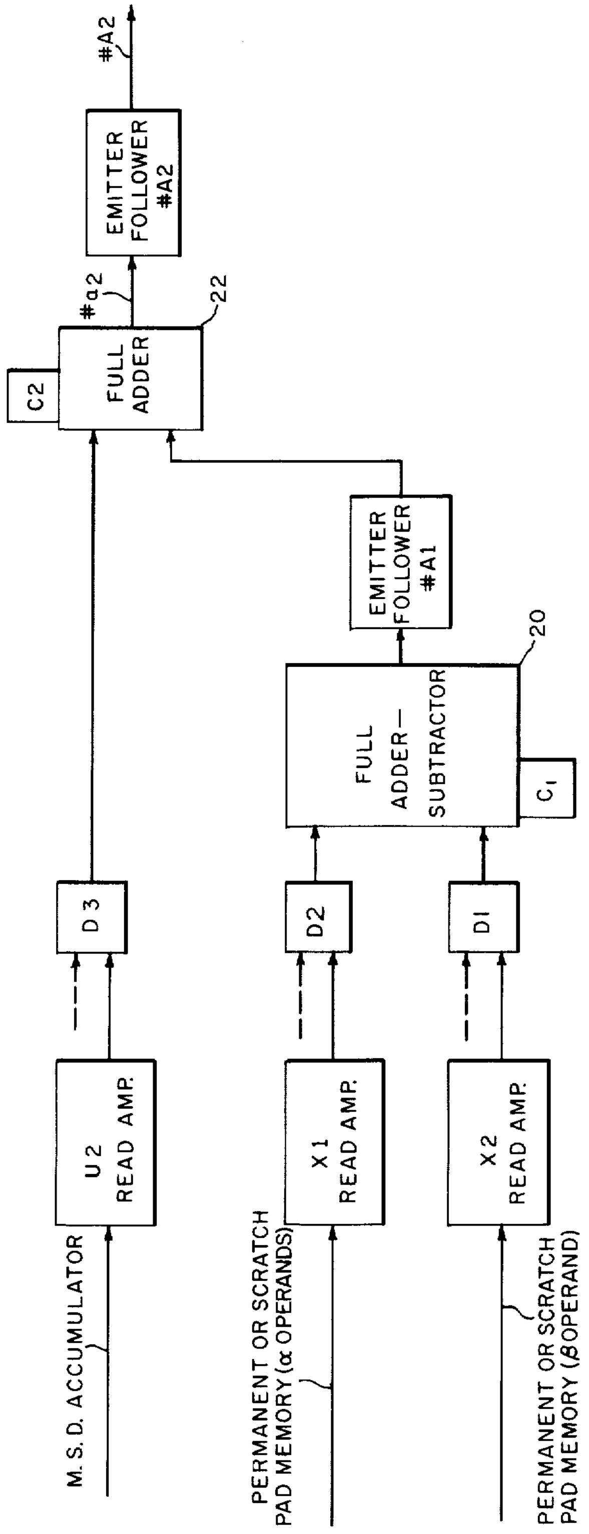
FIGURE 8 is a block diagram of a full adder and subtracter in the arithmetic unit of the computer and certain components associated therewith.

The circuitry and circuit components functionally associated with the MSD accumulator register of FIGURE 1 for the execution of an "add" command are shown schematically in FIGURE 8. The MSD accumulator read amplifier U2 described above is used to control the flip-flop D3, the permanent and scratch pad memory read amplifier X1 is used to control the flip-flop D2, and the permanent and scratch pad memory read amplifier X2 is used to control the flip-flop D1. The flip-flops D1 and D2 are coupled to an adder network 20, and the output of that network is fed to the emitter follower #A1. The flip-flop D3 and the emitter follower #A1 are coupled to an adder 22. The flip-flop C2 serves as a carry control for the adder 22. The output from the adder 22 is fed as an input $\#a_2$ to the emitter follower #A2.

The different control states of the computer are established by the control flip-flops K3–K6. As shown by the table of FIGURE 10A, these control flip-flops may be set to sixteen different states. These different control states may be effectively represented by the octal representations 00–71, as shown.

The computer of the present invention is constructed so that scanning and read-in operations are performed simultaneously with other arithmetic operations; and so that scanning operations and arithmetic operations occur even during the read-in of a next instruction. The control flip-flops K3–K6 are set from state to state as the various states are required. If any particular state is not required, it is skipped.

For example, if neither the $\alpha$ nor $\beta$ operand is found during the preceding instruction read-in operation, the computer enters a 00 state $(\overline{K3}.\overline{K4}.\overline{K5}.\overline{K6})$. During this state the output of the read amplifier W1 is compared with the output of the read amplifier S of the sector address track at the appropriate bit times to search for the $\beta$ and $\alpha$ operands. If this state occurs, and for the duration of this state, the computer is idle and is not computing.

When $\beta$ is found, the computer enters the 40 state $(\overline{K3}.\overline{K4}.K5.\overline{K6})$, for example. During this latter state $\beta$ is read into the arithmetic unit and the computer may be operating on this operand. The output of the read amplifier W1 is contnued to be compared with the output of the read amplifier S at the proper bit times in each word time until the $\alpha$ operand is found.

If $\alpha$ is not found during the 40 state, the computer enters the 41 state $(\overline{K3}.\overline{K4}.K5.K6)$, for example. For this latter state $\beta$ has been found and is in the arithmetic unit. This 41 state can only follow the 40 state. For the 41 state, the search for $\alpha$ is continued and no search has yet been conducted for the $\gamma$ operand, or for the next instruction $\delta$.

When the computer finds $\alpha$ it is ready to scan for the $\gamma$ operand and for the next instruction $\delta$, and it enters the 51 state $(K3.\overline{K4}.K5.K6)$. In this latter state, $\beta$ either has been found or will not be used, $\alpha$ has been found and is being read into the arithmetic unit. Or, the computer may enter the 50 state $(K3.\overline{K4}.K5.\overline{K6})$. This latter state 50 occurs when both $\alpha$ and $\beta$ have been found and are being read into the arithmetic unit.

If neither $\gamma$ nor $\delta$ are found in the 50 or 51 states, and the operation to be performed was a single word operation, the computer enters the state 10 $(K3.\overline{K4}.\overline{K5}.\overline{K6})$ during which the output of the read amplifier W2 is compared with the output of the read amplifier S as the computer scans for the $\gamma$ operand and for the next instruction $\delta$.

When the operand $\gamma$ is found, the computer enters the 70 state $(K3.K4.K5.\overline{K6})$. When this state is reached, the operations on the $\alpha$ and $\beta$ operands have been completed and the $\gamma$ operand is fed into the arithmetic unit to be performed upon.

When the arithmetic operations on the $\alpha$ and $\beta$ operands require additional word times, and the $\gamma$ operand is found during such additional word times, the $\gamma$ operand is stored temporarily in the upper instruction register. Then when the operations on the $\alpha$ and $\beta$ operands are completed the computer enters, for example, the 30 state $(K3.K4.\overline{K5}.\overline{K6})$. During this latter state, the $\gamma$ operand is read from the read amplifier W1 into the arithmetic unit, as the computer compares the output from the read amplifier W2 with the output from the read amplifier S at the proper bit times (P9–P14) to scan for the next instruction $\delta$.

If the operations on the $\alpha$ and $\beta$ operands have been performed, and if the operation on the $\gamma$ operand has been performed and the next instruction has not been found, the computer enters the 71 state $(K3.K4.K5.K6)$, for example. This 71 state, in general can only follow the 70 or 30 states, and during the 71 state, the computer continues to scan for the next instruction $\delta$.

When the next instruction $\delta$ is found, the computer enters the 61 state $(\overline{K3}.K4.K5.K6)$ and instruction read-in begins. During the instruction read-in state the output from the X3 read amplifier is read into the $w_1$ write amplifier of the upper instruction register, and the output from the X4 read amplifier is read into the $w_2$ write amplifier of the lower instruction register.

When the computer is in the 61 state described in the preceding paragraph, the output of the X3 read amplifier is also compared with the output of the S amplifier. This permits the computer to scan for the new $\alpha$ and $\beta$ operands during the instruction read-in. If the computer enters the 61 state, the old $\gamma$ operand has either been found or is not used. If $\beta$ is found during the 61 state, there is no need for the computer to enter the 00 state and that state is skipped. If $\alpha$ also is found during the 61 state, the computer skips the 40 and 41 states.

The computer is also capable of assuming an instruction read-in state (when the next instructon $\delta$ is found in the same sector as $\gamma$ is found) and while $\gamma$ is being read into the arithmetic unit from the read amplifier X2. This latter instruction read-in state may, for example, be 60 $(\overline{K3}.K4.K5.\overline{K6})$. While the computer is in the state 60, the output of the read amplifier X3 introduces the next instruction to the upper instruction register write amplifier $w_1$. At the same time, the output of the read amplifier X3 is compared with the output of the read amplifier S to scan for the $\alpha$ and $\beta$ operands, even before the addresses of these operands even reach the upper instruction register.

When the arithmetic operations on the $\alpha$ and $\beta$ operands require additional word times, and the $\gamma$ operand is found before such arithmetic operations are completed, as noted above, the $\gamma$ operand is temporarily stored in the upper instruction register. If the next instruction is found during the last additional word time, the computer can enter the 20 state $(\overline{K3}.K4.\overline{K5}.K6)$. Now the $\gamma$ operand is read into the arithmetic unit from the read amplifier W1 of the upper instruction register, and the next instruction is read into the upper and lower instruction registers from the read amplifiers X3 and X4. During this state the output of the amplifier X3 also is compared with the output of the amplifier S to scan for $\alpha$ and $\beta$.

The computer is also capable of scanning for new operands during arithmetic operations which require additional word times. For example, the computer enters the state 01 ($K3.K4.K5.\overline{K6}$). For this state the new instruction is in the instruction register, and the output of the read amplifier W1 is compared with the output of the S read amplifier at the proper bit times (P0–P5) and (P9–P14) in each word time to scan for the $\alpha$ and $\beta$ operands.

The computer is also capable of assuming a state during the additional word times in which the output of the read amplifier W2 is compared with the output of the S read amplifier at the proper times to scan for the $\gamma$ operand and for the next instruction $\delta$. This latter state is designated 11, for example, as represented by $K3.\overline{K4}.\overline{K5}.K6$.

An instruction read-in phase 21 ($\overline{K3}.K4.\overline{K5}.K6$) can also occur during the additional word times. As before, the computer scans for the new $\alpha$ and $\beta$ operands during this phase by comparing the output of the X3 read amplifier with the output of the S amplifier.

Finally, the computer can enter a 31 ($K3.K4.\overline{K5}.K6$) state, for example during the additional word times. In this phase the output of the read amplifier W2 is compared with the output of the read amplifier S at the proper bit times until the $\gamma$ operand is found. Then the $\gamma$ operand is read into the upper instruction register. When that occurs, the flip-flop K2 goes false, and the $\gamma$ operand is recirculated in the upper instruction register. Then the output of the read amplifier W2 is compared with the output of the read amplifier S at the proper bit times until the next instruction $\delta$ is found.

The computer may enter the 31 state from the 11 state, for example, when the operand is found. The flip-flop K2 remains true during first word in state 31 to allow $\gamma$ to be read into W1. Then the flip-flop K2 goes false and W2 and S are compared to search for the next instruction S.

As shown in FIGURE 11, the flip-flop K1 has an "or" gate 24 coupled to its input terminal $k1$, and it has an "or" gate 26 coupled to its input terminal $\overline{k1}$. An "and" gate 28 is coupled to the "or" gate 24 and a term $K6.Q1.\overline{Q3}.P8$ is introduced to the "or" gate 24. The bit timing terms $P8+P21$ are introduced to the "and" gate 28. Also introduced to the "and" gate 28 is the term $$K3+\overline{K4}.K5+{}^*S1.K6+{}^*S1.K4+\overline{Q1}.Q5+\overline{B1}.\overline{D6}.\overline{K4}.\overline{K6}$$

An "and" gate 30 and an "and" gate 32 are connected to the "or" gate 26, and a term $K3.P21.{}^*\overline{S1}$ is also introduced to the "or" gate 26. The bit timing terms $$(P0\text{–}P5)+(P9\text{–}P14)$$

are introduced to the "and" gate 30, and the term $$\#I1.\overline{S+\#I1}.S$$

is also introduced to that "and" gate 30. The term $\overline{Q1}.Q2.Q4.\overline{P0}$ is introduced to the "and" gate 32, and the term $\overline{B1}.Q6+D5.K3.\overline{K4}.K5.\overline{K6}$ is also introduced to that "and" gate.

The flip-flop K2 in FIGURE 12 has an "or" gate 34 connected to its input terminal $k2$, and it has an "and" gate 36 connected to its input terminal $\overline{k2}$. The term K1 is introduced to the "and" gate 34, and a term $$P8+\overline{K4}.Q2.Q5.P0+K4.\overline{K5}.K6.\overline{Q3}.P21$$

is applied to the "and" gate 34. The term $$\overline{K1}.P8(K3.\overline{K4}+\overline{K4}.Q3+\overline{Q5}.\overline{Q6})\overline{K1}.\overline{K4}.Q2.Q5.P0$$

and $\overline{K1}.K4.\overline{K5}.K6.\overline{Q3}.P21$ are introduced to the "or" gate 36.

The K1 flip-flop does the scanning for coincidence between the words on the sector address track (FIGURE 10) and the sector address of the $\alpha$, $\beta$ and $\gamma$ operands and of the $\delta$ instructions. The scan for $\beta$ or $\delta$ coincidence occurs from P0–P5 bit times, and the scan for $\alpha$ or $\delta$ coincidence occurs from P9–P14 bit times.

Memory of coincidence for $\beta$ or $\gamma$ is provided by the K2 flip-flop. That is, the flip-flop K2 looks at the flip-flop K1 at P8 bit time, and the flip-flop K2 is set to the same state as the flip-flop K1 at that time. The flip-flop K2 then remains in its set state for the remainder of the word time.

The flip-flop K1 is then free from P9–P14 bit times to scan for $\alpha$ or $\delta$, and retains its information till the end of the word time. If this flip-flop K1 is true at P21 bit time of that word time, it indicates that $\alpha$ or $\delta$ has been found. If the flip-flop K2 is true at P21 bit time of that word time, it indicates that $\beta$ or $\gamma$ has been found.

In order to scan for coincidence of $\beta$ or $\gamma$, the flip-flop K1 must be set true at P21 bit time; and to scan for $\alpha$ or $\delta$, the flip-flop K1 must be set true at P8 bit time. All of the logic on the true side of the flip-flop K1, therefore, allows scanning to occur.

The input to the "and" gate 30 of FIGURE 11 is the scan term which compares the sector address of $\alpha$, $\beta$, $\gamma$ or ($\#I_1$) with the sector address words (S) in the sector address track. This input sets the flip-flop K1 false whenever the sector address of $\alpha$, $\beta$, $\gamma$ or $\delta$ is different from the sector address word (S).

The term $K3.P21.{}^*\overline{S1}$ applied to the "or" gate 26 is a shut-off term which forces the computer into the "hold" mode and prevents scanning. The input terms to the "and" gate 32 prevent scanning for certain conditions during Branch and Shift operations.

The flip-flop K2 has four functions. It remembers whether or not $\beta$ or $\gamma$ coincidence has been found, as mentioned above; it controls read-in from the read amplifier X2 (FIGURE 11) to the upper instruction register write amplifier $w_1$ to permit the upper instruction register to be used as a temporary storage; it controls the transfer of information from the upper instruction register read amplifier W1 to the scratch pad memory write amplifiers $x_1$ or $x_2$; and it remembers a "run" signal for an upper square root or multiplication (M$d$) operation.

The P8 term introduced to the "and" gate 34 allows the flip-flop K2 to be set true by the term $K1.P8$ indicating $\beta$ or $\gamma$ coincidence during all operations. The term $\overline{Q5}.\overline{Q6}\overline{K1}.P8$ introduced to the "or" gate 36 allows the flip-flop K2 to be reset to permit normally scanning for $\gamma$. The term $\overline{K4}.Q3.\overline{K1}.P8$ introduced to the "or" gate 36 provides a reset for the flip-flop K2 in the last word of a product where the flip-flop has remembered a run signal for the square root or multiplication (M$d$) operations.

The term $\overline{K1}.K4.\overline{K5}.K6.\overline{Q3}.P21$ introduced to the "or" gate 36 allows the flip-flop K2 to be reset false at P21 bit time to prevent continuous reading in of the read amplifier X2 into the write amplifier $w_1$.

The term $K4.\overline{K5}.K6.\overline{Q3}.P21$ introduced to the "and" gate 34 allows the flip-flop K2 to be set true at P21 bit time when $\delta$ is found ($K1.P21$) to permit the special transfer from the read amplifier W1 to the write amplifiers $x_1$ or $x_2$.

The term $\overline{K4}.Q2.Q5.P0$ applied to the "and" gate 34 and the term $\overline{K1}.\overline{K4}.Q2.Q5.P0$ applied to the "or" gate 36 allows K2 to be set or reset in the first additional word of products ($Q2.P0$) to remember the "run" (K1) or the "stop" ($\overline{\text{K1}}$) signal for the square root or multiplication ($d$) operation.

Figure 13:
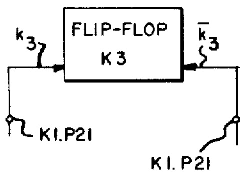

The term $K1.P21$ is introduced to the input terminal $k_3$ of the flip-flop K3 in FIGURE 13, and the term $K1.P21$ is introduced to the input terminal $\overline{k_3}$ of that flip-flop. These terms plus the normal cross connections in the flip-flop cause the flip-flop K3 to be triggered successively from one state to another at P21 bit time when the flip-flop K1 is true.

The flip-flop K3 is one of the four flip-flops K3, K4, K5 and K6 which specify the various control states of the computer. The only time the flip-flop K3 changes state is when $K1.P21$ is true. This can also be seen from the fact that when $\overline{K3}$ is true $\alpha$ and $\beta$ are being searched for, and when K3 is true $\gamma$ and $\delta$ are being searched. Therefore, when $\alpha$ is found ($\overline{K3}.K1.P21$), the computer should then scan for $\gamma$ and $\delta$ and so the flip-flop K3 should be set true. When $\gamma$ is found ($K3.K1.P21$) the computer should search for $\alpha$ and $\beta$, and the flip-flop K3 should be reset false.

Figure 14:
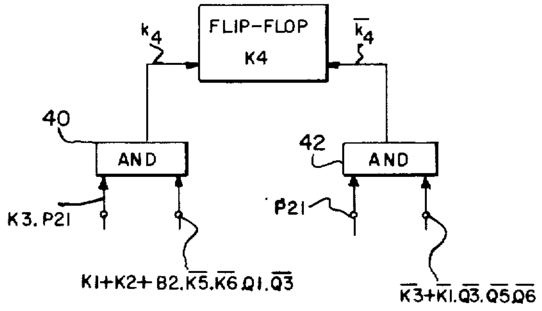

An "and" gate 40 is connected to the input terminal $k_4$ of the flip-flop K4 in FIGURE 14, and an "and" gate 42 is connected to the input terminal $\overline{k_4}$ of that flip-flop. The term $K3.P21$ is introduced to the "and" gate 40, and the term $K1+K2+B2.\overline{K5}.\overline{K6}.Q1.\overline{Q3}$ is also introduced to that "and" gate. The bit timing term P21 is introduced to the "and" gate 42, and the term $$\overline{K3}+\overline{K1}.\overline{Q3}.\overline{Q5}.\overline{Q6}$$

is also introduced to that "and" gate.

As noted above, the flip-flop K4 is a control flip-flop. The terms K1 and K2 introduced to the "and" gate 40 allow control states 1, 5, 51 and 11 in FIGURE 10A to step to the proper succeeding control states as a function of K1 and K2 at P21 bit time. The terms K1 and K2 at $K3.P21$ time specify $\delta$ and $\gamma$ coincidence, respectively.

The term $B2.\overline{K5}.\overline{K6}.Q1.\overline{Q3}$ applied to the "and" gate 40 in FIGURE 14 allows the computer to step from state 1 to state 71 in FIGURE 10A for the D*v*, S*q*, M*b*, M*d* ($Q1.\overline{Q3}$) instructions when the $\gamma$ address is greater than 32 words away (B2). This allows these operations to start without a $\gamma$ operand.

The term $\overline{K3}$ introduced to the "and" gate 42 in FIGURE 14 allows the instruction read-in states ($\overline{K3}.K4$) to reset the flip-flop K4 at P21 bit time. Instruction read-in states can go to states 0, 4, 5, 51, 01 and 11 only, and for each of these states the term $\overline{K4}$ is true. Therefore, the reset of the flip-flop K4 is not a function of the terms K1 or K2.

The flip-flop K4 must stay high until the next instruction $\delta$ is read for the Q3 operations in control states 3, 7, 71 and for all operations in state 31. The flip-flop K4 should be reset false to allow the computer to enter the control state 11 from the states 30, 70 and 71 for additional word time ($\overline{Q3}$) operations. The terms $\overline{K1}$, $\overline{Q3}$, $\overline{Q5}$ and $\overline{Q6}$ introduced to the "and" gate 42 provide for this by resetting the flip-flop K4 false at the end of the first word time ($\overline{Q5}.\overline{Q6}$) of an additional word type of operation (Q3) when the next instruction $\delta$ has not been found ($\overline{K1}$).

Figure 15:
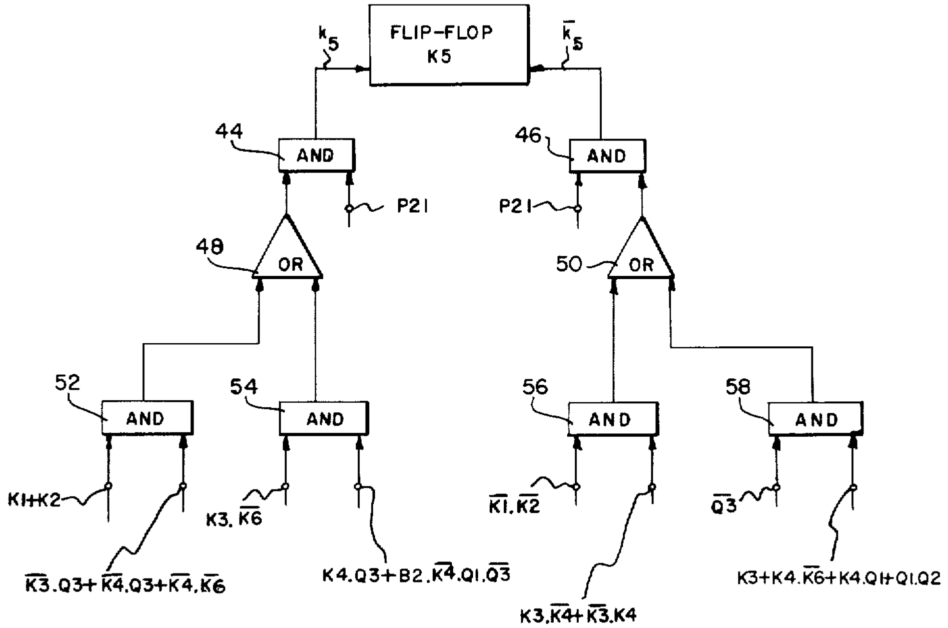

An "and" gate 44 is coupled to the input terminal $k_5$ of the flip-flop K5 in FIGURE 15, and an "and" gate 46 is coupled to the input terminal $\overline{k_5}$ of the flip-flop. An "or" gate 48 is connected to the "and" gate 44; and an "or" gate 50 is connected to the "and" gate 46. The bit timing term P21 is introduced to the "and" gate 44 and to the "and" gate 46.

A pair of "and" gates 52 and 54 is coupled to the "or" gate 48. A pair of "and" gates 56 and 58 is coupled to the "or" gate 50. The term $K1+K2$ is introduced to the "and" gate 52, and the term $$\overline{K3}.Q3+\overline{K4}.Q3+\overline{K4}.\overline{K6}$$

is also introduced to that "and" gate. The term $K3.\overline{K6}$ is introduced to the "and" gate 54, and the term $K4.Q3+B2.\overline{K4}.Q1.\overline{Q3}$ is introduced to that "and" gate. The term $\overline{K1}.\overline{K2}$ is introduced to the "and" gate 56, and the term $K3.\overline{K4}+\overline{K3}.K4$ is also introduced to that "and" gate. The term $\overline{Q3}$ is applied to the "and" gate 58, and the term $K3+K4.\overline{K6}+K4.Q1+Q1.Q2$ is also introduced to the "and" gate 58.

The flip-flop K5 is a control flip-flop. The terms $\overline{K3}.Q3$ and $\overline{K4}.Q3$ introduced to the "and" gate 52 in FIGURE 15 enable the flip-flop K5 to be set true (when K1 or K2 is true) for Q3 operations, when the computer is in the control state 20 and when it is in the last word time of control states 01, 11, 21. The term $\overline{K4}.\overline{K6}$ introduced to the "and" gate 52 allows the flip-flop K5 to be set true, when the terms K1 or K2 are true, and when the computer is in control states 00 or 10.

The term $K4.Q3$ introduced to the "and" gate 54 allows the flip-flop K5 to be set true for Q3 operations, when the computer is in the state 30, regardless of coincidence. The term $B2.\overline{K4}.Q1.\overline{Q3}$ introduced to the "and" gate 54 provides the setting of the flip-flop K5 true to allow the computer to enter the control state 71 from state 10 for the D*v*, S*q*, M*b* and M*d* instructions when the $\gamma$ address is beyond 32 words (B2). The terms $K3.\overline{K4}$ and $\overline{K3}.K4$ introduced to the "and" gate 56 resets the flip-flop K5 false, when the computer is in the control states 50, 60, 51 and 61, when there is no coincidence ($\overline{K1}.\overline{K2}$).

The term K3 introduced to the "and" gate 58 resets the flip-flop K5 false, when the computer is in the control states 50, 70, 51 and 71, for $\overline{Q3}$ operations. The term $K4.\overline{K6}$ introduced to the "and" gate 58 resets the flip-flop K5 false for $\overline{Q3}$ operations when the computer is in control state 60. The term $K4.Q1$ applied to the "and" gate 58 allows the computer, from the control state 61, to enter the additional word states for the S*q*, D*v*, M*b* and M*d* instructions. This allows the state 61 to be a first word product for the M*b* and M*d* instructions, and the first word square root for the S*q* instructions. The instruction D*v* is never programmed to be in the control state 61. The term $Q1.Q2$ introduced to the "and" gate 58 allows the computer to enter the control state 01 from the states 40 and 41 during the execution of the S*q* and M*d* instructions. The instructions M*d* and S*q* never are allowed in state 41, however, so that there is no conflict.

Figure 16:
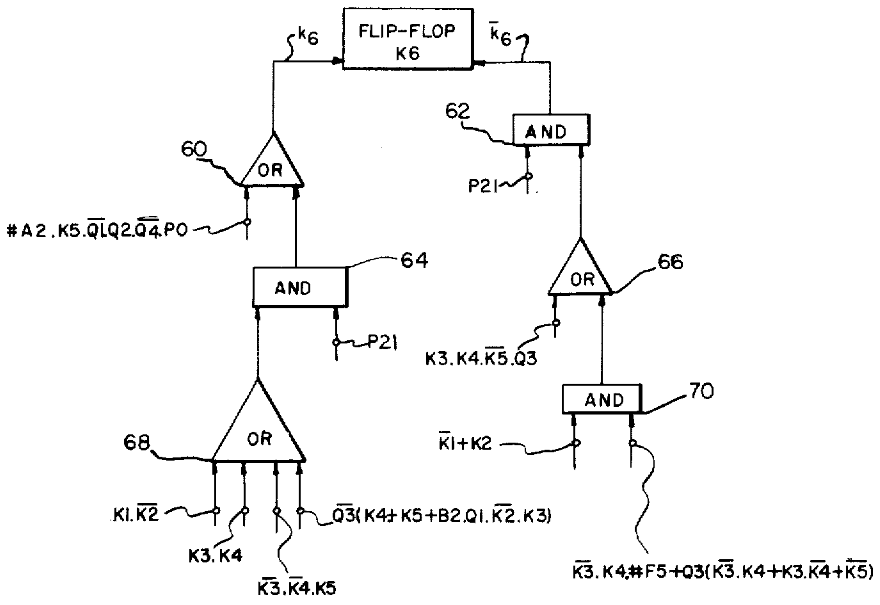

An "or" gate 60 is coupled to the input terminal $k_6$ of the flip-flop K6 in FIGURE 16, and an "and" gate 62 is coupled to the input terminal $\overline{k_6}$ of that flip-flop. A term $\#A2.K5.\overline{Q1}.Q2.\overline{Q4}.P0$ is introduced to the "or" gate 60, and an "and" gate 64 is also connected to that "or" gate. The bit timing term P21 is applied to the "and" gate 62, and an "or" gate 66 is also connected to that "and" gate. An "or" gate 68 is connected to the "and" gate 64, and the bit timing term P21 is introduced to that "and" gate. The term $K1.\overline{K2}$, the term $K3.K4$, the term $\overline{K3}.\overline{K4}.K5$ and the term $$\overline{Q3}(K4+K5+B2.Q1.\overline{K2}.K3)$$

are all introduced to the "or" gate 68. The term $K3.K4.\overline{K5}.Q3$ is introduced to the "or" gate 66, and an "and" gate 70 is coupled to that "or" gate. The term $\overline{K1}+K2$ is introduced to an "and" gate 70. The term $\overline{K3}.K4.\#F5+Q3(\overline{K3}.K4+K3.\overline{K4}+\overline{K5})$ are introduced to the "and" gate 70.

As described above, the flip-flop K6 is a control flip-flop. The term $K1.\overline{K2}$ introduced to the "or" gate 68 in FIGURE 16 sets the flip-flop K6 true when the computer is in control states 00, 20, 40 and 60 when $\alpha$ but not $\beta$ is found, and in the control states 10, 30, 50 and 70 when $\delta$ but not $\gamma$ is found. Therefore, the computer may enter the control states 51 and 61 respectively; and it may also enter the control states 11 or 21.

The term $K3.K4$, introduced to the "or" gate 68, allows the flip-flop K6 always to be set true when the computer is in the control states 30 and 70. The term $\overline{K3}.\overline{K4}.K5$ introduced to the "or" gate 68 allows the flip-flop K6 always to be set true when the computer is in the control state 40. The term $\overline{Q3}.K4$ introduced to the "or" gate 68 allows the flip-flop K6 to be set true when the computer is in control states 20 and 60, for $\overline{Q3}$ operations. The term $\overline{Q3}.K5$ introduced to the "or" gate 68 allows the flip-flop K6 to be set true when the computer is in the control state 50, for $\overline{Q3}$ operations. The term $\overline{Q3}.B2.Q1.\overline{K2}.K3$ introduced to the "or" gate 68 allows the control state 71 to be entered by the computer from the control state 10, during the execution of the S*q*, D*v*, M*b*, M*d* instructions. The term $\overline{K2}$ is necessary to prevent the control state 71 from being entered, rather than the control state 70, if $\gamma$ is found. This can occur if the flip-flop B2 is true when the computer enters the state 10 and $\gamma$ is equal to S.

The term $\#A2.K5.\overline{Q1}.Q2.\overline{Q4}.P0$ is introduced to the "or" gate 60, allows the flip-flop K6 to be set high at P0 bit time when the computer is in the control states 40, 50, 60 and 70, for the B*r* and S*h* operations and if the number in the accumulator register is negative (#A2). This allows the flip-flop K6 to be used for a memory of the sign digit, so as to indicate whether the output from the read amplifier W2 should recirculate or receive new information.

The term $K3.K4.\overline{K5}.Q3$ allows the flip-flop K6 to be reset false, when the computer is in the last word time of an instruction in the state 31. The term $\overline{K3}.K4.\#K5$ introduced to the "and" gate 70 allows the flip-flop K6 to be reset false, when the computer is in the control state 61, for the $Su_s$, B*r*, M*c*, M*a* operations, and when the state 51 should not be entered $(\overline{K1}+K2)$. The term $\overline{K3}.K4.Q3$ introduced to the "and" gate 70 allows the flip-flop K6 to be reset false when the computer is in the last word time of an instruction in the control state 21; and in the control state 61 for Q3 operations, when the control state 51 should not be entered $(\overline{K1}+K2)$. The term $K3.\overline{K4}.Q3$ introduced to the "and" gate 70 allows the flip-flop K6 to be reset false when the computer is in the control state 11 (last word); and when the computer is in the control state 51 for Q3 operations, and when the control state 61 should not be entered $(\overline{K1}+K2)$.

The term $\overline{K5}$ introduced to the "and" gate 70 allows the flip-flop K6 to be reset false when the computer is in the last word time of an instruction in the control state 01 and when the control state 51 should not be entered $(\overline{K1}+K2)$.

An "or" gate 72 is coupled to the input terminal $l_1$ of the flip-flop L1, in FIGURE 17, and an "or" gate 74 is connected to the input terminal $\overline{l_1}$ of that flip-flop. A pair of "and" gates 76 and 78 is connected to the "or" gate 72, and a term $\#F1.P21$ is also introduced to that "or" gate.

The terms I1 and P15 are introduced to the "and" gate 76, and a term $K4.K5+\overline{K5}(\overline{K6}+Q3)$ is also introduced to that "and" gate. The term $\overline{Q3}$ is applied to the "and" gate 78 and an "or" gate 80 is also connected to that "and" gate. An "and" gate 82 and an "and" gate 84 are connected to the "or" gate 80. The terms Q1, Q2 and Q6 are introduced to the "and" gate 82; and a term $U1.\overline{L2}.P21+\#A2.L2.P0$ is also introduced to that "and" gate. The terms P21 and Q5 are applied to the "and" gate 84.

A term $\#F2.P21$ is introduced to the "or" gate 74, and a pair of "and" gates 86 and 88 are connected to that "or" gate. The terms #I1 and P15 are introduced to the "and" gate 86, and a term $K4.K5+\overline{K5}(\overline{K6}+Q3)$ is also introduced to the "and" gate 86. The term $\overline{Q3}$ is introduced to the "and" gate 88, and an "or" gate 90 is also connected to that "and" gate. A pair of "and" gates 92 and 94 is connected to the "or" gate 90.

The terms L3, $\overline{Q2}$ and Q5 are introduced to the "and" gate 92. The terms Q1, Q6 and $U3+D5$ are introduced to the "and" gate 94.

The flip-flop L1 is used in conjunction with the flip-flops L2 and L3 to provide a head selection matrix to select the proper tracks for the $\alpha$ operands (X1). It is also used as a control for multiplication and square root operations in the additional word states; this being permissible because an $\alpha$ operand is never read from memory in the additional word time states. The flip-flop L1 is also used to provide control information for the flip-flop B1 for the T*r*. C*t*, S*h* and S*t* operations, but this comes from the normal $\alpha$ track information in the instruction register so that no extra logic is required.

The term $K4.K5$ introduced to the "and" gate 76 and to the "and" gate 86 of FIGURE 17 allows the flip-flop L1 to be set true or reset false for the proper track selection. This occurs when the computer is in states 60, 70, 61 and 71. The term $\overline{K5}(\overline{K6}+Q3)$ introduced to the "and" gates 76 and 86 allows the flip-flop L1 to be set true or reset false when the computer is in states 00, 10, 20, 30 and when the computer is in the last word time of an operation in states 01, 11, 21 and 31. Thus, only when the computer is in states 40, 41, 50 and 51 is the flip-flop L1 not set for track selection. It should be noted that the term #I1 is the track information which may be read from the read amplifier W1, W2 or X3, depending upon the particular control state of the computer. It should also be noted that when the read amplifier W2 is being scanned, the flip-flop L1 is set to the $\delta$ track number. This allows track selection for the read amplifier X1 for the T*r* instruction (lower).

The terms discussed above are the same for the flip-flops L1, L2 and L3. Therefore, the above comments regarding these terms will not be repeated in the description of the flip-flops L2 and L3.

The terms Q5 and P21 applied to the "and" gate 84; and the terms L3, $\overline{Q2}$ and Q5 applied to the "and" gate 92; provide logic which allows the flip-flop L1 to control the inputs to the delay flip-flops D3 and D4 in the additional word states of the multiplication operations. With the flip-flops L1 true, the flip-flop D3 reads the M.S.D. accumulator register read amplifier U2 of FIGURE 1, and the flip-flop D4 reads the L.S.D. accumulator read amplifier U1. With the flip-flop L1 false, the flip-flop D3 reads the read amplifier U1, and the flip-flop D4 reads the amplifier U2.

The flip-flop L1 also provides a carry for the one-bit adder logic for the write amplifier $u_3$ of the Multiplier or Divisor Register of FIGURE 1, this being provided for the quotient in the square root operation. The term U1, $\overline{L2}$, $\overline{P21}$ introduced to the "and" gate 82 allows the leader bit (U1) to set the flip-flop L1 true during all the additional word times of the square root operation, except the next-to-last ($\overline{L2}$) additional word time. The term Q1, Q6 and $U3+\overline{D5}$ applied to the "and" gate 94 allows the bar of the quotient bit ($\overline{D5}$) to reset the flip-flop L1 false if the quotient bit should be a one. If the term D5 is true, the quotient bit should be a zero, and the flip-flop L1 is reset false by the first "one" in the output from the read amplifier U3. This first "one" represents the guess made during the last word time of the square root operation as to what the correct quotient bit should be. Note that the write amplifier $u_3$ reads the term $\overline{U3}$ from the read amplifier U3 if the flip-flop L1 is true, and the write amplifier $u_3$ reads the term U3 from the read amplifier if the flip-flop L1 is false.

In the next-to-last word time of the square root operation, the guess for the quotient bit must be a zero so that the flip-flop C2 can provide the proper correction in the last word time of the instruction. The $\overline{L2}.\overline{P21}$ term applied to the "and" gate 82 prevents the flip-flop L1 from being set true when the leader bit occurs at P21 bit time. Then, in order to get the correct quotient bit written into the write amplifier $u_3$ during the next-to-last word time, the term $\#A2.L2.P0$ is added. The term $\#F1.P21$ is introduced to the "or" gate 72 to set the flip-flop L1 true at P21 time of the first word time during the multiplication operations, and the term $\#F2.P21$ introduced to the "or" gate 74 resets the flip-flop L1 false at P21 bit time of the first word time of the D*v* or S*q* operations.

An "or" gate 100 is connected to the input terminal $\overline{l_2}$ of the flip-flop L2 in FIGURE 18, and an "or" gate 102 is connected to the input terminal $\overline{l_2}$, of that flip-flop. A pair of "and" gates 104 and 106 is connected to the "or"

gate 100, and a plurality of "and" gates 108, 110 and 112 is connected to the "or" gate 102.

The terms #I1 and P16 are introduced to the "and" gate 104, and the terms $\overline{Q3}$ and $L1.Q5+U1.Q1.Q6.P21$ are introduced to the "and" gate 106. An "or" gate 114 is connected to the "and" gate 104, and a pair of "and" gates 116 and 118 is connected to the "or" gate 114. The terms K4 and K5 are introduced to the "and" gate 116, and the terms $\overline{K5}$ and $\overline{K6}+Q3$ are introduced to the "and" gate 118.

The terms $\overline{\#I1}$ and P16 are introduced to the "and" gate 108. The terms $\overline{L1}$, $\overline{Q3}$ and Q5 are introduced to the "and" gate 110. The terms $\#F1+\#F2$ and P21 are introduced to the "and" gate 112. An "or" gate 120 is connected to the "and" gate 108. A pair of "and" gates 122 and 124 is connected to the "or" gate 120. The terms K4 and K5 are introduced to the "and" gate 122, and the terms $\overline{K5}$ and $\overline{K6}+Q3$ are introduced to the "and" gate 124.

The terms K4 and K5 applied to the "and" gates 116 and 122, and the terms $\overline{K6}+Q3$ applied to the "and" gates 118 and 124 provide track selection logic for the read amplifier X1. The term $L1.Q5$ applied to the "and" gate 106, and the term $\overline{L1}.\overline{Q3}.Q5$ applied to the "and" gate 110, provide controls for the write amplifiers $u_1$ and $u_2$ of the accumulator register in the additional word times of the multiplication operations. When the flip-flop L2 is true, the write amplifier $u_1$ reads the flip-flop D4 and the write amplifier $u_2$ reads #A2. When the flip-flop L2 is false, the write amplifier $u_1$ reads #A2 and the write amplifier $u_2$ reads the flip-flop D4.

The term $U1.Q1.Q6.P21$ allows the flip-flop L2 to be set true for the entire next-to-last word time for the S*q* and D*v* instructions. It is necessary to specify the next-to-last word time for the S*q* instruction for the control of the flip-flops D1 and L1. Also, the term $L2.P21$ is required to set flip-flop Q3 true to indicate the last word time for the multiplication instructions and for the S*q* and D*v* instructions. The terms #F1 and #F2 applied to the "and" gate 112 reset the flip-flop L2 false at P21 bit time of the first word of the multiplication instructions and for the S*q* and D*v* instructions, respectively.

An "or" gate 126 is connected to the input terminal $l_3$ of the flip-flop L3 in FIGURE 19, and an "or" gate 123 is connected to the input terminal $\overline{l_3}$ of that flip-flop. A pair of "and" gates 130 and 132 is connected to the "or" gate 126. The term #I1 and P17 are introduced to the "and" gate 130, and an "or" gate 134 is also connected to that "and" gate. A pair of "and" gates 136 and 138 is connected to the "or" gate 134. The terms K4 and K5 are introduced to the "and" gate 136. The terms $\overline{K5}$ and $\overline{K6}+Q3$ are introduced to the "and" gate 138. The terms Q2, $\overline{Q3}$ and $Q5+U4.Q1.Q6.P20$ are introduced to the "and" gate 132.

A plurality of "and" gates 140, 142 and 144 is connected to the "or" gate 128. The terms #I1 and P17 are introduced to the "and" gate 140, and an "or" gate 146 is also connected to that "and" gate. The terms #F1 and P21 are introduced to the "and" gate 142. The term Q3 is introduced to the "and" gate 144, and an "or" gate 148 is also connected to that "and" gate. A pair of "and" gates 150 and 152 is connected to the "or" gate 146. The terms K4 and K5 are introduced to the "and" gate 150, and the terms $\overline{K5}$ and $\overline{K6}+Q3$ are introduced to the "and" gate 152. A pair of "and" gates 154 and 156 is connected to the "or" gate 148. The terms $\overline{Q2}$ and Q5 are introduced to the "and" gate 154. The terms $\overline{U4}$, Q1, Q6 and P20 are introduced to the "and" gate 156.

The terms K4 and K5 introduced to the "and" gates 136 and 150 and $\overline{K5}$ and $\overline{K6}+Q3$ introduced to the "and" gates 138 and 152 provide track selection for the read amplifier X1, as described above. The term Q5 applied to the "and" gate 132, and the terms $\overline{Q2}$ and Q5 applied to the "and" gate 154, provide control for the flip-flops B2, L1, Q2 and for the write amplifier $u_3$, in the additional word times of the multiplication operations. These controls are required to give the proper shifting of the multiplier and the proper control of the multiplier bit during operations when B2 is true. The term $$\overline{U4}.Q1.Q6.P20$$

applied to the "and" gate 132, and the terms U4, Q1, Q6 and P20 applied to the "and" gate 156 allows the flip-flop L3 to read the output of the multiplier register read amplifier U4 at the P20 bit time for the square root operation. The read amplifier U4 produces the contents of the least significant digit accumulator during the square root operation. The least significant bit of the L.S.D. accumulator is read from the read amplifier U4 at P20 bit time, this occurring two words prior to the last word. If this bit is a one, then the −1 provided by the D1 flip-flop in the additional word times, is cancelled out. Therefore, the D1 flip-flop is reset false at P0 of the next-to-last word time of the S*q* operation, if the least significant accumulator bit (held by the flip-flop L3) is a one. The terms #F1 and P21 applied to the "and" gate 142 reset the flip-flop L3 false at P21 time of the first word time during the execution of the multiplication instructions.

An "or" gate 160 is connected to the input terminal l4 of the flip-flop L4 of FIGURE 20. An "or" gate 162 is coupled to the input terminal $\overline{l_4}$ of the flip-flop L4. A pair of "and" gates 164 and 166 is coupled to the "or" gate 160. A pair of "and" gates 168 and 170 is coupled to the "or" gate 162. The terms #I1, P6 and $K1+\overline{K5}.\overline{K6}$ are introduced to the "and" gate 164. The terms #I1, K1, $\overline{K5}$, K6, $\overline{Q3}$ and P21 are introduced to the "and" gate 166. The terms #I1, P6 and $K1+\overline{K5}.\overline{K6}$ are introduced to the "and" gate 168. The terms #I1, K1, K5, K6, Q3 and P21 are introduced to the "and" gate 170.

The flip-flop L4 is used in conjunction with the flip-flops L5 and L6 to provide a head selection matrix to select the proper memory tracks for the $\beta$ and $\gamma$ operands for the read amplifier X2. The flip-flop L4 is also used to specify which scratch pad write amplifier X1 or X2 will receive the information from the read amplifier W1 in the special transfer. The flip-flop L4 provides information for the flip-flop B1 for control during the lower T*r*, C*t*, S*h* and S*t* operations. This latter information comes from the instruction register as normal track information, however, and requires no additional logic.

The term K1 introduced to the "and" gates 164 and 168 specifies $\beta$ or $\gamma$ coincidence. The term $\overline{K5}.\overline{K6}$ controls the flip-flop L4 so that it may assist in designating a desired track number when the computer is in states 00, 10, 20 or 30, regardless of coincidence. This term is necessary only when the computer is in state 10 for the S*h* instruction; the other states being included merely to simplify the logic. The term $\overline{K5}.\overline{K6}$ is required for the control state 10 to provide a proper setting for B1 for lower shift command which performs a branch and shift or shift only.

It should be noted that when the computer is in the control state 50, $\gamma$ coincidence should not occur unless the $\gamma$ track is the same as the $\beta$ track. This also applies when the computer is in state 60, where $\beta$ coincidence should not occur unless the $\beta$ track is the same as the $\gamma$ track.

Since the terms discussed above are the same for the flip-flops L4, L5 and L6, the above comments regarding these terms will not be repeated for the other two flip-flops.

The terms $\overline{\#I1}$, K1, $\overline{K5}$, K6, $\overline{Q3}$ and P21 applied to the "and" gate 166; and the terms $\#\overline{I1}$, K1, $\overline{K5}$, K6, $\overline{Q3}$, and P21 applied to the "and" gate 170 allow the flip-flop L4 to be set true or reset false by the term $\overline{\#I1}$ at $K1.P21$ time during the additional word states of the computer. The term $\overline{\#I1}.P21$ contains the information which normally would be set into the flip-flop Q4 at the end of the additional word operations. For a special transfer, however, this information is a dummy code which is set into the flip-flop L4 when δ is found to specify the write amplifier $x_1$ or the write amplifier $x_2$ for the special transfer. The term $\overline{Q3}$ prevents any interference with the normal track set in the last word.

An "and" gate 172 is coupled to the input terminal $l_5$ of the flip-flop L5 in FIGURE 21, and an "and" gate 174 is coupled to the input terminal $\overline{l_5}$ of that flip-flop. The terms #$\overline{I1}$, P7 and $K1+\overline{K5}.\overline{K6}$ are introduced to the "and" gate 172. The terms #$\overline{I1}$, P7 and $K1+\overline{K5}.\overline{K6}$ are introduced to the "and" gate 174. An "and" gate 176 is connected to the input terminal $l_6$ of the flip-flop L6 in FIGURE 22, and an "and" gate 178 is coupled to the input terminal $\overline{l_6}$ of that flip-flop.

The terms #$\overline{I1}$, P8 and $K1+\overline{K5}.\overline{K6}$ are applied to the "and" gate 176. The terms #$\overline{I1}$, P8 and $K1+\overline{K5}.\overline{K6}$ are applied to the "and" gate 178. The logic associated with the flip-flops L5 and L6 is similar to that discussed above.

An "and" gate 180 is connected to the input terminal $n_1$ of the flip-flop N1 in FIGURE 23. The flip-flops N1, N2 and N3 are coupled to the read amplifiers X3 and X4 for track selection purposes. An "and" gate 182 is coupled to the input terminal $\overline{n_1}$ of the flip-flop N1. The terms #I1, K1, K3, P15 and $\overline{D5}+\overline{K4}.K5+Q1+\overline{Q3}+Q4$ are introduced to the "and" gate 180. The terms #I1, K1, K3, P15 and $\overline{D5}+\overline{K4}.K5+Q1+\overline{Q3}+Q4$ are introduced to the "and" gate 182.

An "and" gate 184 is coupled to the input terminal $n_2$ of the flip-flop N2 in FIGURE 24. An "and" gate 186 is coupled to the false input terminal $\overline{n_2}$ of the flip-flop N2. The terms #I1, K1, K3, P16 and $$\overline{D5}+\overline{K4}.K5+Q1+\overline{Q3}+Q4$$

are applied to the "and" gate 184. The terms #$\overline{I1}$, $K1$, K3, P16 and $\overline{D5}+\overline{K4}.K5+Q1+\overline{Q3}+Q4$ are applied to the "and" gate 186.

An "and" gate 188 is coupled to the input terminal $n_3$ of the flip-flop N3, and "and" gate 190 is coupled to the input terminal $\overline{n_3}$ of that flip-flop. The terms #I1, K1, K3, P17 and $\overline{D5}+\overline{K4}.K5+Q1+\overline{Q3}+Q4$ are applied to "and" gate 188. The terms $\overline{\#I1}$, K1, B17, K3 and $D5+\overline{K4}.K5+Q1+\overline{Q3}+Q4$ are applied to the "and" gate 190.

As noted above, the flip-flop N1 is used in conjunction with the flip-flops N2 and N3 to provide a head selection matrix to select the proper memory tracks in FIGURE 1 for the read amplifiers X3 and X4. These amplifiers, as described previously herein, derive instructions from these memory tracks.

In general, the flip-flops N1, N2 and N3 should be set true whenever the lower instruction register read amplifier W2 (FIGURE 1) is scanned (K3) and δ coincidence has been found (K1). However, in the branch part of a lower shift instruction (S*h*), the branch is accomplished by choosing either the old track or the new track for the next instruction. In addition, during a lower transfer operation (T*r*), the δ track information may be used to select a track for the X1 read amplifier, and if so, the next instruction should come from the same track as the last one. This means, then, that under certain conditions in the lower T*r* and S*h* instructions, the flip-flops N1, N2 and N3 should not be set to the δ track number in W2.

The term $Q1+\overline{Q3}+Q4$ introduced to the "and" gates 180 and 182 in FIGURE 23 allow the flip-flop N1 to be set true whenever the read amplifier W2 is being scanned, and δ is found, for all operations except T*r* and S*h*. The term $\overline{D5}$ allows the flip-flop N1 to be set when $K1.K3.\overline{D5}$ is true for the T*r* and S*h* command. For the T*r* command, the flip-flop D5 is false to indicate that the read amplifier X1 is not being used for the transfer and, therefore, the information from the read amplifier W2 is the proper track for the next instruction. For the S*h* command, when the flip-flop D5 is false, the indication is that a shift type of operation is taking place, or that the accumulator register is negative for the branch command. In either case, the information from the read amplifier W2 is from the proper instruction track, and the flip-flop N1 should be set true.

The term $\overline{K4}.K5$ introduced to the "and" gate 180 and 182 allows the flip-flop N1 to be set true or reset false in the control state 50 or 51 of the computer, regardless of the operation. This means that, if a lower T*r* or S*h* operaton (in which the flip-flop N1 should not be changed) follows a control state 50 or 51, then the next instruction should not be found in the control state 50 or 51. This places a restriction on the T*r* and S*h* command, but it allows an instruction read-in operation to immediately follow any of the upper instruction operations.

The logic associated with the flip-flop N2 in FIGURE 24, and the logic associated with the flip-flop N3 in FIGURE 25 is similar to the logic associated with the flip-flop N1 and described above. For that reason, the logic of FIGURE 24 and the logic of FIGURE 25 will not be discussed in detail.

Figure 26:
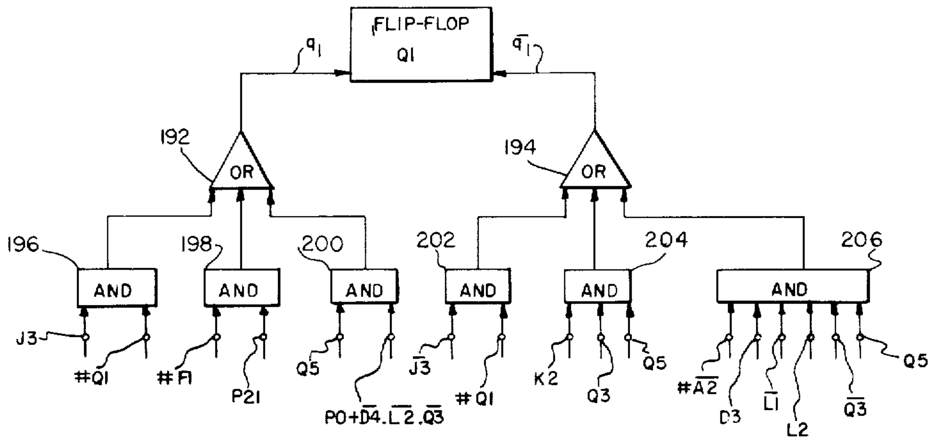

The logic associated with the flip-flop Q1 is shown in FIGURE 26. This flip-flop is an order flip-flop that specifies, along with the flip-flops Q2, Q3 and Q4 the instruction for operation to be performed. The flip-flop Q1 is also used to carry propagation in the M.S.D. accumulator during the additional word times of a multiplication operation.

In FIGURE 26, an "or" gate 192 is connected to the input terminal $q_1$ of the flip-flop Q1, and an "or" gate 194 is connected to the input terminal of $\overline{q_1}$ of that flip-flop. A plurality of "and" gates 196, 198 and 200 is connected to the "or" gate 192. A plurality of "and" gates 202, 204 and 206 is connected to the "or" gate 194. The terms J3 and #Q1 are applied to the "and" gate 196. The terms #F1 and P21 are applied to the "and" gate 198. The terms Q5 and $P0+D4.\overline{L2}.\overline{Q3}$ are applied to the "and" gate 200. The terms J3 and #Q1 are applied to the "and' gate 202. The terms K2, Q3 and Q5 are applied to the "and" gate 204. The terms #$\overline{A2}$, D3, $\overline{L1}$, L2, Q3 and Q5 are applied to the "and" gate 206.

The term J3 and #Q1 are introduced to the "and" gate 196, and the terms J3 and #Q1 are introduced to the "and" gate 202 in FIGURE 26. These terms permit the flip-flop Q1 to read the bit timing flip-flop J3, which latter flip-flop holds the proper information for the flip-flop Q1 when the term #Q1 is true. The term #Q1 basically indicates that the previous instruction has been executed, so that the Q flip-flops should be changed to indicate the order code of next instruction.

The term #F1 and the bit timing term P21, applied to the "and" gate 198, set the flip-flop Q1 true at P21 bit time of the first word time of a multiplication operation. The term $P0+\overline{D4}.\overline{L2}.\overline{Q3}$ applied to the "and" gate 200, and the terms #$\overline{A2}$, D3, $\overline{L1}$, L2, $\overline{Q3}$ and Q5 applied to the "and" gate 206, allow the flip-flop Q1 to act as a carry during the additional word times of a multiplication operation. When the flip-flop Q1 is set true, it indicates that there is no carry, and when the flip-flop Q1 is set false it indicates a +1 carry. The term #$\overline{A2}$, D3, $\overline{L1}$, L2, $\overline{Q3}$ and Q5 allows the flip-flop Q1 to be reset false when a carry is generated. The terms $\overline{L1}$ and L2 specify the time when the carry may be generated, and the term $\overline{\#A2}$ and D3 specify the conditions in which a carry is generated. The term $P0+\overline{D4}.\overline{L2}.\overline{Q3}$ clears the carry at each P0 bit time or when, the first 0 ($\overline{D4}$) from the read amplifier U2 is in the flip-flop D4 ($\overline{L2}$). It should be noted that the one-bit adder logic $u_2$ during the additional word times of a multiplication operation use the term $\overline{Q2}$ as the carry.

The terms K2, Q3 and Q5 are introduced to the "and" gate 204 to allow the flip-flop Q1 to be set false in the last word time of a multiplication operation if the term K2 is ever true. This term is required to allow the flip-flop K1 to continue scanning for the α operand when the computer is in control state 01, for the M*d* or S*q* operations and regardless of a "run" signal. The flip-flop K2 is true in the last word time of a multiplication operation in the computer control state 01 if the multiplication operation started with a "run" signal.

Figure 27:
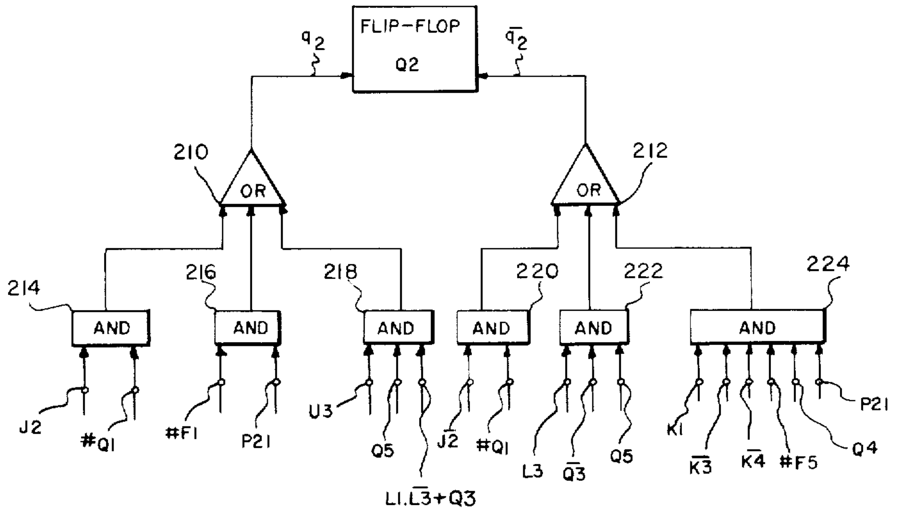

The logic associated with the flip-flop Q2 is shown in FIGURE 27. In that figure, an "or" gate 210 is connected to the input terminal $q_2$ of the flip-flop Q2, and an "or" gate 212 is connected to the input terminal $\overline{q_2}$ of the flip-flop. A plurality of "and" gates 214, 216 and 218 are connected to the "or" gate 210. A plurality of "and" gates 220, 222 and 224 is connected to the "or" gate 212. The terms J2 and Q1 are applied to the "and" gate 214. The terms #F1 and P21 are applied to the "and" gate 216. The terms U3, Q5 and $L1.\overline{L3}.Q3$ are applied to the "and" gate 218. The terms J2 and #Q1 are applied to the "and" gate 220. The terms L3, $\overline{Q3}$ and Q5 are applied to the "and" gate 222. The terms K1, $\overline{K3}$, $\overline{K4}$, #F5, Q4 and P21 are applied to the "and" gate 224.

The flip-flop Q2, as noted above, is also an order flip-flop which specifies the type of operation to be performed. The term $\overline{J2}$, Q1 applied to the "and" gate 214, and the terms $\overline{J2}$ and Q1 applied to the "and" gate 220 allows the flip-flop Q2 to read the bit timing flip-flop J2 at the proper time (#Q1) to change the order code.

During the additional word times of a multiplication operation, the flip-flop Q2 is used to control the flip-flops B2 and L3, so as to provide proper transfer and reversal of the multiplier bits. During this operation, the time when the flip-flop Q2 is true steps two bits to the right for each word time to allow the flip-flop B2 to pick up every other multiplier bit from the read amplifier U3. As the read amplifier U3 of the multiplier register recirculates, the used multiplier bits are discarded and a stepping "leader" bit is written in their place. Thus, the first "one" from the read amplifier U3 is a leader bit which steps right two bits per word time.

The term $L1.\overline{L3}+Q3$ applied to the "and" gate 218 then sets the flip-flop Q2 true two bits later for each consecutive word time. The terms L3, $\overline{Q3}$ and Q5 applied to the "and" gate 222 allow the flip-flop Q2 to be reset false after it has been set true for two bit times. The terms K1, $\overline{K3}$, $\overline{K4}$, #F5, Q4 and P21 applied to the "and" gate 224 allow the flip-flop Q2 to be reset false when the computer is in the control state 40 or 41 and when a coincidence occurs. This allows the A*c* instruction (FIGURE 9) to change to an A*d* instruction, and an M*c* instruction to change to a M*a* instruction after $\beta$ has been found. This is necessary to provide proper operation of the A*c* and M*c* instructions when $\beta$ is found before $\alpha$.

Figure 28:
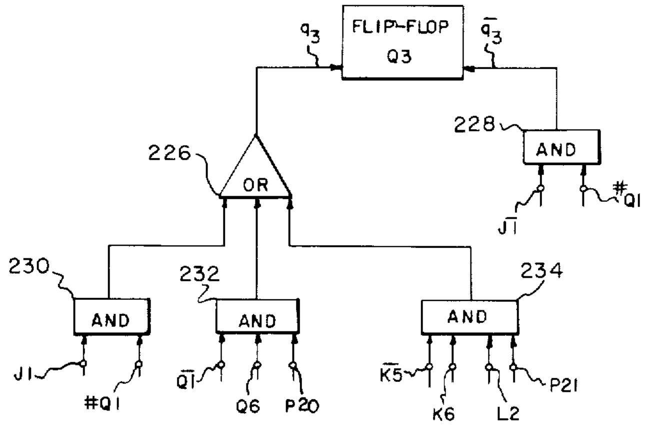

The logic associated with the flip-flop Q3 is illustrated in FIGURE 28. In that FIGURE 28 an "or" gate 226 is connected to the input terminal $q_3$ of the flip-flop Q3, and an "and" gate 228 is connected to the input terminal $\overline{q_3}$ of that flip-flop. A plurality of "and" gates 230, 232 and 234 is connected to the "or" gate 226. The terms J1 and #Q1 are introduced to the "and" gate 230. The terms $\overline{Q1}$, Q6 and P20 are introduced to the "and" gate 232. The terms $\overline{K5}$, K6, L2 and P21 are introduced to the "and" gate 234.

As noted above, the flip-flop Q3 is also an order flip-flop which specifies the particular operation being performed. The terms J1 and #Q1 applied to the "and" gate 230 and the terms J1 and #Q1 applied to the "and" gate 228 allow the flip-flop Q3 to read the bit timing flip-flop J1 at the proper time (#Q1) to change the order code. As explained above, the bit timing flip-flop J1 is used to store order code information so that such information can be fed at the proper time to the flip-flop Q3.

The flip-flop Q3 is also used in the additional word time operations to denote the last word time of such an operation. That is, so long as the flip-flop Q3 is false, the computer knows that the additional word time operation is not in the last word time, and when the flip-flop Q3 is true the computer knows that the operation is in the last word time. For all multiplication, D*v* and S*q* operations, the flip-flop L2 is true at P21 bit time only in the next-to-last word time of the additional word times. Thus, the terms $\overline{K5}$, K6, L2 and P21 introduced to the "and" gate 234 set the flip-flop Q3 true at the proper time to indicate the last word time for these operations.

The terms $\overline{Q1}$, Q6 and P20 introduced to the "and" gate 232 are required to set the flip-flop Q3 true for the S$u_s$ and B*r* operations. These operations occur only in an additional word state and last for one word time. Therefore, this additional word time is both the first and the last word time. In order to step out of an additional word state, the flip-flop Q3 must be true at P21 bit time. Therefore, the terms $\overline{K5}$, K6, L2 and P21 would not set the flip-flop Q3 true in time. In addition to this, the flip-flop L2 cannot be relied upon for the S$u_s$ and B*r* operations. It is for these reasons that the terms $\overline{Q1}$, Q6 and P20, applied to the "and" gate 232, are required for these two operations.

Figure 29:
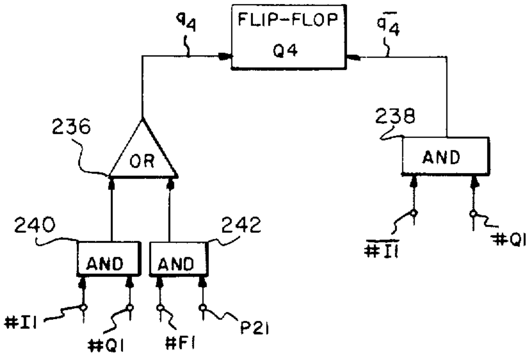

The logic associated with the flip-flop Q4 is set out in FIGURE 29. In FIGURE 29, an "or" gate 236 is connected to the input terminal $q_4$ of the flip-flop Q4, and an "and" gate 238 is connected to the input terminal $\overline{q_4}$ of that flip-flop. A pair of "and" gates 240 and 242 is connected to the "or" gate 236. The terms $\overline{\#I1}$ and #Q1 are introduced to the "and" gate 240. The terms #F1 and P21 are introduced to the "and" gate 242. The terms $\overline{\#I1}$ and #Q1 are introduced to the "and" gate 238.

The terms $\overline{\#I1}$ and #Q1 introduced to the "and" gate 240, and the terms $\overline{I1}$ and #Q1 introduced to the "and" gate 238 allow the flip-flop 234 to read $\overline{\#I1}$ at the proper time (#Q1) to change the order codes.

The term $\#F1.P21$ allows the flip-flop Q4 to be set at P21 bit time of the first word time of a multiplication operation (#F1). All the multiplication operations are specified by Q4, so that this term is required only to allow the product part of the square root operation to be performed. At the end of the product part of the square root operation, the flip-flop Q4 will be reset by the term #I1 so that the square root (Q4) part of the operation can be performed.

The logic associated with the flip-flop Q5 is set out in FIGURE 30. In FIGURE 30 an "or" gate 247 is connected to the input terminal $q_5$ of the flip-flop Q5, and an "and" gate 243 is connected to the input terminal $\overline{q_5}$ of that flip-flop. The terms #F1 and P21 are applied to an "and" gate 241 connected to the "or" gate 247, and the terms Q3 and P21 are applied to the "and" gate 243. An "and" gate 245 is also connected to the "or" gate 247. The terms $\overline{K5}$, K6 and Q4 are introduced to the "and" gate 245.

The flip-flop Q5 is used to reduce the loading on the flip-flops K5 and K6. The term Q5 replaces the term $\overline{K5}.K6.Q4$ in the logic which specifies additional word times during a multiplication operation. The terms #F1 and P21 applied to the "and" gate 241 set the flip-flop Q5 true at P21 bit time of the first word time of a product operation (#F1). The terms Q3 and P21 introduced to the "and" gate 243 reset the flip-flop Q5 false at the end of the product operation. The terms $\overline{K5}$, K6 and Q4 assure that the flip-flop Q5 will be true on original start up of the computer.

The logic associated with the flip-flop Q6 is set out in FIGURE 31. That logic includes an "or" gate 249 connected to the input terminal $q_6$ of the flip-flop Q6 and an "and" gate 246 connected to the input terminal $\overline{q_6}$ of that flip-flop. The term P21 is introduced to an "and" gate 244 connected to the "or" gate 249, and the terms Q3 and P21 are introduced to the "and" gate 246. An "or" gate 248 is connected to the "and" gate 244. The terms #F2 and $\overline{Q1}.\overline{Q3}.\overline{Q4}(K5+K4.\overline{K6})$ are applied to the "or" gate 248. An "and" gate 251 is connected to the "or" gate 249. The terms $\overline{K5}$, K6 and $\overline{Q4}$ are applied to the "and" gate 251.

The flip-flop Q6 is also used to reduce loading on the flip-flops K5 and K6.

The term Q6 replaces the term $\overline{K5}.K6.\overline{Q4}$ in the logic which specifies additional word times for the $Su_s$, D*v*, B*r* of S*q* commands. The term #F2 applied to the "or" gate 248 sets the flip-flop Q6 true at P21 bit time of the first word time of a D*v* or S*q* command (#F2). The term $(K3.K5+K4.\overline{K6})\overline{Q1}.\overline{Q3}.\overline{Q4}$ applied to the "or" gate 248, sets the flip-flop Q6 true for the first word time of an $Su_s$ or B*r* command. The $Su_s$ command enters additional word states from the computer control states 50, 51, 60 or 70. The B*r* instruction enters additional word states from the computer control states 50, 51, 70, 71 and 30. The term $K3.K5+K4.\overline{K6}$ includes all of these states. $Su_s$ is never programmed to the computer control states 30 or 71, and the command B*r* is never programmed to the computer control state 60. Therefore, there is no conflict between $Su_s$ and B*r* in the term $K3.K5+K4.\overline{K6}$. The term $Q3.P21$ resets the flip-flop Q6 false at the end of the aforementioned operations. The term $\overline{K5}.K6.\overline{Q4}$ assures that the flip-flop Q6 will be true on original start up of the computer.

The logic associated with the multiplier digit storage flip-flops B1 and B2 is shown in FIGURES 32 and 33.

An "or" gate 250 in FIGURE 32 is connected to the input terminal $b_1$ of the flip-flop B1, and an "or" gate 252 is connected to the input terminal $\overline{b_1}$ of the flip-flop. A plurality of "and" gates 256, 258, 260, 262 and 264 is connected to the "or" gate 250. A plurality of "and" gates 265, 266, 268, 270 and 272 is connected to the "or" gate 252. The terms $\overline{K3}$, $\overline{K4}$, $\overline{K5}$, $\overline{K6}$ are introduced to the "and" gate 256. The terms #Q1 and J1 are introduced to the "and" gate 258. The terms #A2, K3, $\overline{Q1}$, Q2, $\overline{Q3}$ and $\overline{Q4}$ are introduced to the "and" gate 263. The terms U3, $\overline{Q2}$, $L1+Q3$ and Q5 are introduced to the "and" gate 264. The terms #R1, #F1 and P0 are introduced to the "and" gate 262. The terms $\overline{K3}$, $\overline{K4}$, $\overline{K5}$, $\overline{K6}$, $K1.P0+D6.P8{*}\overline{S2}$ are introduced to the "and" gate 265. The terms U3, Q5 and $L1+Q3$ are introduced to the "and" gate 266. The term #Q1 is introduced to the "and" gate 268. The terms B2, $\overline{Q1}$, #F4, and P20 are introduced to the "and" gate 270. The terms #Q1, $\overline{J1}$ and $K1+K2$ are introduced to the "and" gate 272.

An "or" gate 274 is connected to the "and" gate 256 and a pair of "and" gates 276 and 278 are connected to the "or" gate 274. An "or" gate 280 is connected to the "and" gate 258, and a pair of "and" gates 282 and 284 is connected to the "or" gate. An "or" gate 286 is connected to the "and" gate 268, and a pair of "and" gates 288 and 290 is connected to the "or" gate 286. The terms $\overline{K1}$, $\overline{D6}$ and P0 are applied to the "and" gate 276. The terms D6, P9–P14 and $\overline{\#I1.S}+\overline{\#I1}.S$ are introduced to the "and" gate 278. The terms L4, K2 and K3 are introduced to the "and" gate 282. The terms $\overline{L1}$, $\overline{K3}$ and $K2+K1.J3$ are introduced to the "and" gate 284. The terms L4 and K3 are introduced to the "and" gate 288. The terms $\overline{L1}$, $\overline{K3}$ and $K2+K1.J3$ are introduced to the "and" gate 290.

The terms $\overline{K1}$, $\overline{D6}$ and P0 introduced to the "and" gate 276, the term $\overline{\#I1.S}+\overline{\#I1}.S$ applied to the "and" gate 278, the term $K1.P0$ applied to the "and" gate 265, and the term $D6.P8.{*}\overline{S2}$ applied to the "and" gate 265, provide the step and hold controls in the computer control state 10. During the multiplication operation the flip-flop B1 holds the multiplier bits ($2^0$, $2^2$, $2^4$ . . .) for the partial products. The term $\#Q1.\overline{J1}(K1+K2)$ introduced to the "and" gate 272 provides a reset control for the flip-flop B1 upon entering any $\overline{Q3}$ operation with either the flip-flops K1 or K2 in their true state. This fulfills the requirement that the flip-flop B1 be false at P0 bit time of the first word time of a multiplication operation for all such operations, except those which may start in the computer control state 71. For these latter operations, the term $K3.\overline{L4}$ applied to the "and" gate 288 provides the reset control for the flip-flop B1 since the $\gamma$ track "zero" ($\overline{L4}$) will be called for by the programmer. The term $\#F1.\#R1.P0$ applied to the "and" gate 262 allows the flip-flop B1 to be set to the multipler bit ($2^0$) in the first word time of the multiplication operation.

The term $U3.\overline{Q2}.Q5(L1+Q3)$ applied to the "and" gate 264 and $U3.Q5(L1+Q3)$ applied to the "and" gate 266 fulfill the logical requirements for multiplication operations during the additional word times. These terms provide proper reversing and setting of the multiplier bits.

For the S*t*, S*h*, T*r* and C*t* instructions, the term $K2.K3.L4$ applied to the "and" gate 282, the term $K2+K1.J3$ applied to the "and" gate 284, the term $K3.\overline{L4}$ applied to the "and" gate 288, and the terms $\overline{L1}$, $\overline{K3}$ and $K2+K1.J3$ applied to the "and" gate 290, provide for setting the information from the track selection flip-flops into the flip-flop B1 at the beginning of the operations specified by these instructions. This information is a code which specifies which of the variations of the operations is to be performed.

The terms $K2.K3.L4$ applied to the "and" gate 282, and the term $K3.\overline{L4}$ applied to the "and" gate 288, allow the flip-flop B1 to read the flip-flop L4 at the end of an upper instruction operation or during the lower instruction (Q3) type of operation.

The term K2 applied to the "and" gate 282 prevents the flip-flop B1 from being set true after the first word time of a left shift. The term $K2+K1.J3$ applied to the "and" gate 284 allows the flip-flop B1 to read the flip-flop L1 at the start of an upper instruction operation. The term $K1.J3$ applied to the "and" gate 284 allows a S*t* operation to start in the computer control state 51, but does not allow the flip-flop B1 to be set true upon the computer entering that control state during the last word of an S*h* command.

The J1 qualifying term applied to the "and" gate 258 prevents the flip-flop B1 from being set true when a product is entered. The term $B2.\overline{Q1}.\#F4.P20$ resets the flip-flop B1 at P20 bit time of the first word time of a left shift (B2). The flip-flop B1 specifies one or two bits left shift for the first word time. The shift is two bits for each word time after the first word time and, therefore, the flip-flop B1 must be reset false and never set true again during the operation to indicate two bits left shift per word. The P20 term applied to the "and" gate 270 prevents conflict with the terms applied to the "and" gates 282 and 284.

The term $\#A2.K3.\overline{Q1}.Q2.\overline{Q3}.\overline{Q4}$ applied to the "and" gate 260 allows the flip-flop B1 to scan for "ones" prior to entering the additional word time states for the branch operation. The term $U3.Q5(L1+Q3)$ applied to the "and" gate 264 resets the flip-flop B1 upon entering a branch operation so that the term applied to the "and" gate 260 can scan for "ones." The flip-flop B1 is not used during the $Su_3$, D*v*, S*q*, A*d*, S*u*, A*c* and E*x* operations.

The logic associated with the flip-flop B2 is shown in FIGURE 33. In FIGURE 33, an "or" gate 300 is connected to the input terminal $b_2$ of the flip-flop B2, and an "or" gate 302 is connected to the input terminal $\overline{b_2}$ of that flip-flop. A plurality of "and" gates 304, 306, 308, 310 and 312 is connected to the "or" gate 300. A plurality of "and" gates 314, 316, 318, 320 and 322 is connected to the "or" gate 302. The terms $L5.K5+L2.\overline{K3}$ and #Q1 are applied to the "and" gate 304. The terms #R1, #F1 and P1 are applied to the "and" gate 306. The term Q5 is applied to the "and" gate 308, and an "or" gate 324 is connected to the "and" gate. A plurality of "and" gates 326, 328 and 330 is connected to the "or" gate 324. The terms K4, #F5, $\overline{Q2}$, $\overline{Q3}$ and $\overline{Q4}$ are applied to the "and"

gate 310. The terms $\overline{K4}$, $\overline{K5}$, $\overline{K6}$ and Q1 are applied to the "and" gate 312. An "or" gate 332 is also connected to the "and" gate 312. A pair of "and" gates 334 and 336 is connected to the "or" gate 332. The terms $\overline{W2}$, S, $P0/P5$ are applied to the "and" gate 334. The terms W2, $\overline{S}$ and P5 are applied to the "and" gate 336.

The terms #F1 and P0 are applied to the "and" gate 314. The term #Q1 is applied to the "and" gate 316, and an "or" gate 338 is also connected to that "and" gate. A pair of "and" gates 340 and 342 is connected to the "or" gate 338. The terms $\overline{L5}$ and K3 are applied to the "and" gate 340. The terms $\overline{L2}$ and $\overline{K3}$ are applied to the "and" gate 342. The terms K5, $\overline{Q3}$ and P0 are applied to the "and" gate 318. The terms Q2, Q5 and $\overline{P21}$ are applied to the "and" gate 320. An "or" gate 344 is connected to the "and" gate 322, and the terms $\overline{K4}$, $\overline{K5}$ and $\overline{K6}$ are also introduced to that "and" gate. A pair of "and" gates 346 and 348 is connected to the "or" gate 344. The terms W2, $\overline{S}$ and P0–P5 are introduced to the "and" gate 346. The terms $\overline{W2}$, S and P5 are introduced to the "and" gate 348.

During the multiplication operation the flip-flop B2 holds the multiplier bits ($2^1$, $2^3$, $2^5$ . . .) for the partial products. The term $\#F1.P0$ applied to the "and" gate 314 resets the flip-flop B2 false at P0 bit time in the first word time of the multiplication operation, so that the term $\#F1.\#R1.P1$ applied to the "and" gate 306 can set the multiplier bits into the flip-flop B2 at P1 bit time in the first word time.

The term $U3.\overline{L1}.L2.\overline{Q3}$ applied to the "and" gate 326, the term $\overline{L3}.Q2.\overline{Q3}$ applied to the "and" gate 328, the term $Q2.Q3.\overline{P21}$ applied to the "and" gate 330, and the term $Q2.Q5.\overline{P21}$ applied to the "and" gate 320, fulfill the logical requirements for the multiplication operation during the additional word states. The terms applied to the "and" gates 328, 330 and 320 provide the reversing of the multiplier bits at sign digit time. The $\overline{P21}$ qualifier applied to the "and" gates 330 and 320 prevent interference with the terms applied to the "and" gates 304 and to the "or" gate 338. The term applied to the "and" gate 326 allows the new multiplier bits to be set into the flip-flop B2 at the proper times.

The terms applied to the "and" gates 304 and 316 provide for setting the information from the track selection flip-flops into the flip-flop B2 at the beginning of the S*t*, S*h*, T*r* and C*t* operations. This information is a code which specifies which of the variations of these operations is to be performed. The logic allows the flip-flop B2 to read the flip-flop L5 at the end of an upper instruction operation and to read the flip-flop L2 at the end of a lower instruction operation.

The terms applied to the "and" gate 310 and 318 allows the flip-flop B2 to be used to control the inputs to the flip-flops D2 and D3 when the $Su_s$ operation is in the additional word time states. The term applied to the "and" gate 318 resets the flip-flop B2 at P0 bit time of the first word time of this operation, and the term applied to the "and" gate 310 sets the flip-flop B2 true when the first word time of this operation occurs in the computer control states 60 or 70.

The terms applied to the "and" gates 312 and 322 allow the flip-flop B2 to compare the $\gamma$ sector and actual sector (from S) in the computer control state 10 during the M*b*, M*d*, S*q* and D*v* operations. This indicates whether or not the $\gamma$ operand will be found within the next 32 word times. The logic in these terms is borrow logic for the subtraction $\gamma-\delta$ from the bit time P0 through the bit time P4. Then, at the bit time P5, the flip-flop B2 has sum logic introduced to it, since only the sign of the subtraction is of interest, combining the borrow and sum logic results in the terms illustrated.

Since the flip-flop B2 is not reset false upon entering the computer control state 10, the results obtained when $\gamma-\delta=32$ will differ, depending upon whether the flip-flop B2 starts out true or false. Therefore, care must be taken to be sure that the $\gamma$ sector is never 32 words away from the sector in which the subtraction occurs.

The term $K5.\overline{Q3}.P0$ applied to the "and" gate 318 is required for the B*r* operation to allow the flip-flop D3 to read the read amplifier U2 at P21 bit time of the additional word states. It should be noted that the term #F3 does not include B*r* at P21 of additional word times, because the flip-flop Q3 gets set at P20 bit time to indicate the last word time.

The flip-flop B2 is not used during the A*d*, S*u*, A*c* and E*x* operations.

An "or" gate 350 in FIGURE 34 is connected to the input terminal $c_1$ of the flip-flop C1. The flip-flop C1 of FIGURE 34 serves as carry-borrow control flip-flop for the adder-subtractor 20 in the arithmetic unit of FIGURE 8. An "or" gate 352 is connected to the input terminal $\overline{c_1}$ of the flip-flop C1. A plurality of "and" gates 354, 356, 358 and 360 is connected to the "or" gate 350. A plurality of "and" gates 362, 364, 366 and 368 is connected to the "or" gate 52. An "or" gate 370 is connected to the "and" gate 354, and the terms D1 and D2 are applied to that "and" gate. An "or" gate 372 is connected to the "and" gate 356, and the terms #F4, $\overline{Q1}$ and $\overline{P21}$ are introduced to the "and" gate. An "or" gate 374 is connected to the "and" gate 358, and the terms $\overline{D1}$ and D2 are also introduced to that "and" gate. The terms $\overline{B1}$, D6, Q2, Q5 and P0 are introduced to the "and" gate 360.

An "or" gate 376 is connected to the "and" gate 362, and the terms $\overline{D1}$ and $\overline{D2}$ are introduced to the "and" gate 362. An "or" gate 378 is connected to the "and" gate 364, and the terms #F4 and $\overline{Q1}$ are introduced to that "and" gate. An "or" gate 380 is connected to the "and" gate 366, and the terms D1 and $\overline{D2}$ are also introduced to that "and" gate. An "or" gate 382 is connected to the "and" gate 368, and the term P0 is introduced to the "and" gate 368.

A plurality of "and" gates 384, 386 and 388 is connected to the "or" gate 370. A pair of "and" gates 390 and 392 is connected to the "or" gate 372. A plurality of "and" gates 394, 396 and 398 is connected to the "or" gate 374. A group of "and" gates 400, 402, 404 is connected to the "or" gate 376, and the term #F1 is also introduced to that "or" gate. A pair of "and" gates 406 and 408 is connected to the "or" gate 378 and the term B21 is also introduced to that "or" gate. A plurality of "and" gates 410, 412 and 414 is connected to the "or" gate 380. A group of "and" gates 416, 418 and 420 is connected to the "or" gate 382.

The term $\overline{P0}$ is introduced to the "and" gate 384, and an "or" gate 421 is also connected to the "and" gate 384. The terms #F1 and $\overline{K6}.Q4(\overline{Q1}+Q2)$ are introduced to the "or" gate 421. The terms $\overline{Q3}$ and Q5 are introduced to the "and" gate 386. The terms D5, Q1 and Q6 are introduced to the "and" gate 388. The terms U1 and B1 are introduced to the "and" gate 390. The terms D1, $\overline{B1}$ and $\overline{P0}$ are introduced to the "and" gate 392. The terms $\overline{Q2}$, $\overline{P0}$ and $\overline{Q1}.\overline{Q4}+Q1.Q3$ are introduced to the "and" gate 394. The terms Q6 and $\overline{D5}.P0+\overline{Q1}$ are introduced to the "and" gate 396.

The terms $\overline{K5}$, K6 and Q3 are introduced to the "and" gate 398. The terms $\overline{K6}$, Q4 and $\overline{Q1}+Q2$ are introduced to the "and" gate 400. The terms $\overline{Q3}$ and Q5 are introduced to the "and" gate 402. The terms D5, Q1 and Q6 are introduced to the "and" gate 404. The terms $\overline{U1}$ and B1 are introduced to the "and" gate 406. The terms $\overline{D1}$ and $\overline{B1}$ are introduced to the "and" gate 408. The terms $\overline{Q2}$ and $\overline{Q1}.\overline{Q4}+Q1.Q3$ are introduced to the "and" gate 410. The terms $\overline{K5}.K6$ and Q3 are introduced to the "and" gate 412. The terms $\overline{D5}$ and Q6 are introduced to the "and"

gate 414. The terms $\overline{K5}$ and $\overline{K6}$ are introduced to the "and" gate 416. The terms K5 and $\overline{B1}+Q1+Q2+Q4$ are applied to the "and" gate 418. The terms Q1 and $\overline{Q4}$ are applied to the "and" gate 420.

The C1 flip-flop is used as a carry or borrow control flip-flop for the adder 20 in FIGURE 8 for all operations except the shift operation (S*h*). For the shift operation (S*h*), the flip-flop C1 is used as a delay flip-flop. During the multiplication operations the flip-flop C1 is used as a carry for addition for all word times except the last word time. During the last word time, the flip-flop C1 is used as a borrow for subtraction. The terms $\overline{K5}$ and $\overline{K6}$ applied to the "and" gate 416, and the terms K5 and Q4 applied to the "and" gate 418, provide a reset for the flip-flop C1 at P0 bit time of the first word time of the multiplication operations.

The term #F1 applied to the "or" gate 421 and the term #F1 applied to the "or" gate 376 provide carry logic during the first word time of the multiplication operations; and the terms $\overline{Q3}$ and Q5 applied to the "and" gate 386 and $\overline{Q3}$ and Q5 applied to the "and" gate 402, provide carry logic during all the additional word times, except the last word time. The reset after the final partial product of each multiplier bit is provided by the terms $\overline{Q3}$ and Q5, applied to the "and" gate 402, at $\overline{L1}.L2$ in the additional word times of the multiplication operations. During the last additional word time of the multiplication operations, the flip-flop C1 provides borrow logic for the adder 22 in FIGURE 8, as noted above. The terms $\overline{K5}$, K6 and Q3 applied to the "and" gate 398, and the terms $\overline{K5}$, K6 and Q3 applied to the "and" gate 412 provide this logic.

A "+1" correction is required at sign digit time of the first partial product during the multiplication operations when the multiplicand is negative, and when the least multiplier bit is a zero. The terms $\overline{B1}$, D6, Q2, Q5 and P0 applied to the "and" gate 360 provide this correction. The term $\overline{B1}$ of these terms is the multiplier bit, the term D6 is the sign digit of the multiplicand, and the terms Q2, Q5, P0 identify the P0 bit time of the first additional word time of the multiplication operations.

During the division operation, the C1 flip-flop is used as a carry or borrow for the adder-subtractor 20 of FIGURE 8. For this operation the terms Q1 and $\overline{Q4}$ applied to the "and" gate 420 reset the flip-flop C1 at P0 bit time of the first word time of a division operation. The flip-flop C1 will remain false for the first word time of the division operation because the term D2 is never true. The add-subtract control for the flip-flop C1 is contained in the flip-flop D5. When the flip-flop D5 is true, the flip-flop is a carry for the addition operation, as shown by the term D5, Q1 and Q6 applied to the "and" gate 388, and by the terms B5, Q1 and Q6 applied to the "and" gate 404. When the flip-flop D5 is false, on the other hand, the flip-flop C1 acts as a borrow for subtraction, as shown by the terms $\overline{D5}$, $\overline{P0}$ applied to the "and" gate 396, and the terms $\overline{D5}$, Q6 applied to the "and" gate 414.

It should be noted that the terms $\overline{K5}$, K6 and Q3 applied to the "and" gate 398, and the terms $\overline{K5}$, K6 and Q3 applied to the "and" gate 412, provide subtract logic during the last word time of the division operation. However, since the flip-flops D1 and D2 are both false throughout this word time, no subtraction will occur. It should also be noted that the terms Q1 and Q3 applied to the "and" gate 394, and the terms Q1 and Q3 applied to the "and" gate 410, provide subtract logic for the flip-flop C1 during the last word time of the division operation.

During the square root operation (S*q*), the flip-flop C1 is used as a carry or borrow flip-flop for the adder-subtractor 20 in FIGURE 8. The logic for the flip-flop C1 is the same for the square root operation as it is for the division operation described above.

During the left shift operation, the flip-flop C1 is used to provide a delay for the LSD accumulator register of FIGURE 1. For the right shift operation, the C1 flip-flop is not required, however, the logic remains the same on the flip-flop as for the left shift operaton. The terms #F4, $\overline{Q1}$, $\overline{P21}$ applied to the "and" gate 356; the terms U1 and B1 applied to the "and" gate 390; and the terms D1, $\overline{B1}$ and $\overline{P0}$ applied to the "and" gate 392; as well as the terms applied to the "and" gate 364, to the "or" gate 378, and to the "and" gates 406, 408 and 410, are used to enable the C1 flip-flop to be used for the delay flip-flop for the left shift operation. In these terms, the term B1 indicates a one-bit shift to the left, and the term $\overline{B1}$ indicates a two-bit shift to the left. For a one-bit shift to the left, the flip-flop C1 reads the read amplifier U1 of the LSD accumulator register, and for a two-bit shift to the left, the flip-flop C1 reads the flip-flop D1. The P21 term applied to the "or" gate 378 provides reset for the flip-flop C1 at P21 bit time of each word time. This allows the flip-flop C1 to be zero at P0 bit time of each word time indicating no carry to the adder.

During the B*r*, T*r*, C*t* and S*t* operations, the flip-flop C1 must be false to assure that nothing is added to the LSD accumulator register during these operations. The terms $\overline{K5}$, $\overline{K6}$ applied to the "and" gate 416, and the terms $\overline{B1}+Q1+\overline{Q2}+Q4$ applied to the "and" gate 418, provide a reset for the flip-flop C1 upon entering any of these operations. The flip-flop C1 can never be set true during these operations because both the flip-flops D1 and D2 remain false throughout each of the operations.

For the A*d*, A*c* and E*x* operation, add logic is required on the flip-flop C1 for the computer control state 50. The term $\overline{K6}.Q4(\overline{Q1}+\overline{Q2})$ applied to the "or" gate 421, and the terms $\overline{K6}$, Q4, $\overline{Q1}+\overline{Q2}$ applied to the "and" gate 400, provide add logic for all the ($\overline{K6}$) computer control states. Moreover, since either the flip-flop D1 or the flip-flop D2 is false except in the computer control state 50, there is no conflict. The terms $\overline{K5}$ and $\overline{K6}$ applied to the "and" gate 416, and the terms $\overline{B1}+Q1+\overline{Q2}+Q4$ applied to the "and" gate 418, provide reset at P0 bit time for all the computer control states entered by the A*d*, A*c* and E*x* operations.

The terms Q1 and Q3 applied to the "and" gate 394, and the terms Q1 and Q3 applied to the "and" gate 410, provide borrow logic for the D1–D2 subtraction by the adder-subtractor 20 in FIGURE 8 in all the control states of the computer for the subtract operation (S*u*). The terms $\overline{K5}$ and $\overline{K6}$ applied to the "and" gate 416, and the terms applied to the "and" gate 418 provide reset of the flip-flop C1 at P0 bit time for each word time during this operation. The subtract logic is actually needed only in the computer control states 20, 40, 50, 51, 60 and 70. However, this logic cannot interfere with the computer operation in the other states, because the term D2 will be false.

For the special subtract operation ($Su_s$), the flip-flop C1 must provide the borrow logic for a double length subtraction. The $\overline{Q1}.\overline{Q4}$ terms, applied to the "and" gate 394, provide subtract logic at all the bit times except the P0 bit time for the first word time of the subtraction operation. The $\overline{Q1}$ term, applied to the "and" gate 396, provides subtract logic for the full second word time, including the bit time P0. The $\overline{Q1}.\overline{Q4}$ term, applied to the "and" gate 410, provides subtract logic for $\overline{c_1}$ for the entire two word times of the operation. The terms applied to the "and" gates 416 and 418 provide reset at P0 bit time for the flip-flop C1 in the first word time of the special subtraction operation. It should be noted that there is no P0 reset term for the flip-flop C1 for the second word time of the special subtraction operation.

The flip-flop C2 in FIGURE 35 serves as a carry control for the adder 22 in FIGURE 8. An "or" gate 426 in FIGURE 35 is connected to the input terminal $c_2$ of the flip-flop C2, and an "or" gate 428 is connected to the input terminal $\overline{c_2}$ of the flip-flop C2. A plurality of "and" gates 430, 432, and 434 is connected to the "or" gate 426. A group of "and" gates 436, 438, 440 and 442 is connected to the "or" gate 444.

The terms #A1 and B3 are introduced to the "and" gate 430 and an "or" gate 446 is conected to that "and" gate. A plurality of "and" gates 448, 450, 452 and 454 is connected to the "or" gate 446. The term $\overline{P0}$ is introduced to the "and" gate 448, and an "or" gate 456 is also connected to the "and" gate 448. A pair of "and" gates 458 and 460 is connected to the "or" gate 456. The terms K5 and $\overline{Q3}+Q4$ are introduced to the "and" gate 458. The terms $\overline{K5}$ *and* $\overline{K6}+\overline{Q4}$ are introduced to the "and" gate 460. The terms $\overline{Q1}$ and $Q6$ are introduced to the "and" gate 450. The terms Q5 and $L1+\overline{L2}$ are introduced to the "and" gate 452. The terms $\overline{K5}$, K6 and Q3 are introduced to the "and" gate 454.

The terms $\overline{\#A2}$, Q3, Q6 and P0 are introduced to the "and" gate 432. The terms #F4, $\overline{Q1}$ and $\overline{P21}$ are introduced to the "and" gate 434. An "or" gate 462 is connected to the "and" gate 434, and a pair of "and" gates 464 and 466 is connected to the "or" gate 462. The term $\overline{B1}$ is introduced to the "and" gate 464 and the term $D4.P0+D2.\overline{P0}$ is also introduced to the "and" gate 464. The terms U2 and B1 are introduced to the "and" gate 466.

The terms $\overline{\#A1}$, $\overline{D3}$ and $\overline{K5}+\overline{Q3}+Q4$ are introduced to the "and" gate 436. The term P0 is introduced to the "and" gate 438, and an "or" gate 468 is also connected to the "and" gate 438. A group of "and" gates 470, 472 and 474 is connected to the "or" gate 468. The terms $\overline{K5}$ and $\overline{K6}$ are applied to the "and" gate 470. The terms Q1, $\overline{Q4}$ and $\#A2+\overline{Q3}$ are applied to the "and" gate 472. The terms K5 and $Q1+\overline{Q2}+\overline{Q3}+Q4$ are applied to the "and" gate 474. The terms $\overline{L1}$, L2, $\overline{Q3}$ and Q5 are introduced to the "and" gate 440. The terms #F4 and $\overline{Q1}$ are introduced to the "and" gate 444, and an "or" gate 476 is also connected to that "and" gate. A pair of "and" gates 478 and 480 is connected to the "or" gate 476. The digit timing term P21 is also introduced to the "or" gate 476. The terms $\overline{B1}$ and $\overline{D4}.P0+\overline{D2}.\overline{P0}$ are introduced to the "and" gate 478. The terms $\overline{U2}$ and B1 are introduced to the "and" gate 480.

The flip-flop C2 is used as a carry for the adder 22 in FIGURE 8 for all operations except for S*h* operation. For the shift (S*h*) operation, the flip-flop C2 is used as a delay flip-flop.

For the multiplication operations, the flip-flop C2 functions only as a carry flip-flop. The terms K5 and $\overline{Q3}+Q4$ applied to the "and" gate 458, and the terms $\overline{K5}$ and $\overline{K6}+\overline{Q4}$ applied to the "and" gate 460 provide the set logic for the first word time of the multiplication operations; and the terms Q5 and $L1+\overline{L2}$ and $\overline{K5}$, K6 and Q3 applied respectively to the "and" gates 452 and 454 provide the set logic for the flip-flop C2 during the additional word times of the multiplication operation.

The term $\overline{K5}+\overline{Q3}+Q4$ applied to the "and" gate 436 provides the false side of the carry logic during all the word times of the multiplication operation. The terms $\overline{K5}$ and $\overline{K6}$ are applied to the "and" gate 470, and the term $\#A2+\overline{K3}$ applied to the "and" gate 472, provide the P0 reset for the flip-flop C2 at the start of each first word time during the multiplication operations. The terms $\overline{L1}$, L2, $\overline{Q3}$ and Q5 applied to the "and" gate 440 provide the reset of the flip-flop C2 during the additional word times of the multiplication operations. It should be noted that the terms applied to the "and" gate 206 of the $\overline{q_1}$ logic in FIGURE 26, provide that any carry generated in #A2 at $\overline{L1}.L2$ in the additional word time is set into $\overline{Q2}$. Therefore, the flip-flop C2 can be reset at this time to hold any carry generated in #A2 by the partial product of the new multiplier bit.

The flip-flop C2 is used as a carry for the adder 22 in FIGURE 8 during the division (D*v*) operation. The $\overline{Q3}$ term applied to the "and" gate 472 provides reset for the first and all the additional word time during the division operation, except for the last word time. The $\overline{Q4}$ term applied to the "and" gate 460 and the $\overline{Q3}$ term applied to the "and" gate 436 provide a normal carry logic during the first and additional word times of the division operation (D*u*).

The terms applied to the "and" gate 432, and the #A2 term applied to the "and" gate 472, provide the round off correction for the last word time of the division operation. It should be noted that there is no conflict between the terms $\overline{K5}$, K6 and Q3 applied to the "and" gate 454, and the terms $\overline{\#A2}$, Q3, Q6 and P0 applied to the "and" gate 432; or between the $\overline{K5}$ term applied to the "and" gate 436, and the #A2 term applied to the "and" gate 472.

During the square root operation (S*q*), the flip-flop C2 is used as a carry for the full adder 22. In the last word time of the square root operation, the flip-flop C2 provides the correction to give the correct least bit of the square root. The terms applied to the "and" gate 432 and to the "and" gate 472 provide for this correction. It should be noted that the logic for the flip-flop C2 is the same during the square root operation as for the division operation.

During the shift operation (S*h*), the flip-flop C2 is used to provide a delay for the MSD accumulator register. The term applied to the "and" gate 434, to the "or" gate 462, and to the "and" gate 464 and 466, as well as the terms applied to the "and" gate 444, the "or" gate 476, and to the "and" gate 478 and 480 are used for this shift operation. In the logic referred to above, the term $\overline{B1}$ indicates one-bit left shift, and the term B1 indicates a two-bit left shift. The $D4.P0$ part of the term applied to the "and" gate 464 permits the flip-flop C2 to read the most significant bit of the LSD accumulator register of FIGURE 1 at P0 bit time during a two-bit left shift. For the two-bit left shift the flip-flop C2 then reads the flip-flop D2 at P0 bit time. The terms applied to the "and" gate 466, and to the "and" gate 480, allows the flip-flop C2 to read the read amplifier U2 for a one-bit left shift. The term P21 applied to the "or" gate 476 provides a reset at P21 bit time for the C2 flip-flop to make that flip-flop false at P0 bit time for the adder 22 of FIGURE 8.

During the B*r*, T*r*, C*t* and S*t* operations, the flip-flop C2 must be false to prevent any addition to the accumulator register. The terms $\overline{K5}$ and $\overline{K6}$ applied to the "and" gate 470, and the terms applied to the "and" gate 474, provide a reset for the flip-flop C2 upon entering any one of these operations. The flip-flop C2 can never be set true during these operations because the term #A1 remains false throughout each operation.

Add logic on the flip-flop C2 is provided for the A*d*, A*c*, S*u* and E*x* operations by the Q4 part of the terms applied to the "and" gate 458 when the computer is in control states 40, 50, 60, 70, 41, 51, 61, and 71. The $\overline{K6}$ term applied to the "and" gate 460 provides add logic in the computer control states 00, 10, 20 and 30. The Q4 term applied to the "and" gate 436 provides the reset carry logic in all the computer control states. The terms $\overline{K5}$ and $\overline{K6}$ applied to the "and" gate 470, and the term Q4 applied to the "and" gate 474, provides reset for the flip-flop C2 at P0 bit time in all control states.

During the special subtract ($Su_s$) operation, the flip-flop C2 must provide carry logic for a full double-length addition. The $\overline{Q3}$ part of the term applied to the "and" gate 458 provides the carry logic for the first word time, and the terms $\overline{Q1}$ and Q6 applied to the "and" gate 450, provide the carry logic for the second word time of the special subtract operation. The $\overline{Q3}$ term applied to the "and" gate 436 provides logic for $\overline{c_1}$ during the first word time, and the $\overline{K5}$ term applied to the "and" gate 436 provides the logic for the $\overline{c_1}$ input terminal for the second word time. The terms $\overline{K5}$ and $\overline{K6}$ applied to the "and" gate 470, and the terms applied to the "and" gate 474, provide reset at the start of the special subtract operation.

Figure 36:
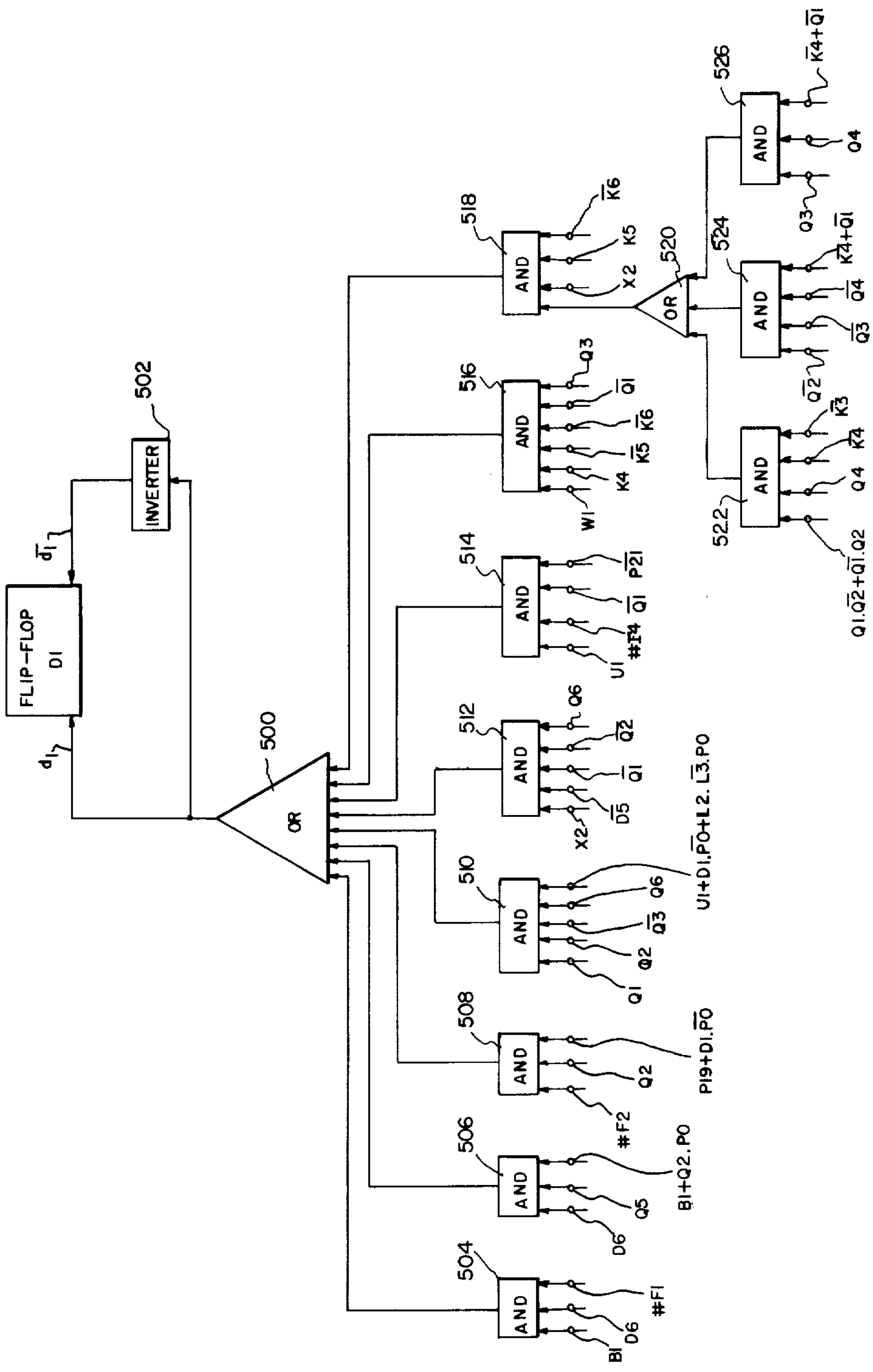

The logic associated with the flip-flop D1 is illustrated in FIGURE 36. An "or" gate 500 is connected to the input terminal $d_1$ of the flip-flop D1, and the "or" gate 500 is connected through an inverter 502 to the input terminal $\overline{d_1}$ of the flip-flop. A group of "and" gates 504, 506, 508, 510, 512, 514, 516 and 518 is connected to the "or" gate 500. The terms B1, D6, #F1 are introduced to the "and" gate 504. The terms D6, Q5 and $B1+Q2.P0$ are introduced to the "and" gate 506. The terms #F2, Q2 and $P19+D1+\overline{P0}$ are introduced to the "and" gate 508. The terms Q1, Q2, $\overline{Q3}$, Q6 and $$U1+D1.\overline{P0}+L2.\overline{L3}.P0$$

are introduced to the "and" gate 510. The terms X2, $\overline{D5}$, $\overline{Q1}$, $\overline{Q2}$ and Q6 are introduced to the "and" gate 512. The terms U1, #F4, $\overline{Q1}$ and $\overline{P21}$ are introduced to the "and" gate 514. The terms W1, K4, $\overline{K5}$, $\overline{K6}$, $\overline{Q1}$ and Q3 are introduced to the "and" gate 516.

An "or" gate 520 is connected to the "and" gate 518. The terms X2, K5 and $\overline{K6}$ are introduced to the "and" gate 518. A group of "and" gates 522, 524 and 526 is connected to the "or" gate 520. The terms $$Q1.\overline{Q2}+\overline{Q1}.Q2.\overline{K4}.\overline{K3}$$

are introduced to the "and" gate 522. The terms $\overline{Q2}$, $\overline{Q3}$, $\overline{Q4}$ and $K4+\overline{Q1}$ are introduced to the "and" gate 524. The terms Q3, Q4 and $\overline{K4}+\overline{Q1}$ are introduced to the "and" gate 526.

The D1 flip-flop is used primarily to select one of the inputs to the adder 20 in FIGURE 8. The flip-flop D1 serves this purpose for all operations except the shift (S*h*) operation. In the shift operation the flip-flop D1 is used as a delay flip-flop.

For the multiplication operation, the flip-flop D1 performs the partial product of the even powered multiplier bits and the multiplicand. The terms B1, D6 and $\overline{F1}$ applied to the "and" gate 504 provide the partial product in the first word time of the multiplication operations.

For all additional word times of the multiplication operations, the B1 term applied to the "and" gate 506 provides partial product. The $Q2.P0$ term applied to the "and" gate 506 identifies the first additional word time. At this time the flip-flop D1 is set by the term D6, the sign bit of the multiplicand, in order to provide part of the correction necessary when the multiplicand is negative. The terms applied to the "and" gate 360 in FIGURE 34 provide the other part of the correction. The term applied to the "and" gate 522 allows the $\beta$ operand to be added to the accumulator register for the (M*d*) and (M*c*) multiplication operations when the computer is in the control state 40.

The flip-flop D1 is used primarily to select one of the inputs to the #A1 to the adder 20 during the division operation. However, there is no input to the flip-flop D1 during the division operation, with the exception of the first word time of the division in the computer state 50. In the latter instance, data is read into the flip-flop D1 and added to the accumulator through the adders 20 and 22 in FIGURE 8. The K4 term applied to the "and" gate 524 provides for the addition of data during the states 40 and 50. During the additional word time of the division operation there is no term in logic of FIGURE 36 which is true. Therefore, the inversion of the logic will set the flip-flop D1 false, and the flip-flop D1 will remain false through all the additional word times of the division operation.

During the square root operation, the flip-flop D1 is used to subtract $2^{-i-1}$ (in two's complement form) each word time. Since no term in the logic of FIGURE 36 is true until P19 bit time of the first word time, the flip-flop D1 is reset false at P0 time. During the first word time the terms applied to the "and" gate 508 sets the flip-flop D1 true at P19 bit time. The $D1.\overline{P0}$ term applied to the "and" gate 508 is necessary to maintain the flip-flop D1 true for the rest of the word time due to the inverter logic.

The terms applied to the "and" gate 510 control the flip-flop D1 in the additional word times of the square root operation. The U1 term introduced to the "and" gate 510 is the leader bit, and this term sets the flip-flop D1 true each word time. The term $D1.\overline{P0}$ introduced to the "and" gate 510 maintains the flip-flop D1 true once it has been so set. The $L2.\overline{L3}.P0$ term introduced to the "and" gate 510 prevents the flip-flop D1 from being reset false at P0 bit time of the next to last word time, when the least significant bit of the accumulator ($\overline{L3}$) is zero. There is no term in the logic of FIGURE 36 which is true in the last word time of the square root operation, therefore, the flip-flop D1 is reset false at that time and remains false for the entire last word time.

During the shift operation (S*h*) the D1 flip-flop provides delay for the LSD accumulator register. The terms applied to the "and" gate 514 allow the flip-flop D1 to be reset to be false at P0 bit time. This indicates that the flip-flop D1 is false at P0 bit time in the adder 20. The terms applied to the "and" gate 514 are true only in the control state in which the term K5 is true. In all other control states of the computer which a shift operation may enter, no term in the logic of FIGURE 36 is true and, therefore, the flip-flop D1 is false.

During the B*r*, T*r*, C*t*, S*t* operations there is no term in the logic of FIGURE 36 which is true. This means that, due to the inverter 502, the flip-flop D1 will be reset false and will remain false throughout each of these operations. It should be noted that the transfer operation is not programmed for the control states 20 or 30 of the computer.

For the operations A*d* and A*c*, the flip-flop D1 provides the control for one input of the adder 20 in FIGURE 8. In the control states 20 and 30 of the computer the flip-flop D1 reads the $\beta$ operand from W1, as provided by the terms introduced to the "and" gate 516. The $\overline{Q1}$ term applied to the "and" gate 516 allows the flip-flop D1 to copy from the output of the read amplifier X2, the $\beta$ operand in the computer control states 40 or 50, or the $\gamma$ operand in the computer control states 60 and 70. For these operations there are no true terms in the logic of FIGURE 36 in the computer control states 00, 10, 41, 51, 61 or 71, and, therefore, the flip-flop D1 is reset false and remains false due to the action of the inverter 502.

During the subtract operation the $\beta$ operand is read into the flip-flop D1 from X2 in the computer control states 40 and 50. This is provided by the $\overline{K4}$ term introduced to the "and" gate 522. There are true terms in the logic of FIGURE 36 for the subtract operation, only when the computer is in the control states 40 and 50 and, therefore, in all other states, the flip-flop D1 will be reset false and will remain false.

During the special subtract (S$u_s$) operation, the flip-flop D1 must read into the adder 20 of FIGURE 8 either the $\beta$ or $\gamma$ double length operand from the read amplifier X2 of FIGURE 1. The $\overline{Q1}$ part of the terms applied to the "and" gate 524 allow the flip-flop D1 to read the read amplifier X2 in the computer control states 40, 50, 60 or 70, these control states occurring during the first word time of the subtraction operation. The terms applied to the "and" gate 512 allow the flip-flop D1 to read the read amplifier X2 in the second word time of the subtraction operation when the additional word state was entered from the control state 50, 60 or 70; the D5 term indicating that a $\beta$ or $\gamma$ operand is involved in the operation. When the additional word state was entered from the computer control state 51, the flip-flop D5 is true, and, therefore, the term applied to the "and" gate 512 is not true and the flip-flop D1 remains false.

During the extract operation (E$x$), the operand is read into the D1 flip-flop from the read amplifier X2 during the computer control states 4 and 5. The $\overline{K4}$ term applied to the "and" gate 524 allows such an operation. In all other control states, the flip-flop D1 should be false, and this is provided by the fact that there is no true term in the logic of FIGURE 36 in any of the other control states for the extract operation.

Figure 37:
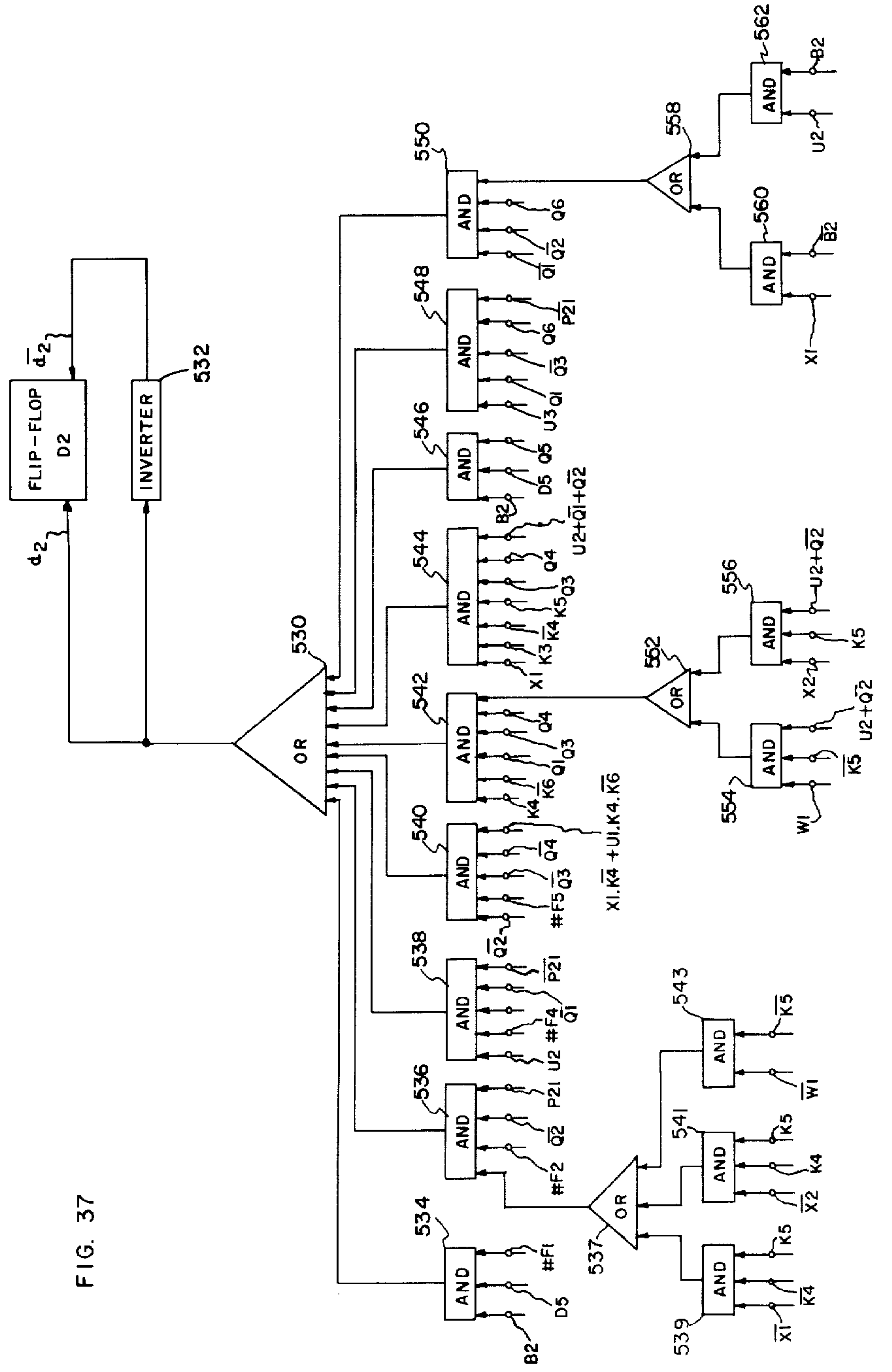

The logic associated with the flip-flop D2 is illustrated in FIGURE 37. An "or" gate 530 is connected to the input terminal $d_2$ of the flip-flop and to an inverter 532. The output terminal of the inverter is connected to the input terminal $d_2$ of the flip-flop D2. A plurality of "and" gates 534, 536, 538, 540, 542, 544, 546, 548 and 550 is connected to the "or" gate 530. The terms B2, D5 and #F1 are introduced to the "and" gate 534. The terms #F2, $\overline{Q2}$ and P21 are introduced to the "and" gate 536. The terms U2, #F4, $\overline{Q1}$ and $\overline{P21}$ are introduced to the "and" gate 538. The terms $\overline{Q2}$, #F5, $\overline{Q3}$, $\overline{Q4}$, $X1.\overline{K4}+U1.K4.\overline{K6}$ are introduced to the "and" gate 540. The terms K4, $\overline{K6}$, Q1, Q3 and Q4 are introduced to the "and" gate 542. An "or" gate 537 is connected to the "and" gate 536; and a plurality of "and" gates 539, 541 and 543 is connected to the "or" gate. The terms $\overline{X1}$, $\overline{K4}$ and K5 are introduced to the "and" gate 539; the terms $\overline{X2}$, K4 and K5 are introduced to the "and" gate 541; and the terms $\overline{W1}$ and $\overline{K5}$ are introduced to the "and" gate 543.

An "or" gate 552 is also connected to the "and" gate 542, and a pair of "and" gates 554 and 556 is connected to the "or" gate 552. The terms W1, $\overline{K5}$, $U2+\overline{Q2}$ are introduced to the "and" gate 554. The terms X2, K5, $U2+\overline{Q2}$ are introduced to the "and" gate 556. The terms X1, K3, $\overline{K4}$, K5, Q3, Q4, $U2+\overline{Q1}+\overline{Q2}$ are introduced to the "and" gate 544. The terms B2, D5 and Q5 are introduced to the "and" gate 546. The terms U2, Q1, $\overline{Q3}$, Q6 and $\overline{P21}$ are introduced to the "and" gate 548. The terms $\overline{Q1}$, $\overline{Q2}$ and Q6 are introduced to the "and" gate 550. An "or" gate 558 is also connected to the "and" gate 550, and a pair of "and" gates 560 and 562 is connected to the "or" gate 558. The terms X1 and $\overline{B2}$ are introduced to the "and" gate 560. The terms U2 and B2 are introduced to the "and" gate 562.

The D2 flip-flop is used primarily to select one of the inputs for the adder-subtractor 20 in FIGURE 8. The input from the flip-flop D2 may be added to or subtracted from the input from the flip-flop D1. For the shift (S$h$) operation the flip-flop D2 is used as a delay flip-flop.

During the multiplication operation the flip-flop D2 performs the partial product of the even powered multiplier bits and the multiplicand. The terms B2, D5 and #F1 applied to the "and" gate 534 provide this partial product during the first word time of the multiplication operation. The terms B2, D5, Q5 applied to the "and" gate provide the partial product during all additional word states of the multiplication operation.

During the division (D$v$) operation the flip-flop D2 is the input to the adder-subtractor 20 of FIGURE 8. This input comes from the read amplifier U3 (FIGURE 1) of the multiplier or divisor register, and is the divisor which is added to (or subtracted from) the dividend, in order to form the quotient bit of the division operation. During the first word time of the division operation the flip-flop D2 is set false, and it remains false through P21 bit time. At P21 bit time the terms applied to the "and" gate 533 at P21 bit time set the bar of the sign digit of the divisor into the flip-flop D2. During the additional word times of the division operation the terms introduced to the "and" gate 548 allow the flip-flop D2 to read the divisor from the read amplifier U3 at all bit times except P21. Therefore, the flip-flop D2 will be reset false at P21 bit time. During the last word time of the division operation there is no term in the logic of FIGURE 37 which is true. Therefore, the flip-flop D2 remains false during the last word time of the division operation.

For the square root operation the flip-flop D2 provides the $X_{i-1}$ input to the adder-subtractor of FIGURE 8. During the first word time of the square root operation $X_{i-1}$ is zero, and, therefore, no term in the logic of FIGURE 37 is true. The terms applied to the "and" gate 548 provide $X_{i-1}$ from the read amplifier U3 during all the additional word times except the last word time. The $\overline{P21}$ term applied to the "and" gate 548 causes the flip-flop D2 to be reset false at P21 bit time of each additional word time.

During the shift operation (S$h$) the D2 flip-flop provides the delay for the M.S.D. accumulator register of FIGURE 1. The terms applied to the "and" gate 538 allow the flip-flop D2 to read the read amplifier U2 during the shift operation. The $\overline{P21}$ term applied to the "and" gate 538 provides a reset at P21 bit time for the flip-flop D2, so that the flip-flop will be false at P0 time, indicating a zero input to the adder-subtractor 20 of FIGURE 8. The terms applied to the "and" gate 538 are true only in the computer control states in which the term K5 is true. In all other control states of the computer in which the shift operation may enter, no term in the logic of FIGURE 37 is true, and, therefore, the flip-flop D2 is false.

During the D$r$, T$r$, C$t$ and S$t$ operations there is no term in the logic of FIGURE 37 which is true. This means that due to the inverter 532, the flip-flop D2 will be reset false, and will remain false throughout these operations.

During the A$d$ and A$c$ operation the $\alpha$ operand is read from the read amplifier X1 in FIGURE 1 into the adder-subtractor 20 of FIGURE 8 through the flip-flop D2, and this occurs during the computer control states 50 and 51. The term $\overline{Q1}$ applied to the "and" gate 544 provides for this operation. The computer control states 50 and 51 are the only states in which there can be a true term in the logic of FIGURE 37. Therefore, the flip-flop D2 will be reset and will remain false in all other states.

For the upper subtract operation the $\alpha$ operand is read into the flip-flop D2 from the read amplifier X1, then the computer is in the control state 50 and 51. The $\overline{Q2}$ term applied to the "and" gate 544 allows this read in operation. For the lower subtract operation the flip-flop D2 reads the $\gamma$ operand from the read amplifier W1 in the computer control states 20 and 30, as provided by the Q2 term applied to the "and" gate 554. In all the other control states of the computer there is no true logic for the subtract operations, and, therefore, the flip-flop D2 will be reset and remain false.

During the special subtract (S$u_s$) operation the flip-flop D2 must read a double length number into the adder 20 of FIGURE 8. For the upper operation this number is the $\alpha$ operand and it comes from the read amplifier X1. This is provided by the terms X1, $\overline{K4}$ applied to the the "and" gate 540, and by the terms X1, $\overline{B2}$ applied to the "and" gate 560. For the lower operation this number is the contents of the L.S.D. accumulator register, as provided by the term $U1.K4.\overline{K6}$ applied to the "and" gate 540, and by the terms U2 and B2 applied to the "and" gate 562. It should be noted that the flip-flop B2 is used for control purposes in the additional word states of the special subtract operation. It should also be noted that the computer control states 20, 21, 30, 40 and 41 are not programmed for the special subtract operation. The flip-flop D2 is reset false, and it remains false in the computer control states 00 and 10 since there is no true logic for the S$u_s$ operation in these states.

During the extract operation (E$x$) the "extracting" or logical "and" is performed by the flip-flop D2. For the upper operation this is a $Am.\gamma$, and the operation is performed by the output of the read amplifier U2, of FIGURE 1 being applied to the "and" gate 544 in computer control states 50 or 51. For the lower operation the extract is $Am.\gamma$, and the latter operation is performed by the U2 output being applied to the "and" gate 554 in the computer control states 20 and 30, and by the U2 output being applied to the "and" gate 556 in the computer control states 60 and 70. In all other control states of the computer the flip-flop D2 is set false by the inverter 532.

Figure 38:
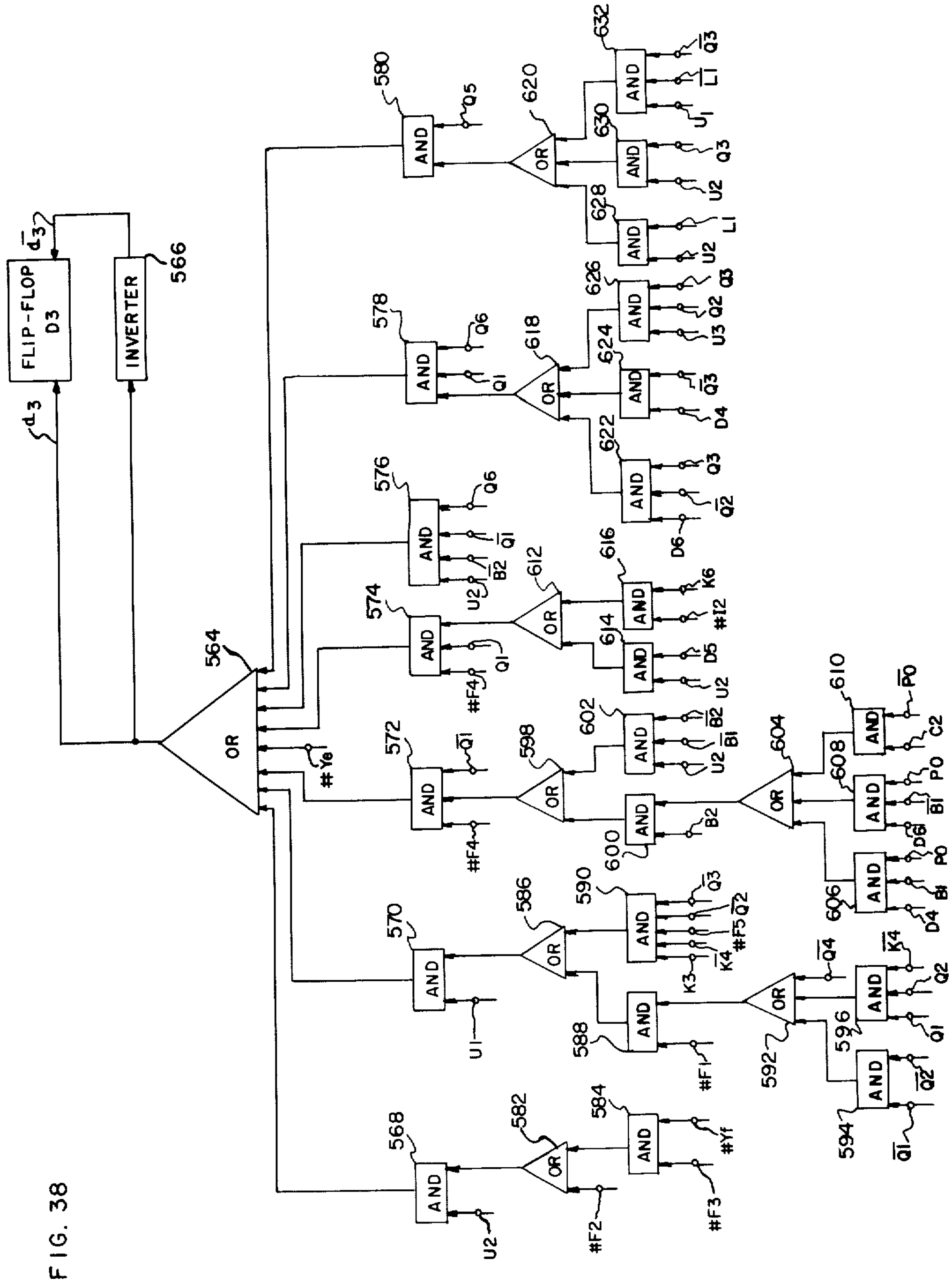

The logic associated with the flip-flop D3 is illustrated in FIGURE 38. An "or" gate 564 is connected to the input terminal $d_3$ of the flip-flop D3 and the "or" gate is connected through an inverter 566 to the input terminal $\overline{d_3}$ of the flip-flop. A plurality of "and" gates 568, 570, 572, 574, 576, 578 and 580 is connected to the "or" gate 564. The term #*Ye* is also introduced to the "or" gate 564. The term U2 is applied to the "and" gate 568, and an "or" gate 582 is also connected to that "and" gate. The term #F2 is introduced to the "or" gate 582, and an "and" gate 584 is connected to the "or" gate. The terms #F3 and #*Yf* are introduced to the "and" gate 584.

The term U1 is introduced to the "and" gate 570, and an "or" gate 586 is connected to the "and" gate 570. A pair of "and" gates 588 and 590 is connected to the "or" gate 586. The term #F1 is introduced to the "and" gate 588, and an "or" gate 592 is connected to the "and" gate. The terms K3, $\overline{K4}$, #F5, Q2 and Q3 are introduced to the "and" gate 590. A pair of "and" gates 594 and 596 are connected to the "or" gate 592. The terms $\overline{Q1}$ and $\overline{Q2}$ are introduced to the "and" gate 594. The terms Q1, Q2 and $\overline{K4}$ are introduced to the "and" gate 596. The term $\overline{Q4}$ is introduced to the "or" gate 592.

The terms #F4 and $\overline{Q1}$ are introduced to the "and" gate 572, and an "or" gate 598 is also connected to that "and" gate. A pair of "and" gates 600 and 602 is connected to the "or" gate 598. An "or" gate 604 is connected to the "and" gate 600 and a plurality of "and" gates 606, 608 and 610 is connected to the "or" gate 604. The term B2 is introduced to the "and" gate 600. The terms U2, $\overline{B1}$ and $\overline{B2}$ are introduced to the "and" gate 602. The terms D4, B1 and P0 are introduced to the "and" gate 606. The terms D6, $\overline{B1}$ and P0 are introduced to the "and" gate 608. The terms C2 and $\overline{P0}$ are introduced to the "and" gate 610.

The terms #F4 and Q1 are introduced to the "and" gate 574. The terms U2, $\overline{B2}$, $\overline{Q1}$ and Q6 are introduced to the "and" gate 576. An "or" gate 612 is connected to the "and" gate 574, and a pair of "and" gates 614 and 616 connected to the "or" gate 612. The terms U2 and D5 are applied to the "and" gate 614, and the terms #I2 and K6 are applied to the "and" gate 616. The terms Q1 and Q6 are introduced to the "and" gate 578, and the term Q5 is introduced to the "and" gate 580. An "or" gate 618 is connected to the "and" gate 578, and an "or" gate 620 is connected to the "and" gate 580. A plurality of "and" gates 622, 624 and 626 is connected to the "or" gate 618. A plurality of "and" gates 628, 630, and 632 is connected to the "or" gate 620.

The terms D6, $\overline{Q2}$ and Q3 are introduced to the "and" gate 622. The terms D4 and $\overline{Q3}$ are introduced to the "and" gate 624. The terms U3, Q2 and Q3 are introduced to the "and" gate 626. The terms U2 and L1 are applied to the "and" gate 628. The terms U2 and Q3 are applied to the "and" gate 630. The terms U1, $\overline{L1}$ and $\overline{Q3}$ are applied to the "and" gate 632.

The D3 flip-flop is used primarily to control one input to the full adder 22 in FIGURE 8. The delay provided by the flip-flop D3 through the adder 22 provides the proper recirculation for the MSD accumulator register. Normal circulation for the MSD accumulator register is through the read amplifier U2 and through the flip-flop D3 and the adder 22 as shown in FIGURE 8.

During the multiplication operations the flip-flop D3 controls the input to the adder 22. The input to the adder 22 must shift between the LSD accumulator read amplifier U1 and the MSD accumulator read amplifier U2 as the multiplication operation proceeds from the least significant to the most significant bit of the multiplier. The control of this shift into the flip-flop D3 is by the flip-flop L1.

During the first word time of the multiplication operations, the input to the flip-flop D3 should be from the LSD accumulator read amplifier U1 for the (M*a*) operation, for the (M*d*) operation, and for the product part of the square root (S*q*) operation. The terms applied to the "and" gate 570 provide the logic for these operations. For all other multiplication operatons, the input to the flip-flop D3 in the first word time is zero, as provided by the inversion of the term introduced to the "and" gate 570. During the additional word times of the multiplication operations the terms introduced to the "and" gate 580 provide the control of the flip-flop D3.

During the division operation (D*v*) the flip-flop D3 controls the input to the adder 22 of FIGURE 8. This input is from the read amplifier U2 of the MSD accumulator register. As the division operation progresses the contents of the MSD accumulator register shifts toward the most significant digits, and, therefore, the digits from the read amplifier U1 of the LSD accumulator must be picked up.

During the first word time of the division operation the input to the flip-flop D3 is from the read amplifier U2, so that the output from that amplifier may be added to $\beta$ if necessary. This is accomplished by the #F2 term introduced to the "or" gate 582. The one-bit shift of the accumulator register for each word time is accomplished by feeding the output from the read amplifier U2 through the flip-flops D4 and D3. Therefore, the D4 term introduced to the "and" gate 624 allows the flip-flop D3 to read D4 during all additional word times except the last word time. During the last word time the quotient is added into the flip-flop D3 so that the round off can be added to it in the adder 22. This is accomplished by the terms D6, $\overline{Q2}$ and Q3 applied to the "and" gate 622.

During the square root operation (S*q*) the flip-flop D3 controls the input to the adder 22 in FIGURE 8 from the MSD accumulator register. In the first word time of the square root operation the #F2 term applied to the "or" gate 582 allows the most significant digit of the MSD accumulator register contents to be read from the read amplifier U2 into the flip-flop D3. During the additional word times of the square root operation the input to the flip-flop D3 is from the flip-flop D4 which provides the one-bit left shift for each word time. The D4 and Q2 terms applied to the "and" gate 624 provide for the latter operation. During the last word time of the square root operation, the square root is read from the read amplifier U3 of the multiplier or divisor register into the flip-flop D3 so that the least significant digit of the square root can be corrected. The terms U3, Q2 and Q3 applied to the "and" gate 626 provide for the latter operation.

During the shift operation (S*h*) the D3 flip-flop is used as a delay for the MSD accumulator register as the register recirculates. The terms applied to the "and" gate 572 provide the logic for this operation during the shift. The term B2 applied to the "and" gate 600 indicates a left shift, and the term $\overline{B2}$ applied to the "and" gate 602 indicates either a right shift or no shift. During a left shift operation the flip-flop D3 reads the flip-flop D4 for a one-bit left shift or it reads the flip-flop D6 for a two-bit left shift. This allows the proper bit to be transferred from the LSD accumulator to the MSD accumulator during a left shift operation. The U2, $\overline{B1}$ and $\overline{B2}$ terms applied to the "and" gate 602 allow the flip-flop D3 to read the MSD accumulator register read amplifier U2 for either a Branch or a Hold operation; or for a right shift one-bit operation with the sign digit being repeated.

For the Branch and Clear operations or for the right shift and write zeroes for sign digit operation, no term in the logic of FIGURE 38 is true. This provides the proper clearing for the write amplifier $u_2$ of the MSD accumulator register. The #F3 and #Y*f* terms applied to the "and" gate 584 allow the flip-flop D3 to read the read amplifier U2 for the shift operation in all control states of the computer except the control state in which the term K5 is true. That is, the term #F4 is only true when K5 is true, and hence recirculation of the accumulator register must be provided in the $\overline{K5}$ state.

During the B*r*, T*r*, C*t*, A*d* and S*u* operations the MSD accumulator recirculates through the D3 flip-flop and through the adder 22 of FIGURE 8. The #F3, #Y*f* terms applied to the "and" gate 584 allow the flip-flow D3 to read the read amplifier U2 during these operations. The terms U2, $\overline{B2}$, $\overline{Q1}$ and Q6 applied to the "and" gate 576 are necessary for the Branch operation at P21 bit time of the computer control state 11, because the term #F3 is not true at this time.

During the store operation (S*t*), the flip-flop D3 controls the input to the write amplifier $u_2$ of the MSD accumulator. These inputs may be from an external source (#I2) or from the read amplifier U2 to provide recirculation, or may be zero to provide clearing of $u_2$. These inputs occur only when the term K5 is true (*#F4.Q1*) and the read amplifier U2 should recirculate through the flip-flop D3 and through the adder 22 in the $\overline{K5}$ states.

The #F3 and #Y*f* terms applied to the "and" gate 504 allow the flip-flop D3 to read the read amplifier U2 in the computer control states 00 and 10. The U2 and D5 terms applied to the "and" gate 614 allows normal recirculation in all the (K5) computer control states. The terms #I2 and K6 applied to the "and" gate 616 allow external input to the write amplifier $u_2$ in computer control states 41 and 51. When the term $\overline{D5}$ is true, the flip-flop D3 will be reset false, and it will remain false in the computer control states 40, 50, 60, 70, 61 and 71 to provide clearing for the MSD accumulator register. It should be noted that there is no term in the logic of FIGURE 38 which is true in the computer control states 20 or 30 for the stored command (S*t*), and these states should not be programmed.

The #F3 and #Y*f* terms applied to the "and" gate 584 allow the flip-flop D3 to read the read amplifier U2 to provide normal recirculation in the computer control states 00, 10, 41, 61 and 71 for the clear-add (A*c*) operation. In all other computer control states (20, 30, 40, 50, 51, 60, 70) there is no true term in the logic of FIGURE 38, and hence the flip-flop D3 will be reset false and will remain false. This provides the clearing of the MSD accumulator register. It should be remembered that the (A*c*) code is changed to the (A*d*) code when the computer control state 51 is entered from the computer control state 40 or 41.

During the special subtract operation (S$u_s$) the flip-flop D3 must read a double-length number into the adder 22 of FIGURE 8. For the upper operation this number is in the accumulator register. The terms applied to the "and" gate 590 allow the flip-flop D3 to read the LSD accumulator register read amplifier U1 in the computer control state 50 or 51, and the terms applied to the "and" gate 576 allow the flip-flop D3 to read the MSD accumulator register read amplifier U2 in the additional word states. During the lower operation zero is read into the flip-flop D3 by resetting the flip-flop false and holding it false. This is accomplished by having no true terms in all the non-additional word state operations, except for the control states 50 and 51, by setting the flip-flop B2 high when the additional word states are entered from the computer control states 60 or 70.

During the extract operation (E*x*) the MSD accumulator register must recirculate through the flip-flop D3 when the computer is in the control states 00, 10, 40, 41, 61 or 71. This is provided by the terms #F3 and #Y*f* applied to the "and" gate 584. In all other control states the flip-flop D3 must be false and this is provided by the inverter 566, because no true term exists in the logic of FIGURE 38 in any other of the control states.

Figure 39:
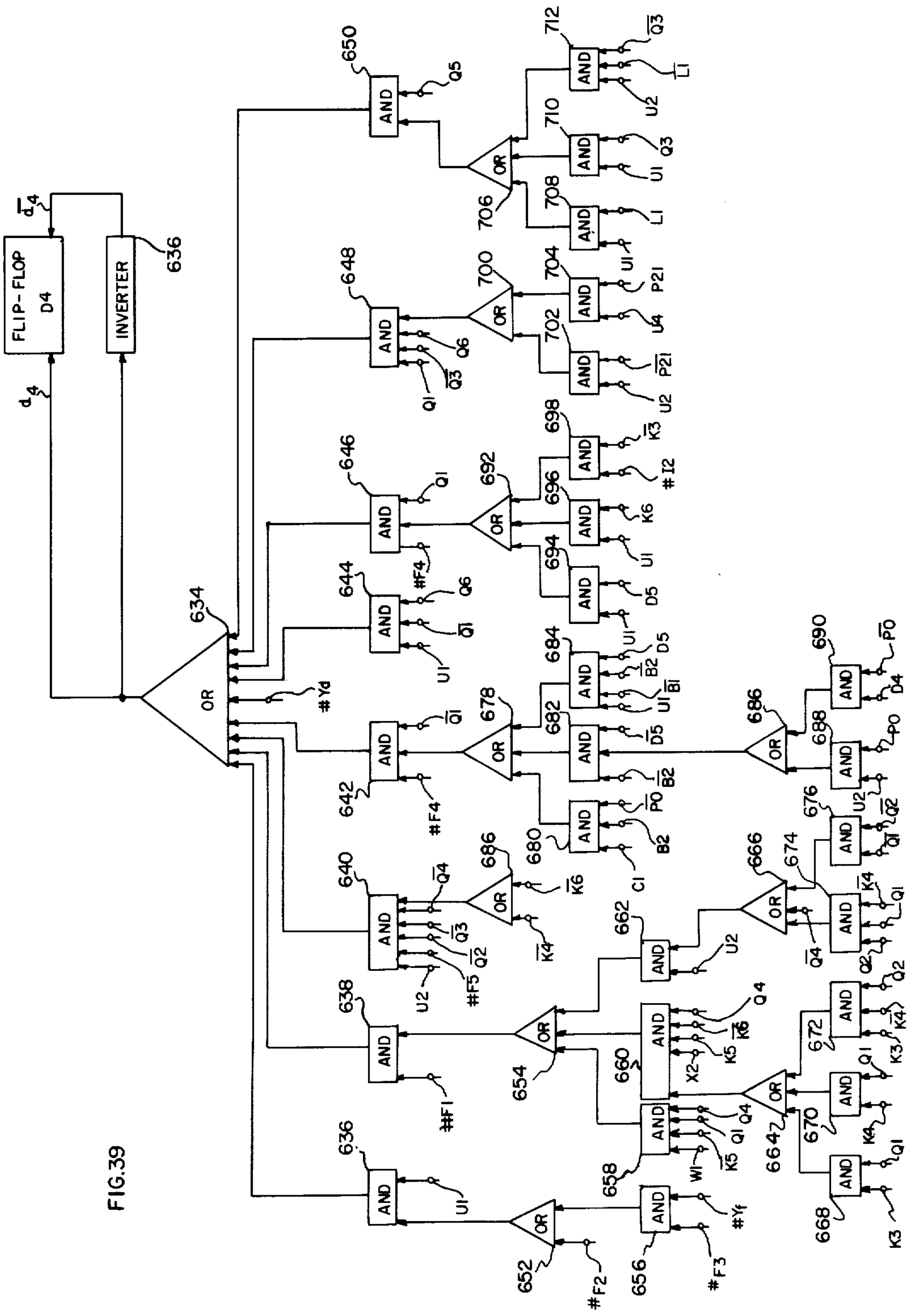

The logic associated with the flip-flop D4 is set out in FIGURE 39. An "or" gate 634 is connected to the input terminal $d_4$ of the flip-flop D4 and to an inverter 636. The output terminal of the inverter is connected to the input terminal $\overline{d}_4$ of the flip-flop D4. A plurality of "and" gates 636, 638, 640, 642, 644, 646, 648 and 650 is connected to the "or" gate 634. The terms #Y*d* is also introduced to the "or" gate 634. As "or" gate 652 is connected to the "and" gate 636, and an "or" gate 654 is connected to the "and" gate 638. The term #U1 is introduced to the "and" gate 636, the term #F1 is introduced to the "and" gate 638, and the term #F2 is introduced to the "or" gate 652. An "and" gate 656 is connected to the "or" gate 652, and a plurality of "and" gates 658, 660 and 662 is connected to the "or" gate 654.

The #F3 and #Y*f* are introduced to the "and" gate 656. The terms W1, K5, Q1 and Q4 are introduced to the "and" gate 658. The terms X2, K5, $\overline{K6}$ and Q4 are introduced to the "and" gate 660. The term U2 is introduced to the "and" gate 662. An "or" gate 664 is connected to the "and" gate 660 and an "or" gate 666 is connected to the "and" gate 662. A plurality of "and" gates 668, 670 and 672 is connected to the "or" gate 664. A pair of "and" gates 674 and 676 is connected to the "or" gate 666.

The terms K3 and Q1 are introduced to the "and" gate 668. The terms K4 and Q1 are introduced to the "and" gate 670. The terms K3, $\overline{K4}$ and Q2 are introduced to the "and" gate 672. The terms Q1.Q2 and $\overline{K4}$ are introduced to the "and" gate 674. The terms $\overline{Q1}$ and $\overline{Q2}$ are introduced to the "and" gate 676. The term $\overline{Q4}$ is introduced to the "or" gate 666.

The terms #F4 and $\overline{Q1}$ are introduced to the "and" gate 642. An "or" gate 678 is also connected to the "and" gate 642. A plurality of "and" gates 680, 682 and 684 is connected to the "or" gate 678. The terms U2, #F5, $\overline{Q2}$, $\overline{Q3}$ and $\overline{Q4}$ are introduced to the "and" gate 640. An "or" gate 686 is also connected to the "and" gate 640. The terms $\overline{K4}$ and $\overline{K6}$ are introduced to the "or" gate 686.

The terms C1, B2 and $\overline{P0}$ are introduced to the "and" gate 680. The terms $\overline{B2}$, $\overline{D5}$ are introduced to the "and" gate 682. The terms U1, $\overline{B1}$, $\overline{B2}$ and D5 are introduced to the "and" gate 684. An "or" gate 686 is connected to the "and" gate 682. A pair of "and" gates 688 and 690 are connected to the "or" gate 686. The terms U2 and P0 are introduced to the "and" gate 688. The terms D4 and P0 are introduced to the "and" gate 690. The terms U1, $\overline{Q1}$ and Q6 are introduced to the "and" gate 644. The terms #F4 and Q1 are introduced to the "and" gate 646, and an "or" gate 692 is also connected to that "and" gate. A plurality of "and" gates 694, 696, and 698 is connected to the "or" gate 692. The terms U1 and D5 are introduced to the "and" gate 694. The terms U1 and K6 are introduced to the "and" gate 696. The terms #I2 and $\overline{K3}$ are introduced to the "and" gate 698. The terms Q1, $\overline{Q3}$ and Q6 are introduced to the "and" gate 648. An "or" gate 700 is also connected to the "and" gate 648. A pair of "and" gates 702 and 704 is connected to the "or" gate 700. The terms U2 and $\overline{P21}$ are introduced to the "and" gate 702. The terms U4 and P21 are introduced to the "and" gate 704.

An "or" gate 706 is connected to the "and" gate 650, and the term Q5 is introduced to that "and" gate. A plurality of "and" gates 708, 710 and 712 is connected to the "or" gate 706. The terms U1 and L1 are introduced to the "and" gate 708. The terms U1 and Q3 are introduced to the "and" gate 710. The terms U2, $\overline{L1}$ and $\overline{Q3}$ are introduced to the "and" gate 712.

The flip-flop D4 primarily selects the input to the write amplifier $u_1$ of the LSD accumulator register in FIGURE 1. This flip-flop provides the delay necessary for the proper circulation of the LSD accumulator register.

During the first word time of the multiplication operations, the flip-flop D4 selects the proper input to the MSD accumulator, which is written into the write amplifier $u_2$. The terms introduced to the "and" gate 658 write $\gamma$ into the MSD accumulator register in the computer control states 20 and 30 for the M*b*, M*d* multiplication instructions. The terms applied to the "and" gate 660 write $\beta$ into the MSD accumulator for the upper instruction and write $\gamma$ into the MSD accumulator register for the lower instructions during the following multiplication operations: M*b* and M*d* in the computer control states 50 and 70 ($K3.Q1$); M*b*, M*d* in the computer control states 60 and 70 ($K4.Q1$); and M*c*, M*d* in the computer control state 50 ($K3.\overline{K4}.Q2$). It should be noted that the multiplication operation (M*d*) is not programmed to the computer control state 50. The terms applied to the "and" gate 662 cause the LSD accumulator register to recirculate through the flip-flop D4 for the (M*d*) and (S*q*) operations when the computer is in the control states 40, 50 and 51 ($\overline{K4}$, Q1, Q2); and for all the first word times of the (M*a*)($\overline{Q1}.\overline{Q2}$) operation; and for all the first word times of the product part of the square root (S*q*) ($\overline{Q4}$) operation.

The terms applied to the "and" gate 650 provide the switching of the inputs to the flip-flop D4 between the read amplifiers U1 and U2 in the additional word times of all the multiplication operations. When the read amplifier U1 is introducing its output from the LSD accumulator register through the flip-flop D3 and through the adder 22 in FIGURE 8, the read amplifier U2 much be recirculating the contents of the MSD accumulator register through the flip-flop D4, and vice versa.

During the division operation (D*v*), the flip-flop D4 provides the additional delay necessary to provide the accumulator register with a one-bit shift toward the most significant digit. During the first word time of the division operation, the input to the flip-flop D4 is from the LSD accumulator read amplifier U1. This is accomplished by the #F2 term applied to the "or" gate 652. During the additional word times the flip-flop D4 reads the read amplifier U1, this being accomplished by the U2, $\overline{P21}$ terms applied to the "and" gate 702.

At P21 bit time the flip-flop D4 must pick up the most significant digit of the LSD accumulator in order to shift this digit into the dividend. This is accomplished by the U4 and P21 terms introduced to the "and" gate 704. Since there is no term in the D4 logic which is true during the last word time of the division operation, the flip-flop D4 will be reset false at that time, and it will remain false during the entire last word time.

The logic on the D4 flip-flop for the square root operation (S*q*) is exactly the same as for the division operation discussed above.

During the shift operation (S*h*), the flip-flop D4 provides the delay for the LSD accumulator register. The terms applied to the "and" gate 642 are the terms involved in the shift operation. The terms applied to the "and" gate 682 allow the transfer of the digit from the most significant accumulator register to the least significant accumulator register during a right shift. The terms applied to the "and" gate 688 allow the flip-flop D4 to read the least significant digit of the MSD accumulator register, and the terms applied to the "and" gate 690 allow the flip-flop to hold this information for one word time, the latter term being necessary because of the inverter logic used in the system of FIGURE 39.

The terms applied to the "and" gate 680 allow the flip-flop D4 to read the flip-flop C1 at all bit times, except at P0 bit time, during a left shift operation. The $\overline{P0}$ term applied to the "and" gate 680 causes the flip-flop D4 to be reset at each P0 bit time of a left shift operation. The terms applied to the "and" gate 684 allow the flip-flop D4 to read the read amplifier U1 during a Branch and Hold operation, thus during this operation the output of the LSD accumulator register read amplifier U1 recirculates through the flip-flop D4 as usual.

There is no term in the D4 logic which is true for a Branch and Clear operation, and, therefore, the flip-flop D4 will be false to clear the write amplifier $d_1$. The #F3 and #Y*f* terms applied to the "and" gate 656 also allow the LSD accumulator to recirculate through D4 in control states 00 and 10.

During the B*r*, T*r*, C*t*, A*d* and S*u* operations the LSD accumulator recirculates through the flip-flop D4. The #F3 and #Y*f* terms applied to the "and" gate 656 allow the flip-flop D4 to read the read amplifier U1 during these operations. The terms U1, $\overline{Q1}$ and Q6 applied to the "and" gate 644 are necessary for the Branch operation at P21 bit time of the computer control state 11, because the term #F3 is not true at that time.

During the Store operation the flip-flop D4 controls the input to the LSD accumulator write amplifier $u_1$. These inputs may be from an external source (#I2), or from the read amplifier U1, to provide recirculation; or the inputs may be 0 to provide clearing of the LSD accumulator register. These inputs occur only when the flip-flop K5 is true ($\#F4.Q1$), and the LSD accumulator register should circulate through the flip-flop D4 in the $\overline{K5}$ states.

The #F3 and #Y*f* terms applied to the "and" gate 656 allow the flip-flop D4 to read the read amplifier U1 in the computer control states 00 and 10. The terms applied to the "and" gate 694 and 696 allow recirculation for all the K5 states when the flip-flop D5 is true, and in the computer control states 41, 51, 61 and 71. The terms applied to the "and" gate 698 allow an external input to the write amplifier $u_1$ when the computer is in the control states 40 or 41. When the term $\overline{D5}$ is true, the flip-flop $\overline{D4}$ will be reset false and remain false in the computer control states 50, 60 and 70, so as to provide a clearing for the LSD accumulator register. It should be noted that there is no term in the D4 logic which is true for the store command when the computer is in the control states 20 or 30, and this command should not be programmed to those states.

The #F3 and #Y*f* terms applied to the "and" gate 656 allow the flip-flop D4 to read the LSD accumulator register read amplifier U1 so as to provide normal recirculation of that register when the computer is in the control state 00, 10, 41, 61 and 71. In all other control states (20, 30, 40, 50, 51, 60, 70) there is no true term in the logic of FIGURE 39, so that the flip-flop D4 is reset and remains false. This provides the clearing for the LSD accumulator register. It should be remembered that the (A*c*) code is changed to the (A*d*) code when the computer control state 51 is entered from the control states 40 and 41.

During the special subtract (S$u_s$) operation the flip-flop D4 must provide the proper delay for recirculation of the MSD accumulator register, while the contents of the LSD accumulator register are being read into the adder 22 of FIGURE 8, when the computer is in the control states 50, 51, 60 and 70. The terms applied to the "and" gate 640 allow the flip-flop D4 to read the read amplifier U2 of the MSD accumulator register in these states. It should be noted that the special subtract operation is not programmed for the computer control state 20, 21, 30, 40, and 41. For all other control states the flip-flop D4 must read the read amplifier U1 as provided by the #F3 and #Y*f* terms applied to the "and" gate 656.

During the extract (E*x*) operation the LSD accumulator must be cleared. This must occur at least in the computer control states 20, 30, 50, 51, 60 and 70. Since the flip-flop D4 is allowed to read the read amplifier U1 only by the #F3 and #Y*f* terms applied to the "and" gate 656, which correspond to the computer control state 00, 10, 40, 41, 61 and 71, and no other term is true, the required clearing of the LSD accumulator register during the extract operation is accomplished.

Figure 40:
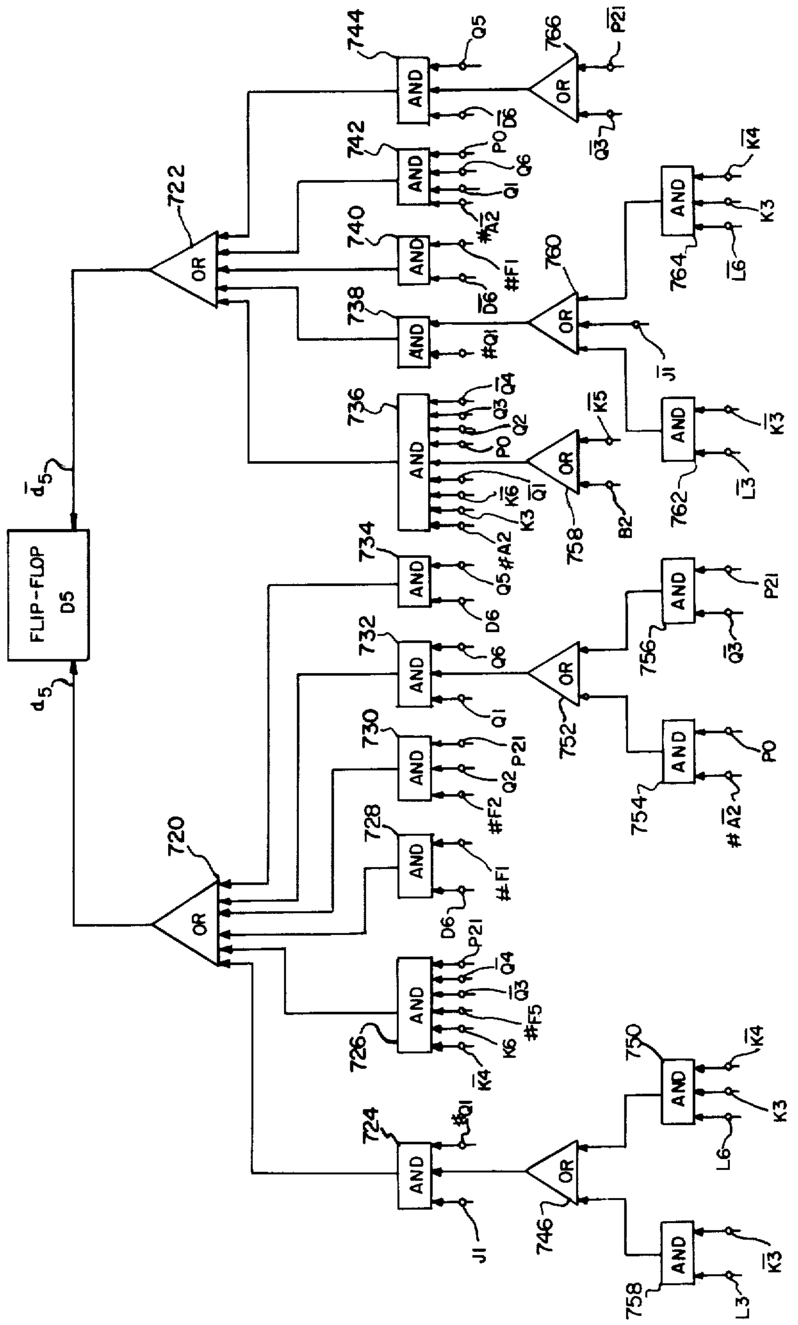

The logic associated with the flip-flop D5 is set out in FIGURE 40. In FIGURE 40 an "or" gate 720 is connected to the input terminal $d_5$ of the flip-flop D5, and an "or" gate 722 is connected to the input terminal $\overline{d_5}$ of that flip-flop. A plurality of "and" gates 724, 726, 728, 730, 732 and 734 is connected to the "or" gate 720. A plurality of "and" gates 736, 738, 740, 742, and 744 is connected to the "or" gate 722. An "or" gate 746 is connected to the "and" gate 724, and a pair of "and" gates 748 and 750 is connected to the "or" gate 746. An "or" gate 752 is connected to the "and" gate 732, and a pair of "and" gates 754 and 756 is connected to the "or" gate 752. An "or" gate 758 is connected to the "and" gate 736. An "or" gate 760 is connected to the "and" gate 738, and a pair of "and" gates 762 and 764 is connected to the "or" gate 760. An "or" gate 766 is connected to the "and" gate 744.

The terms J1 and #Q1 are introduced to the "and" gate 724. The terms L3 and $\overline{K3}$ are introduced to the "and" gate 748. The terms L6, K3 and $\overline{K4}$ are introduced to the "and" gate 750. The terms $\overline{K4}$, K6, #F5, $\overline{Q3}$, $\overline{Q4}$ and P21 are introduced to the "and" gate 726. The terms D6 and #F1 are introduced to the "and" gate 728. The terms #F2, Q2 and P21 are introduced to the "and" gate 730. The terms Q1 and Q6 are introduced to the "and" gate 732. The terms #A2 and P0 are introduced to the "and" gate 754. The terms Q3 and P21 are introduced to the "and" gate 756. The terms D6 and Q5 are introduced to the "and" gate 734.

The terms #A2, K3, $\overline{K6}$, $\overline{Q1}$, P0, Q2, Q3 and $\overline{Q4}$ are introduced to the "and" gate 736. The terms B2 and $\overline{K5}$ are introduced to the "or" gate 758. The terms #$\overline{A2}$, Q1, Q6 and P0 are introduced to the "and" gate 742. The terms $\overline{D6}$ and #F1 are introduced to the "and" gate 740. The term Q1 is introduced to the "and" gate 738. The terms $\overline{L3}$ and $\overline{K3}$ are introduced to the "and" gate 762.

The term $\overline{J1}$ is introduced to the "or" gate 760. The terms $\overline{L6}$, K3 and $\overline{K4}$ are introduced to the "and" gate 764. The terms $\overline{D6}$ and Q5 are introduced to the "and" gate 744. The terms $\overline{Q3}$ and $\overline{P21}$ are introduced to the "or" gate 766.

During the entirety of each of the multiplication operations, the flip-flop D5 is used as a delay flip-flop. The output of the read amplifier U4 of the multiplicand register recirculates through the flip-flops D6 and D5 giving the required two-bit shift each word time for the product. The terms D6 and #F1 applied to the "and" gate 728, and the terms D6 and #F1 applied to the "and" gate 740, permit the flip-flop D5 to read the flip-flop D6 during the first word time of the multiplication operations. The terms D6, Q5 introduced to the "and" gate 734, and the terms $\overline{D6}$ and Q5 introduced to the "and" gate 744, allow the flip-flop D5 to read the flip-flop D6 during the additional word times of the multiplication operations. The $\overline{P21}$ term applied to the "or" gate 766 prevents any conflict with the terms $\overline{L3}$ and K3, and the terms $\overline{L6}$, K3 and $\overline{K4}$, applied to the "and" gate 762 and 764, allow the flip-flop D5 to be used for coding in the T*r*, C*t*, S*h* and S*t* operations. There is no conflict between the terms D6 and Q5 applied to the "and" gate 734, and the terms applied to the "and" gate 724 at P21 bit time of the last word time of the multiplication operations. This is because the term $\overline{D6}$ is always true at this time. The term $\overline{J1}$ applied to the "or" gate 760 resets the flip-flop D5 at P21 bit time of the last word time of the previous operation. This latter resetting is necessary to make sure that the first partial product in the flip-flop D2 will be a zero.

For the division operation (D*v*) the flip-flop D5 is the add-subtract control flip-flop for the C1 carry flip-flop. When the flip-flop D5 is true it indicates an addition, and when the flip-flop is false, it indicates a subtraction. The flip-flop D5 is reset false upon entering the first word time of the division operation, and it remains false throughout the entire first word time. This is accomplished by the $\overline{J1}$ term applied to the "or" gate 760.

By setting the flip-flop D2 to the bar of the sign digit of the divisor at P21 bit time of the first word time of the division operation, and by resetting the flip-flop D2 false at P21 bit time of each additional word time, the output #$\overline{A2}$ of the adder 22 (FIGURE 8) at P0 bit time is the same as the quotient bit. Also, the add-subtract carry control is the same as the quotient bit in the first additional word time, and is the same as the bar of the quotient bit in each subsequent additional word time. Therefore, the flip-flop D5 should read #$\overline{A2}$ at P0 bit time of the first additional word time, and it should read #A2 for each subsequent additional word time. In order to have #$\overline{A2}$ set the flip-flop D5 to the proper add-subtract control for all additional word times, the flip-flop D5 is set false at P0 bit time of the first additional word time, and it is set true at P21 bit time of each additional word time. These latter settings are accomplished by the terms $\overline{Q3}$ and P21 introduced to the "and" gate 756. The terms #$\overline{A2}$ and P0 applied to the "and" gate 754, and to the "and" gate 742, then give the proper add-subtract control for the flip-flop D5. The flip-flop D5 is not used during the last word time of the division operation; and at P21 bit time of the last word time, the terms applied to the "and" gate 724, and the terms applied to the "and" gate 738, control the setting and resetting of the flip-flop D5.

For the square root operation (S*q*), the flip-flop D5 provides the add-subtract control for the flip-flop C1 in the adder-subtractor circuit 20 of FIGURE 8, and the flip-flop D5 controls the addition or subtraction of $X_{i-1}$.

The term $\overline{J1}$ applied to the "or" gate 760 resets the flip-flop D5 when the first word time of the square root operation is entered. The flip-flop D5 remains false during the first word time of the square root operation, and the terms #F2, Q2 and P21 applied to the "and" gate 730 set the flip-flop D5 true at P21 bit time of the first word time of the square root operation. The terms $\overline{Q3}$ and P21 applied to the "and" gate 756 set the flip-flop D5 true in all additional word states for the square root operation, except for the last word time. The terms applied to the "and" gate 742 reset the flip-flop D5 false when the sign digit of the $R_{i-1}$ remainder is zero, this indicating a positive remainder. This allows the term $\overline{D5}$ to indicate subtraction and the term D5 to indicate addition, these being the same rules as are used for division. The flip-flop D5 is not used during the last word time because the terms D1 and D2 are both zero. The terms applied to the "and" gates 724 and 738 control the setting of the flip-flop D5 at P21 bit time of the last word time of the square root operation.

During the shift operation (S*h*), the D5 flip-flop is used to hold to the code which indicates which of the variations of the shift operations is to be performed. The flip-flop D5 indicates whether or not a branch operation is to be performed in the shift operation. If the term D5 is true, a branch operation is to be performed, but if the term $\overline{D5}$ is true, no branch operation is to be performed. The term D5, subsequently gives information as to whether the number in the accumulator register is positive or negative during the branch operation. The terms applied to the "and" gate 724 and 738 allow the flip-flop D5 to set to the proper code at the beginning of the shift operation. The terms applied to the "and" gate 736 allow the flip-flop D5 to be reset false in the computer control state 10 and 30 for all the shift codes, and in the computer control states 50 and 70 for left shift only.

The D5 flip-flop is not used for the B*r*, A*d*, S*u*, A*c* and E*x* operations, and the only logic that is important during these operations are the terms applied to the "and" gate 724 and 738, these latter terms permit proper setting for the flip-flop D5 for the operation that is to follow any of the operations listed above. During the T*r*, C*t*, S*t* operations the flip-flop D5 contains the code specifying which of the variations of the operations are to be performed. The flip-flop D5 is pre-set from the flip-flop L3 or L6 prior to the start of the operations, by the terms applied to the "and" gate 724 and 738.

During the special subtract (S$u_s$) operations the flip-flop D5 is used to control the inputs to the flip-flop D1 in the additional word states. When the additional word states are entered from the computer control states 50, 60 or 70, the flip-flop D1 should read the read amplifier X2, and the term $\overline{D5}$ must be true. The term $\overline{J1}$ applied to the "or" gate 760 provides reset for the flip-flop D5 when the S$u_s$ operation is entered. When the additional word states are entered from the state 51, the flip-flop D1 must be false, and this operation is controlled by the flip-flop D5 in its true state controls. The terms applied to the "and" gate 726 sets the flip-flop D5 true at P21 bit time in the computer control states 41 and 51 of the special subtract (S$u_s$) operation. It should be noted that for the special subtract (S$u_s$) operation, the computer control states 20, 21, 30, 40 and 41 are not programmed.

Figure 41:
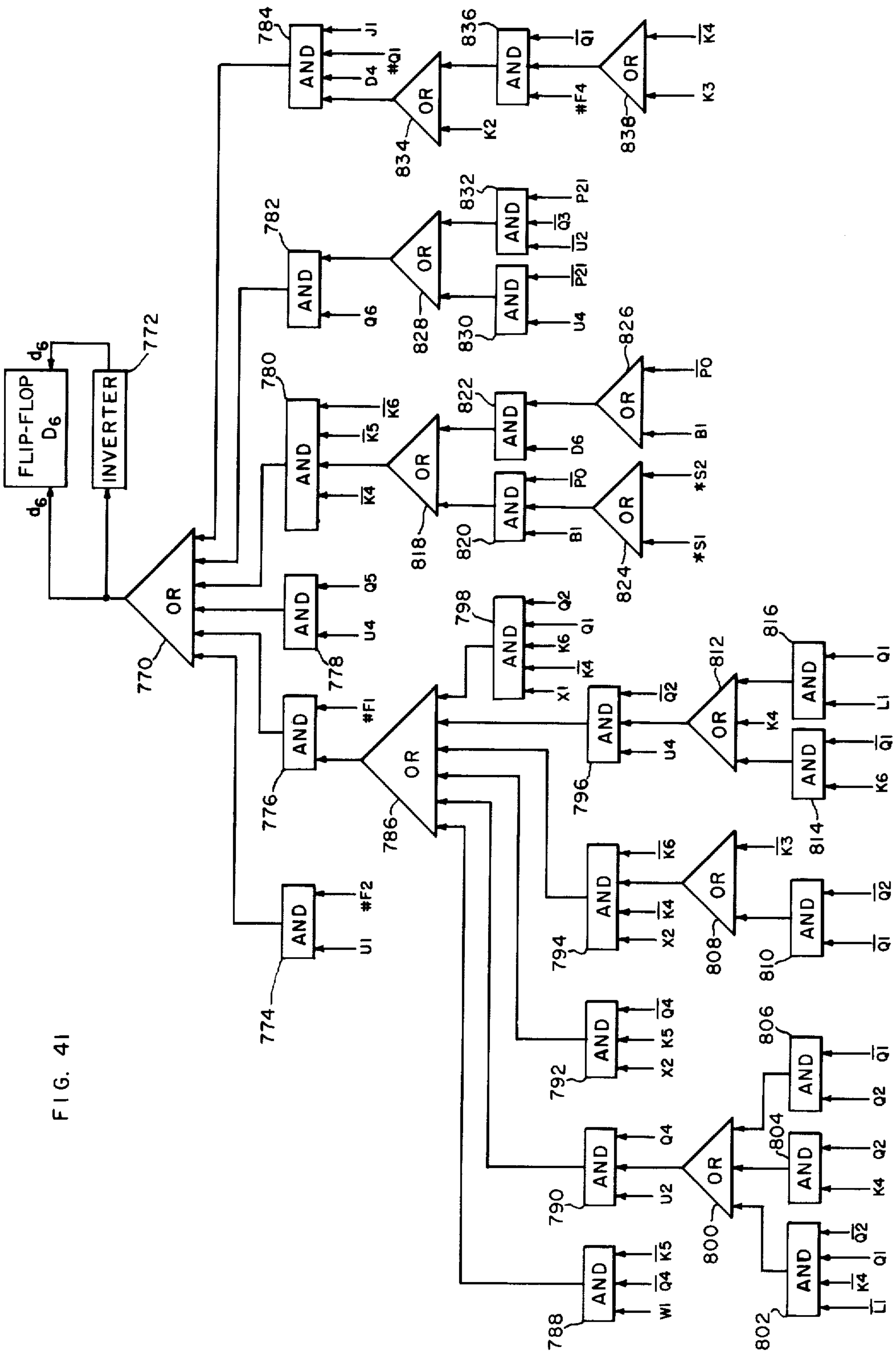

The logic associated with the flip-flop D6 is set out in FIGURE 41. In FIGURE 41 an "or" gate 770 is connected to the input terminal $d_6$ of the flip-flop D6, and the "or" gate is connected through an inverter 772 to the input terminal $\overline{d_6}$ of the flip-flop D6. A plurality of "and" gates 774, 776, 778, 780, 782 and 784 is connected to the "or" gate 770. An "or" gate 786 is connected to the "and" gate 776, and a plurality of "and" gates 788, 790, 792, 794, 796 and 798 is connected to the "or" gate 786. An "or" gate 800 is connected to the "and" gate 790; and a plurality of "and" gates 802, 804 and 806 is connected to the "or" gate 800. An "or" gate 808 is connected to the "and" gate 794, and an "and" gate 810 is connected to the "or" gate 808. An "or" gate 812 is connected to the "and" gate 796, and a pair of "and" gates 814 and 816 is connected to that "or" gate.

An "or" gate 818 is connected to the "and" gate 780, and a pair of "and" gates 820 and 822 is connected to the "or" gate 818. An "or" gate 824 is connected to the "and" gate 820 and an "or" gate 826 is connected to the "and" gate 822. An "or" gate 828 is connected to the "and" gate 782, and a pair of "and" gates 830 and 832 is connected to the "or" gate 828.

An "or" gate 834 is connected to the "and" gate 784, and an "and" gate 836 is connected to the "or" gate 834, and an "or" gate 838 is connected to the "and" gate 834.

The terms U1 and #F2 are introduced to the "and" gate 774. The term #F1 is introduced to the "and" gate 776. The terms W1, $\overline{K5}$, $\overline{Q4}$ are introduced to the "and" gate 788. The terms U2 and Q4 are introduced to the "and" gate 790. The terms $\overline{K4}$, $\overline{L1}$, Q1 and $\overline{Q2}$ are introduced to the "and" gate 802. The terms K4 and K2 are introduced to the "and" gate 801. The terms $\overline{Q1}$ and Q2 are introduced to the "and" gate 806.

The terms X2, K5 and $\overline{Q4}$ are introduced to the "and" gate 792. The terms X2, $\overline{K4}$ and $\overline{K6}$ are introduced to the "and" gate 794. The term $\overline{K3}$ is introduced to the "or" gate 808. The terms $\overline{Q1}$ and $\overline{Q2}$ are introduced to the "and" gate 810. The terms U4 and Q2 are introduced to the "and" gate 796. The term K4 is introduced to the "or" gate 812. The terms K6 and $\overline{Q1}$ are introduced to the "and" gate 814. The terms L1 and Q1 are introduced to the "and" gate 816. The terms X1, $\overline{K4}$, K6, Q1 and Q2 are introduced to the "and" gate 798.

The terms U4 and Q5 are introduced to the "and" gate 778. The terms $\overline{K4}$, $\overline{K5}$, $\overline{K6}$ are introduced to the "and" gate 780. The terms B1 and $\overline{P0}$ are introduced to the "and" gate 820. The terms *S1 and *S2 are introduced to the "or" gate 824. The term D6 is introduced to the "and" gate 822. The terms B1 and $\overline{P0}$ are introduced to the "or" gate 826.

The term Q6 is introduced to the "and" gate 782. The terms U4 and $\overline{P21}$ are introduced to the "and" gate 830. The terms $\overline{U2}$, $\overline{Q3}$ and P21 are introduced to the "and" gate 832. The terms D4, #Q1 and J1 are introduced to the "and" gate 784. The term K2 is introduced to the "or" gate 834. The terms #F4 and $\overline{Q1}$ are introduced to the "and" gate 836. The terms K3 and $\overline{K4}$ are introduced to the "or" gate 838.

During the multiplication operations the flip-flop D6 is used in conjunction with the flip-flop D5 to provide the required two-bit per word shift of the multiplicand. For the first word time of the multiplication operations, the flip-flop D6 also selects the multiplicand to be used. The terms applied to the "and" gate 788 cause the flip-flop D6 to select the read amplifier W1 of the upper instruction register in the computer control states 20 and 30 for the product part of the square root operation.

The terms $\overline{Q1}$ and Q2 applied to the "and" gate 806 cause the flip-flop D6 to select the MSD accumulator register read amplifier U2 for the multiplication operation (M*c*) in all the first word times; the terms K4 and Q2 applied to the "and" gate 804 cause the flip-flop D6 to select the U2 read amplifier for the multiplication operation (M*d*) in the computer control states 20, 30, 60, 70, 61 and 71; the term applied to the "and" gate 802 causes the flip-flop D5 to select the read amplifier U2 for the multiplication operation (M*b*) in the computer control states 50 and 51, with the ($\overline{L1}$) code.

The terms X2, K5, $\overline{Q4}$ applied to the "and" gate 794 cause the flip-flop D6 to select the read amplifier X2 of the permanent memory tracks of FIGURE 1 for the product part of the square root operation in the computer control states 40, 50, 60 and 70; the term $\overline{K3}$ applied to the "or" gate 808 causes the flip-flop D5 to select the read amplifier X2 for the multiplication operation (M*d*) and for the product part of the square root operation (S*q*) when the computer is in the control state 40; and the terms $\overline{Q1}$, $\overline{Q2}$ applied to the "and" gate 810 cause the flip-flop D6 to select the read amplifier X2 for the M*a* multiplication operation, when the computer is in the control state 50. The term K4 applied to the "or" gate 812 causes the flip-flop D6 to select the multiplicand register read amplifier U4 (FIGURE 1) for the M*a*, M*b* operations in the computer control states 20, 30, 60, 70, and for the M*b* operation in the computer control states 61 and 71; the term K6, $\overline{Q1}$ applied to the "and" gate 814 causes the flip-flop D6 to select the read amplifier U4 for the M*a* operation when the computer is in the control state 51; and the terms L1 and Q1 applied to the "and" gate 816 permits the flip-flop D6 to select the read amplifier U4 for the M*d* operation when the computer is in the control states 5 and 51 with the L1 code. The terms applied to the "and" gate 798 permit the flip-flop D6 to select the X1 read amplifier of the permanent memory tracks (FIGURE 1) for the M*d* operation when the computer is in the control state 51.

The terms U4 and Q5 applied to the "and" gate 778 provide the recirculation of the multiplicand register through the flip-flop D6 during all additional word times of the multiplication operations. It is important that the flip-flop D6 be false at P0 bit time of the first word time of the multiplication operation. At the end of any operation preceding a multiplication, the term #Q1, $\overline{J1}$ is true, so that the inversion of these terms applied to the "and" gate 784 resets the flip-flop D6 false.

During the division operation, the flip-flop D6 is used to provide a one-bit shift, toward the most significant digit, of the LSD accumulator, this being stored in the multiplicand register. This allows the least significant bit of the LSD accumulator register to be shifted into the MSD accumulator register. The terms U1, #F2 applied to the "and" gate 774 allow the flip-flop D6 to read the LSD accumulator register during the first word time of the division operation. The terms U4 and $\overline{P21}$ applied to the "and" gate 830 allow the flip-flop D6 to read the multiplicand register read amplifier U4 during all the additional word times of the division operation, except at P21 bit time. The terms $\overline{U2}$, $\overline{Q3}$, P21 applied to the "and" gate 832 allow the quotient bit to be read into the flip-flop D6.

There is no term in the D6 logic which is true at P21 bit time of the last word time of the division operation. Therefore, the flip-flop D6 is reset false at that time through the inverter 772, and the flip-flop will be false at P0 bit time of the following word time. The logic of the flip-flop (D6) is the same for the square root operation, as it is for the division operation described above.

For the left shift operation the flip-flop (D6) allows the next to most significant digit in the LSD accumulator register to be shifted into the MSD accumulator register. The terms applied to the "and" gate 784 provide for the latter operation. The K2 term applied to the "or" gate 834 allows the contents of the flip-flop (D4) to be read into the flip-flop (D6) upon the beginning of the shift operation, that is, with K2. The terms #F4 and $\overline{Q1}$ applied to the "and" gate 836 allow this same transfer from the flip-flop (D4) to the flip-flop (D6) to occur during the shift operation itself, that is, in the computer control states 40, 50, 74, 41, 51 and 71. The reason that the computer control states 60 and 61 are excluded in the #F4, $\overline{Q1}$ terms applied to the "and" gate 836 is to allow the flip-flop (D6) to be reset false upon entering the computer control state 00. The flip-flop (D6) must be false when it enters the computer control state 00 at all times to allow the "hold" logic to operate properly. There is no other term in the D6 logic which is true during the shift operation. Therefore, the flip-flop D6 will be set false at P0 bit time and it will remain false until the next P0 bit time. It should be noted that the K2 term applied to the "or" gate 834 requires all left shift two-bit operations to start by finding either $\beta$ or $\gamma$.

The (D6) flip-flop is not used during the B*r*, S*u*$_s$, T*r*, C*t*, S*t*, A*d*, S*u*, A*c* and D*x* operations, and the only true logic during these operations pertains to the operation which follows. The K2 term applied to the "or" gate 834 is necessary only when a left shift (two bits) operation follows. It should be noted that the inversion of the $\overline{U2}$, $\overline{Q3}$ and P21 terms applied to the "and" gate 832 will reset the flip-flop D6 at the end of a branch or special subtract operation to make sure that the flip-flop (D6) enters the computer state 00 in a false condition.

The logic associated with the write amplifier $u_1$ of the LSD accumulator register is illustrated in FIGURE 42. An "or" gate 850 is connected to the input terminal $u_1$ of the write amplifier, and the "or" gate is connected to an inverter 852 to the input terminal $\overline{u_1}$ of the write amplifier. A plurality of "and" gates 854, 856, 858, 860 and 862 is connected to the "or" gate 850. An "or" gate 864 is connected to the "and" gate 854. A plurality of "and" gates 866, 868, 870, 872 and 874 is connected to the "or" gate 864. An "or" gate 876 is connected to the "and" gate 870. An "or" gate 878 is connected to the "and" gate 874, and a pair of "and" gates 880 and 882 is connected to the "or" gate 878. A plurality of "and" gates 884, 886, 888, 890 and 892 is connected to the "or" gate 894. The "or" gate 894 is connected to the "and" gate 856. An "or" gate 896 is connected to the "and" gate 862, and a pair of "and" gates 898 and 900 is connected to the "or" gate 896.

The term D4 is introduced to the "and" gate 854. The terms P0, $\overline{Q5}$ and $\overline{Q6}$ are introduced to the "and" gate 866. The terms Q3, Q4 and $\overline{P0}$ are introduced to the "and" gate 868. The term #F3 is introduced to the "or" gate 864. The term #F4 is introduced to the "and" gate 870. The terms B2, D5 and Q1 are introduced to the "or" gate 876. The terms $\overline{K3}$, $\overline{K4}$, #F5 and Q4 are introduced to the "and" gate 872. The term $\overline{P0}$ is introduced to the "and" gate 874. The terms L2 and Q5 are introduced to the "and" gate 880. The terms $\overline{Q1}$ and Q6 are introduced to the "and" gate 882.

The term #A2 is introduced to the "and" gate 856. The terms #F5, $\overline{Q2}$, $\overline{Q3}$, $\overline{Q4}$ and $\overline{P0}$ are introduced to the "and" gate 884. The terms $\overline{K4}$ and $\overline{K6}$ are introduced to an "or" gate 885 which is connected to the "and" gate 884. The terms $\overline{L2}$, $\overline{Q3}$ and Q5 are introduced to the "and" gate 886. The terms Q5 and P0 are introduced to the "and" gate 888. The terms #F1 and $\overline{P0}$ are introduced to the "and" gate 890. The terms $\overline{Q1}$, $\overline{Q2}$, P0 and Q6 are introduced to the "and" gate 892.

The terms #F2, Q2 and P19 are introduced to the "and" gate 858. The terms U1, #F4, $\overline{B2}$, $\overline{D5}$, $\overline{Q1}$ and $\overline{P0}$ are introduced to the "and" gate 860. The terms $\overline{L2}$, Q1, $\overline{Q3}$ and Q6 are introduced to the "and" gate 862. The terms $\overline{D1}$ and P20 are introduced to the "and" gate 898. The terms U1 and $\overline{P21}$ are introduced to the "and" gate 900.

As described in conjunction with FIGURE 1 the write amplifier $u_1$ is associated with the LSD accumulator register. During the multiplication operation the input to the write amplifier $u_1$ alternates between the flip-flop D4 and the output #A2 from the adder 22 in FIGURE 8. This alternation is under the control of the flip-flop L2 in the additional word states. The terms L2 and Q5 applied to the "and" gate 880, allow the write amplifier $u_1$ to write the contents of the flip-flop D4 into the LSD accumulator register in all the additional word times of a multiplication operation, except the last word time. The terms Q3, Q4, $\overline{P0}$ applied to the "and" gate 868, allow the write amplifier $u_1$ to write the contents of the flip-flop D4 into the LSD accumulator register during the last word time, except at P0 bit time. The terms P0, $\overline{Q5}$ and $\overline{Q6}$ applied to the "and" gate 866 allows the contents of the flip-flop D4 to be written into the LSD accumulator register at P0 bit time of the first word time of a multiplication operation.

The terms #F1 and $\overline{P0}$, applied to the "and" gate 890, allows the adder output #A2 to be written into the accumulator register in the first word time of a multiplication operation, except at P0 bit time of that word time. The terms $\overline{L2}$, $\overline{Q3}$ and Q5 applied to the "and" gate 886, allow the output #A2 (FIGURE 8) to be written into the LSD accumulator register in all additional word time, except in the last word time. The terms Q5 and P0, applied to the "and" gtae 888, provide for the writing of #A2 into the LSD accumulator register at P0 bit time of the last word time.

During the division operation (D*v*) the LSD accumulator register is used to provide the precession of a leader bit to control the length of the operation. There is no term in the logic of FIGURE 42 which is true during the first word time of the division operation, and, therefore, zeroes will be written into the LSD accumulator register throughout the first word time. The terms $\overline{D1}$ and P20 applied to the "and" gate 898 provide for the writing of a "one" into the LSD accumulator register, regardless of the state of the ones and zeroes in the register at initial start-up. This insures that the computer will come out of an additional word time of the division operation if it happens to come into this state when the computer is turned on. The terms U1 and $\overline{P21}$ applied to the "and"

gate 900 provide normal recirculation, and, because the LSD accumulator register is 21 bits in length, the ones in the register will precess toward the least significant digits. When a one precesses to P21 the flip-flop L2 is set true, which, in turn sets the flip-flop Q3 true during the next additional word time.

During the division operation (D*v*), the LSD accumulator register is used to provide the precession of the leader bit to control the length of the operation, as noted above. During the first word time of the square root operation (S*q*), the terms P0, $\overline{Q5}$ and $\overline{Q6}$ applied to the "and" gate 866 allows the register to copy the contents of the flip-flop (D4) at P0 bit time. This is the most significant digit of the LSD accumulator. The terms #F2, Q2 and P19 applied to the "and" gate 858 are the only other terms in the logic of FIGURE 42 which are true during the first word time of the square root operation. This allows a leader bit to be written at P19 bit time into the LSD accumulator register. This leader bit will then precess one bit per word time toward the least significant digit end, because the LSD register is a 21 bit line. During the additional word times of the square root operation the terms Q1 and $\overline{P21}$ applied to the "and" gate 900 provide this precession of the leader bit in the LSD register.

The terms $\overline{D1}$ and P20 applied to the "and" gate 898 are necessary to write the leader bit into the LSD register for the division operation (D*v*), and these terms are also used during the square root operation.

Steps must be taken to insure that if the computer is turned on during an additional word state ($\overline{Q3}.\overline{K5}.\overline{K6}$), it will at some time proceed to the last word (Q3) state. This then allows a control to be established in the initial start up stages of the computer. For the special subtract (S$u_s$) and the branch (B*r*) operations, the flip-flop Q3 gets set true automatically at P20 bit time. For the multiplication, division and square root operations, the flip-flop (Q3) is set true by the flip-flop (L2) at P21 bit time in the additional word times of these operations. During the multiplication operation, the flip-flop L2 is set true by the flip-flop (L1) which, in turn, is set true at P21 bit time. Moreover, considering the Q2 and Q3 logic, the flip-flop (Q2) will be true at P21 bit time at some time or other, regardless of whether the flip-flop (U3) is true or not. For square root and division, however, there are problems if the contents of the LSD accumulator register happen to be all zeroes. In this case the flip-flop (L2) would never get set high, and, therefore, the flip-flop (Q3) would never get out of the additional word state.

The terms $\overline{D1}$ and P20 applied to the "and" gate 898 are used to make sure that a "one" will always be written into the LSD accumulator register for the square root and division operations. As previously mentioned, this term writes the proper leader bit during the first additional word time for division. For the square root operation, however, when the term $\overline{L2}.\overline{Q3}$ is true, a one in the LSD accumulator register represents the only manner in which the flip-flop (D1) may be set true. Therefore, if there is no one in the LSD accumulator register, the flip-flop (D1) will remain false. It is for that reason that the $\overline{D1}.P20$ term appears in the logic of FIGURE 42, this term causing a "one" to be written into the LSD accumulator register. In this manner, the terms D1 and P20 applied to the "and" gate 898 allow a proper control to be established if the computer should be turned on during any additional word states.

The input to the write amplifier $u_1$ during the shift operation (S*h*) is from the flip-flop (D4) for all operations in the shift instruction except the right shift. For the right shift operation, the input to the write amplifier $u_1$ is from the read amplifier U1 which allows a right shift of one bit for each word time. The terms P0, $\overline{Q5}$ and $\overline{Q6}$ applied to the "and" gate 866 allows the read amplifier $u_1$ to read the flip-flop (D4) at P0 bit time of all word times. The terms B2 and D5 applied to the "or" gate 876 allows the write amplifier $u_1$ to copy the contents of the flip-flop (D4) during all shift operations, except the right shift. The terms U1, #F4, $\overline{B2}$, $\overline{D5}$, $\overline{Q1}$ and $\overline{P0}$ applied to the "and" gate 860 allows the write amplifier $u_1$ to copy the output of the read amplifier U1 for the right shift operation.

During the B*r*, T*r*, C*t*, S*t*, A*d*, S*u*, A*c* and E*x* operations, the input to the write amplifier $u_1$ is from the flip-flop (D4). This allows normal recirculation of the LSD accumulator register. The term #F3 applied to the "or" gate 864 allows the write amplifier $u_1$ to read the flip-flop (D4) for the branch, transfer, control, add and subtract operations. The terms $\overline{Q1}$ and Q6 applied to the "and" gate 882 allow the write amplifier $u_1$ to read the flip-flop (D4) at P21 bit time of the computer control state 11 for the branch operation. The terms Q3, Q4 and $\overline{P0}$ applied to the "and" gate 868 provide the proper logic for the write amplifier $u_1$ at $\overline{P0}$ bit times for the clear-add and extract operations. The terms P0, $\overline{Q5}$ and $\overline{Q6}$ applied to the "and" gate 866 allow the write amplifier U1 to read the flip-flop (D4) at P0 bit time of all the non-additional word time control states of the computer. The term Q1 applied to the "or" gate 876 allows the write amplifier $u_1$ to read the flip-flop (D4) during the store operation.

During the special subtract (S$u_s$) operation, the write amplifier $u_1$ must read the output #A2 of the full adder 22 of FIGURE 8. This must occur at all bit times of the first word time of the operation, except P0 bit time; and it must read this output at the P0 bit time of the second word time of the operation.

The terms applied to the "and" gate 884 allow the write amplifier $u_1$ to read the terms #A2.$\overline{P0}$ in the computer control states 40, 41, 50, 51, 60 and 70. The terms $\overline{Q1}$, $\overline{Q2}$, Q6 and P0 applied to the "and" gate 892 allow the write amplifier $u_1$ to read this output #A2 at P0 bit time of the additional word state. In all non-additional word states, the write amplifier $u_1$ must read the contents of the flip-flop (D4) at P0 bit time, as provided by the terms P0, $\overline{Q5}$ and $\overline{Q6}$ applied to the "and" gate 866. The term #F3 applied to the "or" gate 864 provides normal recirculation of the LSD accumulator register through the flip-flop D4 in the computer control states 00, 10, 40, 41, 61 and 71.

It should be remembered that the computer control states 20, 21, 30, 40, and 41 are not programmed for the special subtract operation, and that these computer control states can never be entered in this operation. The $\overline{Q1}$ term applied to the "and" gate 882 allows the write amplifier $u_1$ to receive the contents of the flip-flop (D4) at P0 bit time in the additional word states.

The logic associated with the write amplifier $u_2$ of the MSD accumulator register of FIGURE 1 is shown in FIGURE 43. An "or" gate 910 is connected to the input terminal $u_2$ of the write amplifier, and through an inverter 912 to the input terminal $\overline{u}_2$ of the write amplifier. A plurality of "and" gates 914, 916, 918, 920 and 922 is connected to the "or" gate 910. An "or" gate 924 is connected to the "and" gate 914. A plurality of "and" gates 926, 928, 930, 932 and 934 is connected to the "or" gate 924. An "or" gate 936 is connected to the "and" gate 930.

An "or" gate 938 is connected to the "and" gate 918. A pair of "and" gates 940 and 942 is connected to the "or" gate 938. An "or" gate 944 is connected to the "and" gate 942. An "or" gate 946 is connected to the "and" gate 920. A pair of "and" gates 948 and 950 is connected to the "or" gate 946. An "or" gate 952 is connected to the "and" gate 948. An "or" gate 954 is connected to the "and" gate 922. A pair of "and" gates 956 and 958 is connected to the "or" gate 954. An "or" gate 960 is connected to the "and" gate 956, and a pair of "and" gates 962 and 964 is connected to the "or" gate 960. An "or" gate 966 is connected to the "and" gate 958, and a pair of "and" gates 968 and 970 is connected to the "or" gate 966.

The term #A2 is introduced to the "and" gate 914. The terms #F2 and #F3 are introduced to the "or" gate 924. The terms P0, $\overline{Q5}$ and $\overline{Q6}$ are introduced to the "and" gate 926. The terms $\overline{K3}$, $\overline{K4}$, #F5 and Q4 are introduced to the "and" gate 928. The term Q6 is introduced to the "and" gate 930. The terms Q1 and $\overline{P0}$ are introduced to the "or" gate 936. The terms L2, $\overline{Q3}$ and Q5 are introduced to the "and" gate 932. The terms Q3, Q4 and $\overline{P0}$ are introduced to the "and" gate 934.

The terms D4, #F1 and $\overline{P0}$ are introduced to the "and" gate 916. The terms D4, $\overline{Q1}$, $\overline{Q2}$, $\overline{Q3}$ and $\overline{Q4}$ are introduced to the "and" gate 918. The terms Q6 and P0 are introduced in the "and" gate 940. The terms K5 and $\overline{P0}$ are introduced to the "and" gate 942. The terms $\overline{K4}$ and $\overline{K6}$ are introduced to the "or" gate 944.

The terms #F4 and $\overline{P0}$ are introduced to the "and" gate 920. The term D3 is introduced to the "and" gate 948. The terms B2, D5 and Q1 are introduced to the "or" gate 952. The terms U2, $\overline{B2}$, $\overline{D5}$ and $\overline{Q1}$ are introduced to the "and" gate 950. The term Q5 is introduced to the "and" gate 922. The terms $\overline{L2}$ and $\overline{Q3}$ are introduced to the "and" gate 956. The terms D4 and Q1 are introduced to the "and" gate 962. The terms $\overline{D4}$ and $\overline{Q1}$ are introduced to the "and" gate 964. The terms D4 and Q1 are introduced to the "and" gate 968. The terms $\overline{D4}$ and $\overline{Q1}$ are introduced to the "and" gate 970. The terms Q3 and P0 are introduced to the "and" gate 958.

During the additional word times of the multiplication operation the input of the write amplifier $u_2$ alternates between the flip-flop (D4) and the output #A2 from the full adder 22 in the circuit of FIGURE 8, this being under the control of the flip-flop (L2). When the input is from the flip-flop (D4), a carry ($\overline{Q1}$) must be propagated through the MSD accumulator register.

The terms P0, $\overline{Q5}$ and $\overline{Q6}$ applied to the "and" gate 926 allow the write amplifier $u_2$ to write the output #A2 of the adder 22 at P0 bit time of the first word time of the multiplication operation. Also, the terms L2, $\overline{Q3}$ and Q5 applied to the "and" gate 932 allow the flip-flop $u_2$ to write the output #A2 from the adder 22 during all but the last additional word time of the multiplication operation, when the flip-flop (L2) is true. The terms Q3, Q4 and $\overline{P0}$ applied to the "and" gate 934 allow the output #A2 to be written at all but the P0 bit time of the last word time of the multiplication operation.

The terms D4, #F1 and $\overline{P0}$ applied to the "and" gate 916 allow the contents of the flip-flop (D4) to be written by the write amplifier $u_2$ at all but the P0 bit time of the first word time of the multiplication operation. The term Q5 applied to the "and" gate 922 provides the carry propagation during all but the last additional word time, when the flip-flop (L2) is false; and, at P0 bit time of the last word time. The terms applied to the "and" gates 962 and 964 represent the one-bit adder logic with the term $\overline{Q1}$ indicating a carry.

For the division operation the MSD accumulator register contains the dividend. The MSD accumulator register also contains the bar of the quotient bit at P21 bit time of each additional word time. The input to the $u_2$ write amplifier during the division operation is the output #A2 of the adder 22 at P0 bit time of all the non-additional word states. This is provided by the terms P0, $\overline{Q5}$ and $\overline{Q6}$ applied to the "and gate 926. The term #F2 applied to the "or" gate 924 allows the write amplifier $u_2$ to receive the output #A2 of the adder 22 during the first word time of the division operation. The Q1 term applied to the "or" gate 936 allows the write amplifier to receive the output #A2 of the adder during all the additional word states.

The MSD accumulator register is used as the most significant accumulator for the square root operation (S*q*). The logic for the square root operation on the write amplifier $u_2$ is exactly the same for the square root operation as it is for the division operation, as described above.

The input to the write amplifier $u_2$ is through the adder 22 in FIGURE 8 at P0 bit time for all word times of the shift operation. This is provided by the terms P0, $\overline{Q5}$ and $\overline{Q6}$ applied to the "and" gate 926. The terms applied to the "and" gate 920 provide the logic for the shift operation at all the bit times except the P0 bit time. The U2, $\overline{B2}$, $\overline{D5}$ and $\overline{Q1}$ terms applied to the "and" gate 950 allow the write amplifier $u_2$ to copy the read amplifier U2, and thus provide a one-bit right shift. For all other combinations of shift operation the write amplifier $u_2$ copies the contents of the flip-flop D3, as shown by the terms applied to the "and" gate 948. The term $\overline{F3}$ applied to the "or" gate 924 provides normal recirculation for the MSD accumulator register in the computer control states 00 and 10 of the shift operation. It should be noted that the computer control states 20 and 30 are not programmed for the shift operation.

During the operations B*r*, T*r*, C*t*, A*d*, S*u*, A*c* and E*x* the input to the $u_2$ write amplifier is from the adder 22 in FIGURE 8 (#A2). This allows normal recirculation of, or addition to, the MSD accumulator register. The term #F3 applied to the "or" gate 924 allows the write amplifier $u_2$ to copy the output #A2 for the branch, transfer, control, add and subtract operations. The $\overline{P0}$ term applied to the "or" gate 936 allows the write amplifier $u_2$ to read the output #A2 at the P21 bit time of the computer control state 11 for the branch operation. The terms Q3, Q4 and $\overline{P0}$ applied to the "and" gate 934 provides the proper logic for the write amplifier $u_2$ at all the bit times, except the P0 bit time for the clear-add and extract operations. The terms P0, $\overline{Q5}$ and $\overline{Q6}$ applied to the "and" gate 926 allow the write amplifier $u_2$ to copy the output #A2 of the adder 22 at P0 bit time of all the non-additional word control states of the computer.

During the actual store operation (the flip-flop K5 being true) the $u_2$ write amplifier gets its input from the flip-flop (D3) at all the bit times, except the P0 bit time. This is provided by the Q1 term applied to the "or" gate 952. The term F3 applied to the "or" gate 924 allows normal recirculation in the computer control states 00 and 10. The terms P0, Q5 and Q6 applied to the "and" gate 926 provide recirculation at P0 bit time in all non-additional computer word states. It should be noted that there is no true logic in FIGURE 43 for the computer control states 20 and 30 for the store operation. These states, therefore, should not be programmed.

During the special subtract (S$u_s$) operation the MSD accumulator register must recirculate through the flip-flop (D4) in the first word time of the special subtract operation, and it must read the output #A2 of the adder 22 during the second word time of the operation. The terms applied to the "and" gate 918 allow the write amplifier $u_2$ to receive the contents of the flip-flop (D4) at $\overline{P0}$ bit times of the first word time, and at P0 bit time of the second word time of the special subtract operation. The terms P0, $\overline{Q5}$ and $\overline{Q6}$ applied to the "and" gate 926 allow the write amplifier $u_2$ to receive the output #A2 of the adder 22 at P0 bit time of all the non-additional word states of the computer, and the term F3 applied to the "or" gate 924 permits this for all other bit times in the computer control states 00, 10, 40, 41, 61 and 71. The $\overline{P0}$ bit time applied to the "or" gate 936 allows the write amplifier $u_2$ to receive the output #A2 of the adder 22 in the additional word states. The special subtract (S$u_s$) operation is never programmed for the computer control states 20, 21, 30, 40 and 41; and the computer control state 71 can never be entered in the $Su_8$ operation.

The logic associated with the write amplifier $u_3$ of the multiplier or divisor register of FIGURE 1 is shown in FIGURE 44. An "or" gate 980 is connected to the input terminal $u_3$ of the write amplifier, and the "or" gate is connected through an inverter 982 to the input terminal $\overline{u}_3$ of the write amplifier. A plurality of "and" gates 984, 986, 988, 990 and 992 is connected to the "or" gate 980. An "or" gate 994 is connected to the "and" gate 986 and an "and" gate 996 is connected to the "or" gate 994.

The term #F2, Q2 and P20 are introduced to the "and" gate 984. The term #R1 is introduced to the "and" gate 986. The term #F1 is introduced to the "or" gate 994. The terms #F2 and $\overline{Q2}$ are introduced to the "and" gate 996. The terms $\overline{K5}$, K6, U3 and $\overline{L1}$ are introduced to the "and" gate 998. The terms $\overline{U3}$, L1 and Q6 are introduced to the "and" gate 990. The terms L1, L3 and Q5 are introduced to the "and" gate 992.

The term #F1 applied to the "or" gate 994 allows the multiplier to be read into the multiplier register during the first word time of the multiplication operation. The term #R1 applied to the "and" gate 986 is the output from an emitter follower which specifies the multiplier for each of the various multiplication operations. The terms $\overline{K5}$, K6, U3 and $\overline{L1}$ applied to the "and" gate 998 allow the multiplier register to recirculate when the flip-flop L1 is false, and in all the additional word states. The terms L1, L3 and Q5 applied to the "and" gate 992 cause "ones" to be written into the multiplier register in such a manner that the location of the "ones" precesses two bits toward the most significant end of the register for each word time. This precession of a pair of "ones" in the multiplier register provides the timing for the reversal of the multiplier flip-flops (B1) and B2). When the term $L1.\overline{L3}$ is true, no term in the logic of FIGURE 44 is true, and, therefore, zeroes will be written into the multiplier register. The multiplier register is not used for storage in any other operation, except for square root and division. Therefore, no specific logic is required for the write amplifier $u_3$ in the last word time of any operation.

The multiplier register provides recirculation for the divisor during the division operation. The terms #F2 and $\overline{Q2}$ applied to the "and" gate 996 allow the divisor to be read from the emitter follower #R1 into the write amplifier $u_3$ during the first word time of the division operation. The terms $\overline{K5}$, K6, U3 and $\overline{L1}$ applied to the "and" gate 988 allow normal recirculation of the multiplier register during all but the last additional word time of the division operation. During the last word time of the division operation, either the terms applied to the "and" gate 988, or the terms applied to the "and" gate 990, may be true. However, since the divisor is not held in the multiplier register for temporary storage after the operation, the logic in FIGURE 44 during the last word time of a division operation is unimportant.

The multiplier or divisor register contains the trial square root during the square root operation. During the first word time of the square root operation the terms #F2, Q2 and P20 applied to the "and" gate 984 cause a "one" to be written into the register in the $2^{-1}$ digit position. This represents the first trial bit of the square root. During the additional word state the terms applied to the "and" gate 988 or to the "and" gate 990 provide one bit adder logic for the write amplifier $u_3$, the flip-flop (L1) serving as the carry flip-flop. This allows $2^{-1}$ to be added or subtracted from the old value of the square root. This gives the new corrected value of the square root, plus the new trial change in the square root. Since the square root is not held in the multiplier or divisor register for temporary storage after the operation, the logic in FIGURE 44 during the last word time of the square root operation is unimportant.

The logic associated with the write amplifier $u_4$ of the multiplicand register of FIGURE 1 is set out in FIGURE 45. An "or" gate 1000 is connected to the input terminal $u_4$ of the write amplifier, and the "or" gate is connected through an inverter 1002 to the input terminal $\overline{u}_4$ of the write amplifier. The plurality of "and" gates 1004, 1006, 1008, 1010, 1012 and 1014 is connected to the "or" gate 1000. An "or" gate 1016 is connected to the "and" gate 1008. A plurality of "and" gates 1018, 1020, 1022 and 1024 is connected to the "or" gate 1016. An "or" gate 1026 is connected to the "and" gate 1022, and an "or" gate 1028 is connected to the "and" gate 1024. An "and" gate 1030 is connected to the "or" gate 1028. An "or" gate 1032 is connected to the "and" gate 1014, and a pair of "and" gates 1034 and 1036 is connected to the "or" gate 1032. An "or" gate 1038 is connected to the "and" gate 1034, and a pair of "and" gates 1040 and 1042 is connected to the "or" gate 1038.

The terms D5 and #F1 are introduced to the "and" gate 1004. The terms D6 and #F2 are introduced to the "or" gate 1006. The term U4 is introduced to the "and" gate 1008. The terms Q3, $\overline{Q5}$ and $\overline{Q6}$ are introduced to the "and" gate 1018. The terms $\overline{Q1}$ and $\overline{Q4}$ are introduced to the "and" gate 1020. The terms $\overline{K3}$, $\overline{K4}$ and K5 are introduced to the "and" gate 1024. The term K6 is introduced to the "or" gate 1028. The terms $\overline{L3}$, Q1 and $\overline{Q2}$ are introduced to the "and" gate 1030. The term #F3 is introduced to the "and" gate 1022. The terms K4 and $\overline{K5}$ are introduced to the "or" gate 1026.

The terms $\overline{K3}$, $\overline{K4}$, K5, $\overline{K6}$ and Q4 are introduced to the "and" gate 1014. The terms X2, $\overline{Q1}$ and $\overline{Q2}$ are introduced to the "and" gate 1036. The term U2 is introduced to the "and" gate 1034. The terms $\overline{Q1}$ and Q2 are introduced to the "and" gate 1040. The terms L3, Q1 and $\overline{Q2}$ are introduced to the "and" gate 1042.

During the first word time of a multiplication operation, the terms D5 and #F1 are applied to the "and" gate 1004 allow the multiplicand to be written into the multiplicand register of FIGURE 1. During all additional word times of the multiplication operation, the terms D5 and Q5 applied to the "and" gate 1010 allows the multiplicand to recirculate through the flip-flop D5. The terms X2, $\overline{Q1}$ and $\overline{Q2}$ applied to the "and" gate 1036 allow the multiplicand to be stored in the multiplicand register from the read amplifier X2 of the permanent and scratch pad memory of FIGURE 1, this occurring in the computer control state 40 for the (M*a*) multiplication operation. The terms $\overline{Q1}$ and Q2 applied to the "and" gate 1040 allow the contents of the MSD accumulator register to be stored in the multiplicand register for the M*c* multiplication operation during the computer control state 40 and for the (M*b*) multiplication operation, when the flip-flop L3 is true.

The multiplicand register is used as a temporary storage register for the multiplicands during all other operations except division and square root. Therefore, the multiplicand register must recirculate during all other operations except (D*v*) and (S*q*). The terms applied to the "and" gate 1008 provide this recirculation. The terms Q3, $\overline{Q5}$ and $\overline{Q6}$ applied to the "and" gate 1018 take care of all non additional word states for all Q3 operations. The terms Q1 and Q4 applied to the "and" gate 1020 provide recirculation for the $Su_8$, B*r*, T*r* and S*h* operations, in all the computer control states. The terms applied to the "and" gate 1024 take care of the computer control state 41 for all operations, and of the computer control state 40 for the M*b* multiplication operation ($\overline{L3}$). The terms applied to the "and" gate 1022 take care of the computer control states 61 and 71 for the M*a* and M*c* operations, and take care of the computer control states 00 and 10 for all $\overline{Q3}$ computer operations.

During the division operation (D*v*) the multiplicand register acts as a storage for the least significant bits of the dividend, and for the quotient bits. The quotient bits are shifted in as the dividend bits are shifted out. The least significant bits of the dividend are shifted one bit toward the most significant digit through the flip-flop D6 during each word time. This is accomplished during the first word time of the division by the terms D6 and #F2 applied to the "and" gate 1006. The terms D6, Q1 and Q6 applied to the "and" gate 1012 allows the multiplicand register to recirculate through the D6 flip-flop during all additional word states of the division operation. During the last word time of the division operation, the quotient is written in the multiplicand register. However, this is the unrounded quotient and, hence, should probably not be used in any additional operations.

The logic on the $u_4$ write amplifier during the square root operation (S$q$) is exactly the same as the logic discussed above for the division operation.

The logic associated with the write amplifier $w_1$ of the upper instruction register of FIGURE 1 is set out in FIGURE 46. An "or" gate 1050 is connected to the input terminal W1 of the write amplifier, and an "or" gate is coupled through an inverter 1052 to the input terminal $\overline{w}_1$ of the write amplifier. An "and" gate 1053 is connected to the "or" gate 1050, and an "or" gate 1054 is connected to the "and" gate. A plurality of "and" gates 1056, 1058, 1060 and 1062 is connected to the "or" gate 1054. An "or" gate 1064 is connected to the "or" gate 1060, and a pair of "and" gates 1066 and 1068 is connected to the "or" gate 1064. An "or" gate 1070 is connected to the "and" gate 1066, and an "and" gate 1072 is connected to the "or" gate 1070. An "or" gate 1074 is connected to the "and" gate 1068.

The term #Y$b$ is introduced to the "or" gate 1050, and the terms *S34 and *T$d$ are introduced to the "and" gate 1053. The terms X3, $\overline{K3}$ and K4 are introduced to the "and" gate 1056. The terms X1, K3 and $\overline{K4}$ are introduced to the "and" gate 1058. The terms W1, $\overline{K3}$, and $\overline{K4}$ are introduced to the "and" gate 1062. The terms K3 and K4 are introduced to the "and" gate 1060. The term X2 is introduced to the "and" gate 1066, and the term K5 is introduced to the "or" gate 1070. The terms K2 and K6 are introduced to the "and" gate 1072. The terms W1 and K5 are introduced to the "and" gate 1068, and the terms $\overline{K2}$ and $\overline{K6}$ are introduced to the "or" gate 1074.

The upper instruction register as described in conjunction with FIGURE 1, is 22 bits in length, and it contains the sector and track addresses of the $\alpha$ and $\beta$ operands, as well as the operation code for the upper instruction. The terms X3, K3 and K4 is applied to the "and" gate 1056 and provides for the reading in of the new instruction from the X3 read amplifier of the instruction storage tracks of FIGURE 1. This operation occurs in the computer control states 20, 60, 21 and 61. The terms X1, X3 and $\overline{K4}$ applied to the "and" gate 1058 allow the $\alpha$ operand to be read into the write amplifier $w_1$ from the read amplifier X1 of the permanent and scratch pad memory in FIGURE 1, in the computer control states 10, 50, 11 and 51. This latter term is necessary only for the branch operation in the computer control states 50 and 51. However, the term has no adverse effect if it is true for all operations in these states. The terms W1, $\overline{K3}$ and $\overline{K4}$ applied to the "and" gate 1062 allows the upper instruction register to recirculate in the computer control states 00, 40, 01 and 41.

The K2 and K6 terms applied to the "and" gate 1072 allows the $\gamma$ operand to be read into the upper instruction register from the read amplifier X2 of the permanent and scratch pad memory of FIGURE 1 in the computer control state 31. This allows the upper instruction register to be used as a temporary storage for the $\gamma$ operand during the additional word operations. The K5 term applied to the "or" gate 1070 allows the $\gamma$ operand to be read into the upper instruction register in the computer control states 70 or 71. This latter term is necessary only for the branch operation. The $\overline{K2}$ term applied to the "or" gate 1074 allows the contents of the upper instruction register to recirculate in the computer control state 31 when the $\gamma$ operand has already been found. The $\overline{K6}$ term applied to the "or" gate 1074 allows the upper instruction register to recirculate in the computer control state 30 for the branch operation.

The *T$d$ quotient introduced to the "and" gate 1053 is necessary to clear the upper instruction register during the initial start up of the machine. The term *T$d$ is false at initial start up, and this allows zeroes to be written into the upper instruction register due to the inverter 1052. When control has been established after a time delay, the term *T$d$ becomes true and normal logic is permitted.

The *S3 qualifier applied to the "and" gate 1053 for a control term for the instruction fill operation of the computer control unit. When the computer control unit is connected and an instruction is to be read into the write amplifier $w_1$ from the instruction controls on the computer control unit; the *S3 qualifier term becomes low, and the #Y$b$ term is then allowed to read the switches on the computer control unit into the upper instruction register. When the computer control unit is disconnected, or when no instructions are to be read from the computer control, the term #S3 becomes true and the term #Y$b$ becomes false in the computer.

The logic associated with the write amplifier $w_2$ of the lower instruction register of FIGURE 1 is illustrated in FIGURE 47. An "or" gate 1080 is connected to the input terminal $w_2$ of the write amplifier, and the "or" gate is connected through an inverter 1082 to the input terminal $\overline{w}_2$ of the write amplifier. An "and" gate 1084 is connected to the "or" gate 1080, and an "or" gate 1086 is connected to the "and" gate 1084. A plurality of "and" gates 1088, 1090, 1092 and 1094 is connected to the "or" gate 1086. An "or" gate 1096 is connected to the "and" gate 1088, and an "or" gate 1098 is also connected to that "and" gate. A plurality of "and" gates 1100, 1102, 1104, 1106 and 1108 is connected to the "or" gate 1096. An "or" gate 1110 is connected to the "and" gate 1104, and an "or" gate 1112 is connected to the "and" gate 1108. A pair of "and" gates 1114 and 1116 is connected to the "or" gate 1112.

An "or" gate 1118 is connected to the "and" gate 1094, and a pair of "and" gates 1120 and 1122 is connected to the "or" gate 1118. An "or" gate 1124 is connected to the "and" gate 1120, and an "or" gate 1126 is connected to the "and" gate 1122. A plurality of "and" gates 1128, 1130, 1132 and 1134 is connected to the "or" gate 1124. A plurality of "and" gates 1136, 1138 and 1140 is connected to the "or" gate 1126.

The term #Y$c$ is introduced to the "and" gate 1080. The terms *S3 and *T$d$ are introduced to the "and" gate 1084. The term W2 is introduced to the "and" gate 1088, and the terms K3 and $\overline{K4}$ are introduced to the "or" gate 1098. The terms K5 and K6 are introduced to the "and" gate 1102. The terms $\overline{K5}$ and $\overline{K6}$ are introduced to the "and" gate 1100. The term $\overline{Q2}$ is introduced to the "and" gate 1104, and the terms Q1 and Q4 are introduced to the "or" gate 1096. The terms B1, B2, $\overline{K3}$, $\overline{K5}$ and $\overline{Q3}$ are introduced to the "or" gate 1110. The terms B1, $\overline{K5}$ and Q2 are introduced to the "and" gate 1106, and the terms K5 and Q2 are introduced to the "and" gate 1108. The terms #A2 and P0 are introduced to the "and" gate 1114. The terms $\overline{D5}$ and Q3 are introduced to the "and" gate 1116. The term K4 is introduced to the "or" gate 1112.

The terms #F5, $\overline{Q4}$ and $\overline{K6}$ are introduced to the "and" gate 1094. The terms X2, Q2 and $\overline{K4}$ are introduced to the "and" gate 1120. The terms $\overline{\#A2}$, $\overline{Q3}$ are introduced to the "and" gate 1128. The terms $\overline{\#A2}$ and D5 are introduced to the "and" gate 1130. The term $\overline{Q3}$ and the term $\overline{P0}$ are introduced to the "and" gate 1132. The term D5 and the term $\overline{P0}$ are introduced to the "and" gate 1134. The terms $\overline{B1}$, $\overline{B2}$, Q3, $\overline{Q2}$ and K3 are introduced to the "and" gate 1122. The terms X1, K4 and D5 are introduced to the "and" gate 1136. The terms U2 and $\overline{D5}$ are applied to the "and" gate 1138. The terms X2, $\overline{K4}$ and D5 are introduced to the "and" gate 1140.

The $w_2$ write amplifier is associated with the lower instruction register of FIGURE 1, as described above, this register is 22 bits in length, and it contains the sector and track addresses of the $\gamma$ operand and of $\delta$ the next instruction. This register also contains the operation code for the lower operation.

The terms X4, $\overline{K3}$ and K4 applied to the "and" gate 1090 allow the lower instruction register to be filled, from the read amplifier X4 of the instruction tracks of FIGURE 1, during the normal instruction read-in computer control states 20, 60, 21 and 61. The terms K3 and K4 applied to the "or" gate 1098 allow the read amplifier W2 to be read during all the computer control states except the instruction read-in states. The terms K5 and K6 applied to the "and" gate 1102 allows the lower instruction register to recirculate in the computer control states 41, 51 and 71. The terms $\overline{K5}$ and $\overline{K6}$ applied to the "and" gate 1100 allows the lower instruction register to recirculate in the computer control states 00, 10 and 30.

In the computer control states 40, 50 and 70, the lower instruction register should recirculate for all operations except branch transfer and shift. This recirculation is provided by the terms Q1 and Q4 applied to the "or" gate 1096, and by the $\overline{Q3}$ term applied to the "or" gate 1110. The other terms applied to the "or" gate 1110, and the terms applied to the "and" gates 1106 and 1108 are conditions under which the lower instruction register should recirculate for the three afore-mentioned operations. In the computer control states 01, 11, 21 and 31, the lower instruction register should recirculate for all operations except the branch operation. The terms Q1 and Q4 applied to the "or" gate 1096, and the term $\overline{K5}$ applied to the "or" gate 1110 provide for the latter recirculation.

The terms applied to the "or" gate 1124 provide the input to the write amplifier $w_2$ for the branch transfer and shift operations under the various controls for these operations. These terms allow the $\beta$ operand to be read into the lower instruction register for the computer control states 40 and 50 for the branch and shift operation. The flip-flop K6 remembers the sign digit of the accumulator register, and it is set true if this digit is negative. It can be seen that the terms #$\overline{A2}$ and $\overline{Q3}$ applied to the "and" gate 1128 and $\overline{Q3}$ and $\overline{P0}$, applied to the "and" gate 1132 allow the read amplifier X2 of the permanent and scratch pad memory of FIGURE 1 to read into the lower instruction register for the branch operation when the contents of the accumulator register are greater than or equal to zero. Similarly, the terms #$\overline{A2}$ and D5 applied to the "and" gate 1130, and the terms D5 and $\overline{P0}$ applied to the "and" gate 1134, allow this read amplifier to be read into the write amplifier $w_2$ for the shift operation when a branch is called for, and when the contents of the accumulator register are greater than, or equal to, zero.

The terms applied to the "or" gate 1126 allow the transfer of information from the read amplifiers X1, X2 or U2 into the write amplifier $w_2$ for the transfer operation. The terms X1, K4 and D5 applied to the "and" gate 1136 allow the output from the read amplifier X1 to be transferred to the write amplifier $w_2$ in the computer control state 70. The terms X2, $\overline{K4}$ and D5 applied to the "and" gate 1140 allows the output from the read amplifier X2 to be transferred to the write amplifier $w_2$ in the computer control state 50.

The terms X2, $\overline{K4}$ and D5 applied to the "and" gate 1140 allow the selected output from the read amplifier X2 of the permanent and scratch pad memory of FIGURE 1 to be transferred to the write amplifier $w_2$ in the computer control state 50; and the term U2 and $\overline{D5}$ applied to the "and" gate 1138 allow the contents of the M.S.D. accumultaor register to be transferred to the write amplifier $w_2$ in the computer control states 50 or 70. The terms applied to the "and" gate 1092 allow the contents of the L.S.D. accumulator register to be transferred to the write amplifier $w_2$ in the computer control state 01 (this being the only additional word state allowed for the branch operation) when the contents of the accumulator register are equal to zero, as indicated by the term $\overline{D1}$.

With reference to the terms applied to the "and" gate 1104, it can be seen that the terms B1 or B2 or $\overline{K3}$ or $\overline{K5}$ or $\overline{Q3}$ are essentially the bar of the qualifier for the terms applied to the "and" gate 1136, 1138 and 1140. That is, in the transfer operation, when the terms applied to these "and" gates are not true, then the contents of the lower instruction register should recirculate. Also, it can be seen that the terms applied to the "and" gate 1108 are essentially the bar of the terms applied to the "and" gates 1128, 1130, 1132 and 1134. That is, for the branch and shift operations when the contents of the accumulator register is negative, the contents of the lower instruction register should recirculate. The terms B1, $\overline{K5}$ and Q2 applied to the "and" gate 1106 allows the lower instruction register to recirculate in the additional word states for the branch operation when the contents of the accumulator register is not equal to zero.

The *S3 and *T*d* terms applied to the "and" gate 1084 perform the same function for the write amplifier $w_2$ as they did for the write amplifier $w_1$, as discussed above in conjunction with FIGURE 46. Also, the term #Y*c* applied to the "or" gate 1080 has the same function for the write amplifier $w_2$ as the term does for the write amplifier $w_1$ as described in conjunction with FIGURE 46.

The logic associated with the write amplifier $x_1$ of the scratch pad memory of FIGURE 1 is set out in FIGURE 48. An "or" gate 1142 is connected to the input terminal $x_1$ of the write amplifier, and an "or" gate 1144 is connected to the input terminal $\overline{x_1}$ of the write amplifier. A plurality of "and" gates 1146, 1148 and 1150 is connected to the "or" gate 1142. A pair of "and" gates 1152 and 1154 is connected to the "or" gate 1144. An "or" gate 1156 is connected to the "and" gate 1146, and an "or" gate 1158 is connected to the "and" gate 1148. An "or" gate 1160 is connected to the "and" gate 1154. An "and" gate 1162 is connected to the "or" gate 1156, a plurality of "and" gates 1164, 1166 and 1167 is connected to the "or" gate 1158, and a pair of "and" gates 1168 and 1170 is connected to the "or" gate 1160. An "or" gate 1172 is connected to the "and" gate 1162, and an "or" gate 1174 is connected to the "and" gate 1168 and an "or" gate 1176 is connected to the "and" gate 1170.

A pair of "and" gates 1178 and 1180 is connected to the "or" gate 1172. A pair of "and" gates 1182 and 1184 is connected to the "or" gate 1174. A group of "and" gates 1176, 1188 and 1190 is connected to the "or" gate 1176. An "or" gate 1192 is connected to the "and" gate 1178, and an "or" gate 1194 is connected to the "and" gate 1180, an "or" gate 1196 is connected to the "and" gate 1182, and an "or" gate 1198 is connected to the "and" gate 1184. A pair of "and" gates 1200 and 1202 is connected to the "or" gate 1192. A pair of "and" gates 1204 and 1206 is connected to the "or" gate 1196. The terms B1, $\overline{B2}$, K5, Q3 and $\overline{Q4}$ are applied to the "and" gate 1146. The terms Q1 and Q2 are applied to the "and" gate 1162.

The terms D5 and $\overline{K1}$ are applied to the "and" gate 1178. The terms U1 and $\overline{K3}$ are applied to the "and" gate 1200. The terms U2 and K3 are applied to the "and" gate 1202. The terms U2 and $\overline{K6}$ are applied to the "and" gate 1180. The terms K3 and K4 are applied to the "or" gate 1194. The terms #F5 and $\overline{Q2}$ are applied to the "and" gate 1148. The terms X1, D5, K4 and $\overline{K6}$ are applied to the "and" gate 1164. The terms X2, D5 and $\overline{K4}$ are applied to the "and" gate 1166. The terms #I2 and $\overline{D5}$ are applied to the "and" gate 1167. The terms W1 and K2, $\overline{K3}$, K4, $\overline{K5}$, K6, L4 and $\overline{Q3}$ are introduced to the "and" gate 1150.

The terms $\overline{W1}$, K2, $\overline{K3}$, K4, $\overline{K5}$, K6, $\overline{Q3}$ and L4 are all introduced to the "and" gate 1152. The terms B1, B2, K5, Q3 and $\overline{Q4}$ are all introduced to the "and" gate 1154. The terms Q1 and Q2 are introduced to the "and" gate 1168. The terms D5 and $\overline{K4}$ are introduced to the "and" gate 1182. The terms $\overline{U1}$ and $\overline{K3}$ are introduced to the "and" gate 1204. The terms $\overline{U2}$ and K3 are introduced to the "and" gate 1206.

The terms $\overline{U2}$ and $\overline{K6}$ are introduced to the "and" gate 1034. The terms K3 and K4 are introduced to the "or" gate 1198. The terms #F5 and $\overline{Q2}$ are introduced to the "and" gate 1170. The terms D5, X1 and $\overline{K6}$ are applied to the "and" gate 1186. The terms $\overline{X2}$, D5 and $\overline{K4}$ are applied to the "and" gate 1188. The terms $\overline{K4}$, $\overline{D5}$ and $\overline{I2}$ are introduced to the "and" gate 1190.

During the transfer operation (T*r*), information from the read amplifiers X1, X2 or I1 can be written into the $x_1$ write amplifier to be recorded on the scratch pad track in FIGURE 1. For the upper operation, the terms X2, D5 and $\overline{K4}$ applied to the "and" gate 1166 and $\overline{X2}$, D5 and $\overline{K4}$ applied to the "and" gate 1188 allow the contents of the read amplifier X2 to be transferred to the write amplifier $x_1$ in the computer control states 40, 41, 50 or 51. For a lower operation, the terms X1, D5, K4 and $\overline{K6}$ applied to the "and" gate 1164, and the terms $\overline{X1}$, D5, K4 and $\overline{K6}$ applied to the "and" gate 1186, allow the output from the read amplifier X1 to be transferred to the write amplifier $x_1$ for the computer control states 60 or 70. The terms #I1 and $\overline{D5}$ applied to the "and" gate 1167; and the terms $\overline{K4}$, $\overline{D5}$ and $\overline{\#I2}$ applied to the "and" gate 1190, allow the output $\#i_2$ of the emitter follower $\#I_2$ of FIGURE 58 to be transferred to the write amplifier $x_1$, for either an upper or lower operation in any K5 state.

During the store operation, either a single length or double length accumulator word can be written on the scratch pad track associated with the write amplifier $x_1$. The terms U1 and $\overline{K3}$ applied to the "and" gate 1200, and the terms $\overline{U1}$ and $\overline{K3}$ applied to the "and" gate 1208 store the contents of the L.S.D. accumulator register in the computer control states 40 and 41. It should be noted that the computer control state 41 is not programmed.

The terms U2 and K3 applied to the "and" gate 1202, and the terms $\overline{U2}$ and K3 applied to the "and" gate 1206, store the contents of the M.S.D. accumulator in the scratch pad memory track in the computer control states 50 and 51. The terms K3 and K4 applied to the "or" gate 1190, an the terms K3 and K4 applied to the "or" gate 1198, allow the contents of the M.S.D. accumulator register to be stored in the scratch pad track associated with the write amplifier $x_1$, in the computer control states 50, 60 and 70 for a lower store operation.

The terms applied to the "and" gates 1150 and 1152 are used for a transfer operation, and these terms allow the contents of the upper instruction register, which represent the $\gamma$ operand, to be stored in the scratch pad memory track associated with the write amplifier $x_1$ in the computer control state 21 of any multiplication operation or for a division or square root operation.

The logic associated with the write amplifier $x_2$ of the scratch pad memory associated with that write amplifier is set out in FIGURE 49. An "or" gate 1150 is connected to the input terminal $x_2$ of the write amplifier, and an "or" gate 1152 is connected to the input terminal $\overline{x_2}$ of the write amplifier. A pair of "and" gates 1154 and 1156 is connected to the "or" gate 1150, and a pair of "and" gates 1158 and 1160 is connected to the "or" gate 1152. An "or" gate 1160 is connected to the "or" gate 1152. An "or" gate 1162 is connected to the "and" gate 1156, and an "or" gate 1164 is connected to the "and" gate 1160. A pair of "and" gates 1166 and 1168 is connected to the "or" gate 1162. A pair of "and" gates 1170 and 1172 is connected to the "or" gate 1164.

An "or" gate 1174 is connected to the "and" gate 1166. An "or" gate 1176 is connected to the "and" gate 1168. An "or" gate 1178 is connected to the "and" gate 1170. An "or" gate 1180 is connected to the "and" gate 1172. A pair of "and" gates 1182 and 1184 is connected to the "or" gate 1174. A pair of "and" gates 1186 and 1188 is connected to the "or" gate 1176. A pair of "and" gates 1190 and 1192 is connected to the "or" gate 1178. A pair of "and" gates 1196 and 1198 is connected to the "or" gate 1180. An "or" gate 1200 is connected to the "and" gate 1182, and an "or" gate 1202 is connected to the "and" gate 1184. An "or" gate 1204 is connected to the "and" gate 1190, and an "or" gate 1206 is connected to the "and" gate 1192. An "and" gate 1208 is connected to the "or" gate 1200 and an "and" gate 1210 is also connected to that "or" gate. A pair of "and" gates 1212 and 1214 is connected to the "or" gate 1204.

The terms W1, K2, $\overline{K3}$, K4, $\overline{K5}$, K6, $\overline{L4}$ and $\overline{Q3}$ are applied to the "and" gate 1154. The terms B1, B2, K5, Q3 and $\overline{Q4}$ are applied to the "and" gate 1156. The terms Q1 and Q2 are applied to the "and" gate 1166. The terms D5 and $\overline{K4}$ are applied to the "and" gate 1182. The terms U1 and $\overline{K3}$ are applied to the "and" gate 1208, and the terms K3 and U2 are applied to the "and" gate 1210.

The terms U2 and $\overline{K6}$ are applied to the "and" gate 1184, and the terms K3 and K4 are applied to the "or" gate 1202. The terms #F5, D5 and $\overline{Q2}$ are applied to the "and" gate 1168. The terms X1, K4 and $\overline{K6}$ are applied to the "and" gate 1186. The terms X2 and $\overline{K4}$ are applied to the "and" gate 1188. The terms $\overline{W1}$, K2, $\overline{K3}$, K4, $\overline{K5}$, K6, $\overline{L4}$ and $\overline{Q3}$ are applied to the "and" gate 1158. The terms B1, B2, K5, Q3 and $\overline{Q4}$ are applied to the "and" gate 1160. The terms Q1 and Q2 are applied to the "and" gate 1170. The terms D5 and $\overline{K4}$ are applied to the "and" gate 1190. The terms $\overline{U1}$ and $\overline{K3}$ are applied to the "and" gate 1212, and the terms $\overline{U2}$ and K3 are applied to the "and" gate 1214.

The terms $\overline{U2}$ and $\overline{K6}$ are applied to the "and" gate 1192, and the terms K3 and K4 are applied to the "or" gate 1206. The terms #F5, $\overline{Q2}$ and D5 are applied to the "and" gate 1172. The terms $\overline{X1}$, K4 and $\overline{K6}$ are applied to the "and" gate 1196. The terms $\overline{X2}$ and $\overline{K4}$ are applied to the "and" gate 1198.

During the transfer operation (T*r*), information from the read amplifier X1 or X2 in FIGURE 1 can be written on the scratch pad track associated with the write amplifier $x_2$. For an upper operation, the terms X2 and $\overline{K4}$ applied to the "and" gate 1188, and the terms $\overline{X2}$ and $\overline{K4}$ applied to the "and" gate 1198, allows the output from the read amplifier X2 to be transferred to the write amplifier $x_2$ in the computer control states 40, 41, 50 or 51. For a lower transfer, the terms X1, K4 and $\overline{K6}$ applied to the "and" gate 1186, and the terms $\overline{X1}$, K4 and $\overline{K6}$ applied to the "and" gate 1194, allow the output from the read amplifier X1 to be written into the write amplifier $x_2$ in the computer control states 60 or 70.

During the Store operation (S*t*), either a single or double length word from the accumulator registers may be written on the scratch pad track associated with the write amplifier $x_2$. The terms U1 and $\overline{K3}$ applied to the "and" gate 1208 ad the terms $\overline{U1}$ and $\overline{K3}$ applied to the "and" gate 1212 store the contents of the least significant accumulator into the scratch pad track associated with the write amplifier $x_2$ in the computer control states 40 or 41. It should be noted that the computer control state 41 is not programmed.

The terms U2 and K3 applied to the "and" gate 1210, and the terms $\overline{U2}$ and K3 applied to the "and" gate 1214, store the contents of the M.S.D. accumulator register in the scratch pad track associated with the write amplifier $x_2$ in the computer control states 50 and 51. The terms K3 and K4 applied to the "or" gate 1202, and the terms K3 and K4 applied to the "or" gate 1206, allow the output from the read amplifier U2 to be stored on the scratch pad track associated with the write amplifier $x_2$ in the computer control states 50, 60 and 70 for a lower store operation.

For the special transfer operation, the terms applied to the "and" gates 1154 and 1158 allow the contents of the read amplifier W1 associated with the upper instruction register to be read into the scratch pad track associated with the write amplifier $x_2$ in the computer control state 21. This permits the $\gamma$ operand to be stored in that scratch pad track for any multiplication operation, or for a division or square root operation.

As noted above, the emitter follower #A1 of FIGURE 50 is associated with the full adder-subtractor 20 in FIGURE 8. This adder-subtractor performs an addition or subtraction on the contents of the flip-flops D1 and D2 as shown in FIGURE 8. The flip-flop C1 is the carry-borrow flip-flop and it contains the logic to provide addition or subtraction, as described above. The logic of the adder-subtractor may be represented by the gates shown in FIGURE 50. An "or" gate 1201 is connected to the input terminal $\#a_1$ of the emitter follower, and a plurality of "and" gates 1203, 1205, 1207 and 1211 is connected to the "or" gate. The terms $\overline{C1}$, $\overline{D1}$ and D2 are introduced to the "and" gate 1203; the terms $\overline{C1}$, D1 and $\overline{D2}$ are introduced to the "and" gate 1205; the terms C1, $\overline{D1}$ and $\overline{D2}$ are introduced to the "and" gate 1207, and the terms C1, D1 and D2 are introduced to the "and" gate 1211.

As shown in FIGURE 8, the computer also includes a full adder 22, and an emitter follower #A2 is associated with that adder. The adder 22 adds the output from the emitter follower #A1 associated with the full adder-subtractor 20, with the contents of the flip-flop D3. The flip-flop C2 is used as a carry flip-flop and it contains logic, as described above, to provide the carry for addition. The adder logic associated with the emitter follower #A2 may be represented by the gates shown in FIGURE 51.

An "or" gate 1213 is connected to the input terminal of the emitter follower #A2, and a plurality of "and" gates 1215, 1217, 1219 and 1220 is connected to the "or" gate. The terms $\overline{\#A1}$, $\overline{C2}$ and $\overline{D3}$ are introduced to the "and" gate 1215. The terms $\overline{\#A1}$, C2 and $\overline{D3}$ are introduced to the "and" gate 1217. The terms #A1, $\overline{C2}$ and $\overline{D3}$ are introduced to the "and" gate 1219. The terms #A1, C2 and D3 are introduced to the "and" gate 1220.

The computer also includes an emitter follower $\overline{\#A1}$, and the logic associated therewith is illustrated in FIGURE 50A. As shown, an "or" gate 1221 is connected to the emitter follower $\overline{\#A1}$; and a plurality of "and" gates 1223, 1225, 1227 and 1229 is connected to the "or" gate 1221.

The terms $\overline{C1}$, D1 and D2 are applied to the "and" gate 1223; the terms C1, $\overline{D1}$ and D2 are applied to the "and" gate 1225; the terms C1, D1 and $\overline{D2}$ are applied to the "and" gate 1227; and the terms $\overline{C1}$, $\overline{D1}$ and $\overline{D2}$ are applied to the "and" gate 1229.

The computer further includes an emitter follower $\overline{\#A2}$, and the logic associated therewith is illustrated in FIGURE 51A. As shown, an "or" gate 1231 is connected to the emitter follower $\overline{\#A2}$; and a plurality of "and" gates 1233, 1235, 1237 and 1239 is connected to the "or" gate 1231.

The terms $\overline{\#A1}$, C2 and D3 are introduced to the "and" gate 1233; the terms #A1, $\overline{C2}$ and D3 are introduced to the "and" gate 1235; the terms #A1, C2 and $\overline{D3}$ are introduced to the "and" gate 1237; and the terms $\overline{\#A1}$, $\overline{C2}$ and $\overline{D3}$ are introduced to the "and" gate 1239.

Figure 52:
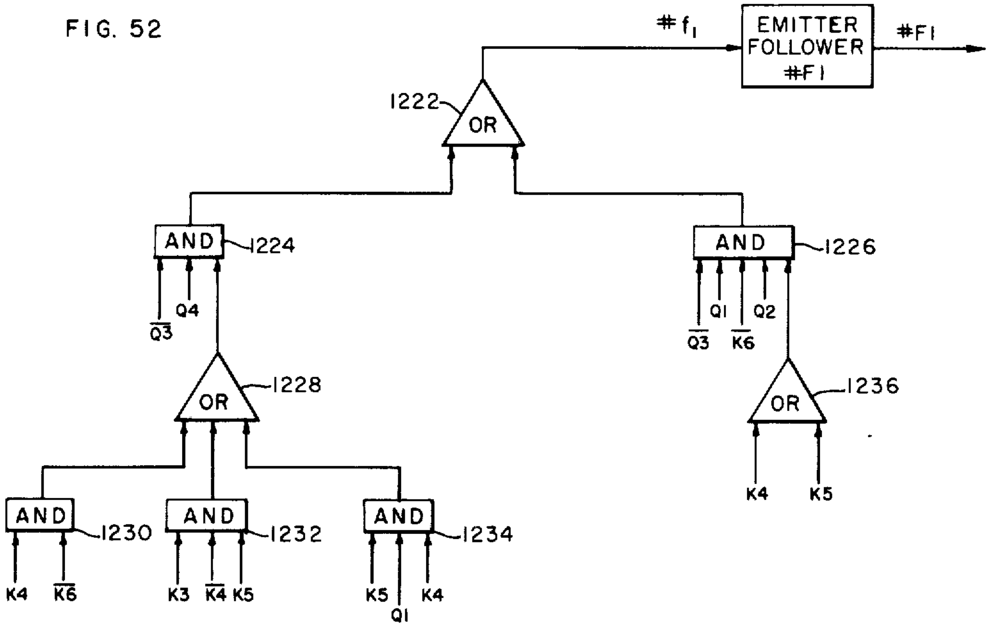

The computer includes an emitter follower #F1 and the output from this emitter follower #F1, is true during the first word time of a multiplication operation. The logic associated with the emitter follower #F1 is shown in FIGURE 52. This logic includes an "or" gate 1222, which is connected to the input terminal $\#f_1$ of the emitter follower #F1. An "and" gate 1224 and an "and" gate 1226 are connected to the "or" gate 1222. An "and" gate 1224 and an "and" gate 1226 are connected to the "or" gate 1222. An "or" gate 1228 is connected to the "and" gate 1224, and a plurality of "and" gates 1230, 1232 and 1234 is connected to the "or" gate 1228. An "or" gate 1236 is connected to the "or" gate 1228. An "or" gate 1236 is connected to the "and" gate 1226. The terms $\overline{Q3}$ and Q4 are introduced to the "and" gate 1224. The terms K4 and $\overline{K6}$ are introduced to the "and" gate 1230. The terms K3, $\overline{K4}$ and K5 are introduced to the "and" gate 1232. The terms K4, K5 and Q1 are introduced to the "and" gate 1234. The terms Q1, Q2, $\overline{Q3}$ and $\overline{K6}$ are introduced to the "and" gate 1226. The terms K4 and K5 are introduced to the "or" gate 1236.

The terms applied to the "or" gate 1228 refer to the multiplication operation only ($\overline{Q3}.Q4$). The terms K4 and $\overline{K6}$ applied to the "and" gate 1230 specify the computer control states 20, 30, 60 and 70 for all multiplication operations. The terms K3, $\overline{K4}$ and K5 applied to the "and" gate 1232 specify the computer control states 50 and 51 for all multiplication operations. The terms K4, K5 and Q1 applied to the "and" gate 1234 specify the computer control states 61 and 71 for the (M*b*) and (M*d*) multiplication operations only (Q1).

The terms applied to the "and" gate 1226 specify the computer control states 20, 30, 40, 50, 60 and 70 for the M*d* and S*q* operations.

Figure 53:
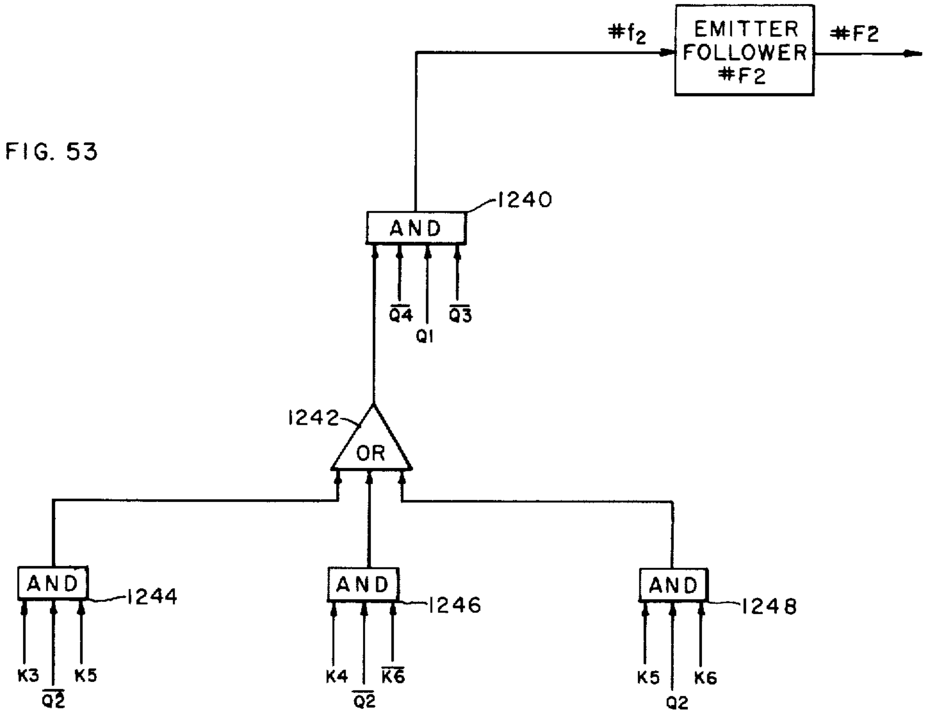

The computer also includes an emitter follower #F2. This emitter follower is one whose output is true during the performance of the first word time of a division operation, ($\overline{Q2}$) or of a square root (Q2) operation. The logic associated with the emitter follower #F2 is shown in FIGURE 53.

An "and" gate 1240 is connected to the input terminal $\#f_2$ of the emitter follower. An "or" gate 1242 is connected to the "and" gate, and a plurality of "and" gates 1244, 1246 and 1248 is connected to the "or" gate 1242. The terms Q1, $\overline{Q3}$ and $\overline{Q4}$ are introduced to the "and" gate 1240. The terms K3, K5 and $\overline{Q2}$ are introduced to the "and" gate 1244. The terms K4, $\overline{K6}$ and $\overline{Q2}$ are introduced to the "and" gate 1246. The terms K5, K6 and Q2 are introduced to the "and" gate 1248.

The terms K3, K5 and $\overline{Q2}$ applied to the "and" gate 1244 specify the first word time of a division operation for the computer control states 50, 51, 70 and 71. A division operation may be started in any of these states, except the control state 71. This latter state is never programmed for division. The terms K4, $\overline{K6}$ and $\overline{Q2}$ applied to the "and" gate 1246 specify the first word time of the division operation for the computer control states 20, 30, 60 and 70; and a division operation may be started in any one of these states. The terms K5, K6 and Q2 applied to the "and" gate 1248 specify the first word time of the square root operation for the computer control states 41, 51, 61 and 71; and a square root operation may be started in any one of these control states except the control state 41. The square root operation can never get to the control state 41.

The computer also includes an emitter follower #F3. This latter emitter follower is one whose output is true when the L.S.D. and M.S.D. accumulator registers should recirculate. The L.S.D. accumulator register recirculates through the flip-flop D4, and the M.S.D. accumulator register recirculates through the flip-flop D3 and through the full adder 22 to the emitter follower #A2. The logic associated with the emitter follower #F3 is set out in FIGURE 54.

An "or" gate 1250 is connected to the input terminal $\#f_3$ of the emitter follower #F3. An "and" gate 1252 is connected to the "or" gate 1250, and an "or" gate 1254 is connected to the "and" gate 1252. A plurality of "and" gates 1256, 1258 and 1260 is connected to the "or" gate 1254. An "or" gate 1262 is connected to the "and" gate 1256, and an "or" gate 1264 is connected to the "and" gate 1260. A pair of "and" gates 1266 and 1268 is connected to the "or" gate 1262, and a pair of "and" gates 1270 and 1272 is connected to the "or" gate 1264. An "and" gate 1274 is connected to the "or" gate 1250, and an "or" gate 1276 is connected to the "and" gate 1274. A pair of "and" gates 1278 and 1280 is connected to the "or" gate 1276. An "and" gate 1282 is connected to the "or" gate 1250.

The term K5 is introduced to the "and" gate 1252. The terms $\overline{K3}$ and $\overline{K4}$ are introduced to the "and" gate 1256. The term $\overline{Q2}$ is introduced to the "or" gate 1262. The terms Q1, Q3 and Q4 are introduced to the "and" gate 1266. The terms K6 and Q4 are introduced to the "and" gate 1268. The terms K4 and K6 are introduced to the "and" gate 1260. The terms Q3 and Q4 are introduced to the "and" gate 1270, and the terms $\overline{Q1}$ and $\overline{Q3}$ are introduced to the "and" gate 1272. The terms $\overline{K4}$ and $\overline{K5}$ are introduced to the "and" gate 1278. The terms $\overline{Q2}$ and Q3 are introduced to the "and" gate 1280. The term $\overline{K6}$ is introduced to the "and" gate 1274. The terms $\overline{Q1}$ Q2, $\overline{Q3}$ and $\overline{Q4}$ are introduced to the "and" gate 1282.

As noted above, the output from the read amplifier U1 recirculates through the flip-flop D4, and the output from the read amplifier U2 recirculates through the flip-flop D3 and through the full adder and emitter follower #A2. Therefore, the flip-flop D4 reads the output from the read amplifier U1, and the flip-flop D3 reads the output from the read amplifier U2, when the term #F3 is true. Also, the output from the flip-flop D4 is introduced to the write amplifier $u_1$, and the output from the emitter follower #A2 in FIGURE 8 is introduced to the write amplifier $u_2$ when the term #F3 is true.

Figures 54, 55:
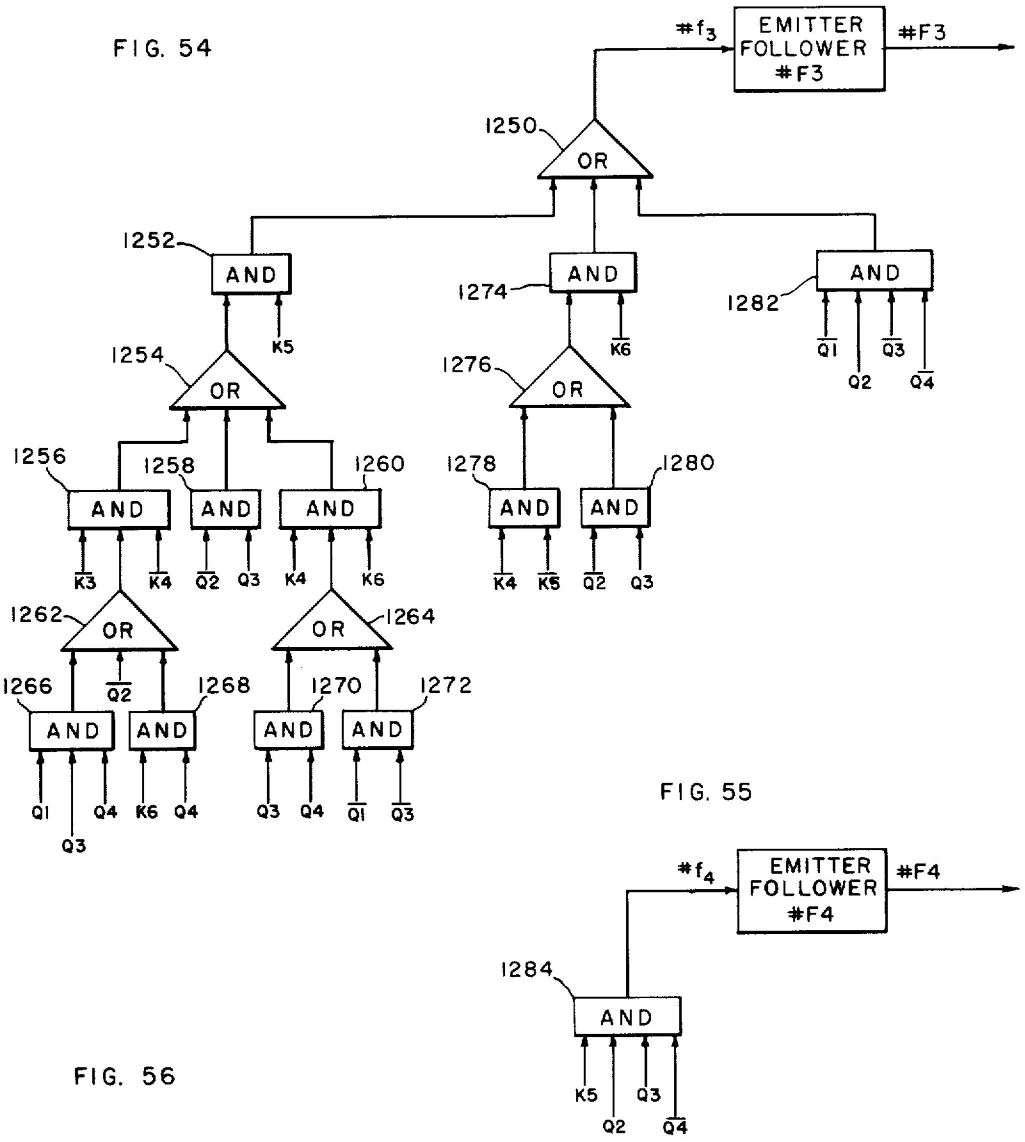

The computer includes an emitter follower #F4, the logic of which is shown in FIGURE 55. The output of this emitter follower is true when a shift (S*h*) or store (S*t*) command is being performed. In the logic of FIGURE 55, an "and" gate 1284 is connected to the input terminal $\#f_4$ of the emitter follower. The terms K5, Q2, Q3 and $\overline{Q4}$ are introduced to the "and" gate 1284.

Figure 56:
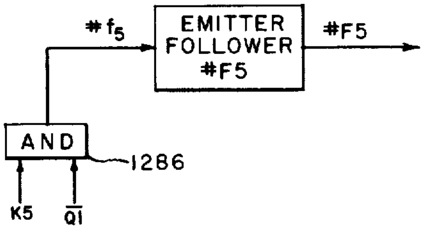

The computer also includes an emitter follower #F5, the logic of which is shown in FIGURE 56. The emitter follower #F5 is used to reduce the loading on the true output terminal of the flip-flop K5 and on the false output terminal of the flip-flop Q1. An "and" gate 1286 is connected, in FIGURE 56, to the input terminal $\#f_5$ of the emitter follower #F5, and the terms K5 and $\overline{Q1}$ are introduced to the "and" gate.

The computer also includes emitter followers #I1 and $\overline{\#I1}$ which specify the information being scanned for coincidence in the various control states. The logic associated with the emitter follower #I1, for example, is shown in FIGURE 57. In the logic of FIGURE 57, an "or" gate 1286 is connected to the input terminal $\#i_1$ of the emitter follower #I1. A plurality of "and" gates 1288, 1290 and 1292 is connected to the "or" gate 1286. The terms W1, $\overline{K3}$ and $\overline{K4}$ are introduced to the "and" gate 1288. The terms W2 and K3 are introduced to the "and" gate 1290. The terms X2, $\overline{K3}$ and K4 are introduced to the "and" gate 1292.

The logic associated with the emitter follower $\overline{\#I2}$ is shown in FIGURE 57A. An "or" gate 1293 is connected to the input terminal $\overline{\#i_2}$ of the emitter follower; and a plurality of "and" gates 1295, 1297 and 1299 is connected to the "or" gate 1293.

The terms $\overline{W1}$, $\overline{K3}$ and $\overline{K4}$ are applied to the "and" gate 1295; the terms $\overline{W2}$ and K3 are applied to the "and" gate 1297; and the terms $\overline{X3}$, $\overline{K3}$ and K4 are applied to the "and" gate 1299.

The terms W1, $\overline{W1}$, $\overline{K3}$ and $\overline{K4}$ introduced to the "and" gates 1288 and 1295 allow scanning of the output from the read amplifier $w_1$ in FIGURE 1 for the $\alpha$ and $\beta$ operands in the computer control states 00, 01, 40 and 41. The terms W2, $\overline{W2}$ and K3 applied to the "and" gates 1240 and 1297 permit scanning of the read amplifier W2 for the operand $\gamma$ and for the next instruction $\delta$ in the computer control states 10, 30, 50, 70, 11, 31, 51 and 71. The terms X3, $\overline{X3}$, $\overline{K3}$ and K4 applied to the "and" gates 1292 and 1299 permit scanning of the memory read amplifier X3 for the $\alpha$ and $\beta$ operands during the instruction read-in states 20, 21, 60 and 61 of the computer.

The computer also includes an emitter follower #I2 which is used to select input functions for the store command (S*t*). The logic associated with the emitter follower #I2 is shown in FIGURE 58. An "and" gate 1294 is connected to the input terminal $\#i_2$ of the emitter follower, #I2. The terms $\overline{K4}$ and $\overline{D5}$ are introduced to the "and" gate 1294 and an "or" gate 1296 is connected to the "and" gate. A plurality of "and" gates 1298, 1300, 1302 and 1304 is connected to the "or" gate 1296. The terms B1, $\overline{B2}$ and I1 are applied to the "and" gate 1298. The terms $\overline{B1}$, B2 and I2 are applied to the "and" gate 1300. The terms B1, B2 and I3 are applied to the "and" gate 1302. The terms $\overline{B1}$, $\overline{B2}$ and I4 are applied to the "and" gate 1304.

The computer includes an emitter follower #Q1. This latter emitter follower is used primarily to specify when the Q1, Q2, Q3 and Q4 order flip-flops should be set for the next operation. When the term #Q1 is true, this indicates that the present operation is finished; and that the order flip-flops Q1, Q2, Q3 and Q4 should be set to the next order code. The logic associated with the emitter follower Q1 is shown in FIGURE 59. An "and" gate 1306 is connected to the input terminal #Q1 of the emitter follower. The term P21 is introduced to the "and" gate 1306, and an "or" gate 1308 is also connected to the "and" gate. A pair of "and" gates 1310 and 1312 is connected to the "or" gate 1308. The terms $\overline{K3}$, K4, K5, K6 and $\overline{Q1}$ are introduced to the "and" gate 1310. The terms $\overline{K4}$, $\overline{K5}$, $\overline{K6}$ are introduced to the "and" gate 1312. The term Q3 is introduced to the "or" gate 1308. The terms $\overline{K3}$, K4, K5, K6 and $\overline{Q1}$ introduced to the "and" gate 1310 allows the term Q1 to be true in the computer control state 61 for the S$u_s$, B*r*, M*a* and M*c* operations. This indicates that the particular one of these operations is finished, and a new instruction is being read in so that the odd flip-flops Q1–Q4 should be set.

The terms $\overline{K4}$, $\overline{K5}$, $\overline{K6}$ applied to the "and" gate 1312 allow the order flip-flops Q1–Q4 to be set in the computer control states 00 and 10 for all operations. The term Q3 applied to the "or" gate 1308 indicates the completion of any additional word type of operation. For the non-additional word type operations (Q3), the term Q3 introduced to the "or" gate 1308 allows the flip-flops Q1–Q4 to be set in all of the control states of the computer. Although some of the (Q3) operations may last longer than one word time, there is no possibility for the order flip-flops Q1–Q4 to be set to the wrong order. This is because the term #I1 does not change the instruction registers till the present operation is finished, in the computer control states 50, 51, 60 and 61.

The computer also includes an emitter follower #R1 which is used to specify where the multiplier or divider operations are read from at the start of the different multiplication operations or at the start of the division operation. The term #R1 is always used in conjunction with the first word multiplication term (#F1) or with the first word time division term #F2.

The logic associated with the emitter follower #R1 is shown in FIGURE 60. An "or" gate 1314 is connected to the input terminal $\#r_1$ of the emitter follower #R1. A plurality of "and" gates 1316, 1318, 1320 and 1322 is connected to the "or" gate 1314. An "or" gate 1324 is connected to the "and" gate 1316; an "or" gate 1326 is connected to the "and" gate 1318; an or gate 1328 is connected to the "and" gate 1320; and an "or" gate 1330 is conected to the "and" gate 1322.

A plurality of "and" gates 1330, 1332 and 1334 is connected to the "or" gate 1330. The terms U2, Q1 and Q4 are applied to the "and" gate 1316. The terms K4 and $\overline{Q2}$ are applied to the "or" gate 1324. The terms W1 and and $\overline{K5}$ are applied to the "and" gate 1318. The terms $\overline{Q1}$ and $\overline{Q4}$ are applied to the "or" gate 1326. The terms X1, K3 and $\overline{K4}$ are applied to the "and" gate 1320. The terms $\overline{Q1}$, Q2 and $\overline{Q4}$ are applied to the "or" gate 1328. The terms X2 and K5 are applied to the "and" gate 1322. The terms $\overline{K3}$ and $\overline{K4}$ are applied to the "and" gate 1330. The terms K4 and $\overline{Q1}$ are applied to the "and" gate 1332. The terms K4 and $\overline{Q4}$ are applied to the "and" gate 1334.

The terms applied to the "and" gate 1316 allow the multiplier to be derived from the read amplifier U2 of the M.S.D. accumulator register in the first word time of the multiplication operation (M*b*), and in the computer control states 20, 30, 60, 70, 61 and 71 for the multiplication operations (M*d*). The terms applied to the "and" gate 1318 allow the multiplier to be derived from the read amplifier W1 of the upper instruction register in the computer control states 20 and 30 for the (M*a*) and (M*c*) operations, and for the product part of the (S*q*) operation. The latter terms also allow the divisor to be derived from the read amplifier W1 in the computer control states 20 and 30 for the division operation.

The term Q1 applied to the "or" gate 1328 allows the multiplier to be obtained from the read amplifier X1 of the permanent memory of FIGURE 1 in the computer control states 50 and 51 for the (M*a*) and (M*c*) operations. The term Q2 applied to the "or" gate 1328 allows the multiplier to be derived from the read amplifier X1 in the computer control states 50 and 51 for the multiplication operation (M*d*) and for the product part of the square root operation (S*q*). The term $\overline{Q4}$ applied to the "or" gate 1328 allows the divisor to come from the read amplifier X1 in the computer control states 50 and 51 for the division operation.

The terms $\overline{K3}$ and $\overline{K4}$ applied to the "and" gate 1330 allow the multiplier to come from the read amplifier X2 in FIGURE 1 in the computer control state 40 for the multiplication operation (M*d*) and for the product part of the square root operation (*sq*). The terms K4 and $\overline{Q1}$ applied to the "and" gate 1332 allow the multiplier to come from the read amplifier X2 in the computer control states 60 and 70 for the (M*a*) and (M*c*) multiplication operations. Finally, the terms K4 and $\overline{Q4}$ applied to the "and" gate 1334 allow the multiplier for the square root operation, and the divisor for the division operation to come from the read amplifier X2 in the computer control states 60 and 70.

The computer also includes an emitter follower #T*a*. The output signal from the emitter follower #T*a* is true only when the computer is actually in a "Hold" condition. This term indicates that the computer is in state 00, that the term $\overline{K1}$ is true, and that the flip-flop K1 cannot be set to scan, because the term $\overline{B1}.\overline{D6}$ is not true.

The logic associated with the emitter follower #T*a* is set out in FIGURE 61. An "and" gate 1340 is connected to the input terminal $\#t_a$ of the emitter follower, as shown in FIGURE 61. An "or" gate 1342 is connected to the "and" gate 1340. The terms $\overline{K1}$, $\overline{K3}$, $\overline{K4}$, $\overline{K5}$ and $\overline{K6}$ are applied to the "and" gate 1340. The terms B1 and D6 are applied to the "or" gate 1342.

The computer includes a pair of emitter followers #T*b* and #T*b* and these terms are required in order to scan the new instruction as it is read in. This allows scanning and coincidence detection for the "instruction stop" mode of operation. The logic associated with the emitter follower #T*b*, for example, is illustrated in FIGURE 62. An "and" gate 1344 is connected to the input terminal $\#t_b$ of the emitter follower #T*b*. The terms X4, $\overline{K3}$ and K4 are introduced to the "and" gate 1344.

The logic associated with the emitter follower $\overline{\#Tb}$ is set out in FIGURE 62A. An "and" gate 1345 is connected to the input terminal $\overline{\#t_b}$ of the emitter follower $\overline{\#Tb}$; and the terms $\overline{X4}$, K3 and K4 are applied to the "and" gate.

The computer also includes a pair of emitter followers Z1 and $\overline{\#Z1}$. These emitter followers feed the $v_1$ write amplifier in the input output system described in copending application Serial No. 53,120, filed August 31, 1960. In the code structure of the S*t* and T*r* operations, the output #Z1 corresponds to the general output function $z_1$.

The logic associated with the emitter follower #Z1, for example, is shown in FIGURE 63. An "and" gate 1346 is connected to the input terminal $\#z_1$ of the emitter follower #Z1. The terms B1, B2, K5, Q3 and $\overline{Q4}$ are introduced to the "and" gate 1346. An "or" gate 1348 is connected to the "and" gate 1346, and a pair of "and" gates 1350 and 1352 are connected to the "or" gate. An "or" gate 1354 is connected to the "and" gate 1350, and an "or" gate 1356 is connected to the "and" gate 1352. The terms Q1 and Q2 are introduced to the "and" gate 1350, and the terms D5, $\overline{Q1}$ and $\overline{Q2}$ are introduced to the "and" gate 1352.

A pair of "and" gates 1358 and 1360 is connected to the "or" gate 1354. The terms $\overline{K4}$ and D5 are introduced to the "and" gate 1358. The terms U2 and $\overline{K6}$ are introduced to the "and" gate 1360. An "or" gate 1362 is connected to the "and" gate 1358, and an "or" gate 1364 is connected to the "and" gate 1360. The terms K3 and K4 are introduced to the "or" gate 1364. A pair of "and" gates 1366 and 1368 is connected to the "or" gate 1362. The terms U1 and $\overline{K3}$ are introduced to the "and" gate 1366. The terms U2 and K3 are introduced to the "and" gate 1368. A pair of "and" gates 1370 and 1372 is connected to the "or" gate 1356. The terms X1, K3 and K4 are introduced to the "and" gate 1370. The terms $\overline{X2}$ and $\overline{K4}$ are introduced to the "and" gate 1372.

The logic associated with the emitter follower $\overline{\#Z1}$ is set out in FIGURE 63A. As shown, an "and" gate 1347 is connected to the input terminal $\overline{\#z_1}$ of the emitter follower. The terms $\overline{B1}$, B2, K5, Q3 and $\overline{Q4}$ are applied to the "and" gate 1347. An "or" gate 1349 is connected to the "and" gate 1347; and a pair of "and" gates 1351 and 1353 are connected to the "or" gate 1349.

The terms Q1 and Q2 are introduced to the "and" gate 1351 and an "or" gate 1355 is connected to that "and" gate. A pair of "and" gates 1359 and 1361 are connected to the "or" gate 1355. The terms $\overline{K4}$ and D5 are introduced to the "and" gate 1359; and the terms $\overline{U2}$ and $\overline{K6}$ are introduced to the "and" gate 1361.

An "or" gate 1363 is connected to the "and" gate 1359 and an "or" gate 1365 is connected to the "and" gate 1361. A pair of "and" gates 1367 and 1369 are connected to the "or" gate 1363. The terms $\overline{U1}$ and $\overline{K3}$ are applied to the "and" gate 1367, and the terms $\overline{U2}$ and K3 are applied to the "and" gate 1369. The terms K3 and K4 are applied to the "or" gate 1365.

The terms D5, $\overline{Q1}$ and $\overline{Q2}$ are applied to the "and" gate 1353, and an "or" gate 1357 is connected to the "and" gate. A pair of "and" gates 1371 and 1373 are connected to the "or" gate 1357. The terms $\overline{X1}$, K3 and K4 are introduced to the "and" gate 1371; and the terms $\overline{X2}$ and $\overline{K4}$ are introduced to the "and" gate 1373.

For the store command (St), the terms applied to the "and" gate 1358 allow storing of the output from the read amplifier U1 in the computer control states 40 and 41, and of the output of the read amplifier U2 in the computer control states 50 and 51, with the flip-flop D5 true, which indicates that the information from the read amplifiers U1 and U2 is held. The terms applied to the "and" gate 1360 allow storing of the output of the read amplifier U2 in the computer control states 50, 60 and 70, regardless of the state of the flip-flop D5. When the flip-flop D5 is true, the indication is that the contents of the accumulator registers are to be held. On the other hand, when the flip-flop D5 is false, the indication is to clear the accumulator registers. It should be noted that the double length store operation is obtainable in an upper store operation.

For the transfer command, the terms X1, K3, K4 applied to the "and" gate 1370 allows the transfer of the output from the read amplifier X1 in the computer control states 70 and 71. The terms X2 and $\overline{K4}$ applied to the "and" gate 1372 allow transfer of the output from the read amplifier X2 in the computer control states 40, 41, 50 and 51. It should be noted that a block transfer of the output from the read amplifier X2 for an upper instruction occurs from $\beta$ through $\alpha$; while a block transfer of the output from the read amplifier X1 for a lower instruction occurs from $\gamma$ up to $\delta$. It should also be noted that a single word transfer can be obtained in either the upper or lower instructions.

The logical systems illustrated in FIGURES 11–63 may be represented by the following logical equations:

FLIP FLOPS

D2:

$$d_2=B2D5\#F1+\#\overline{U}3\#F2\overline{Q}2P21+U2\#F4\overline{Q}1\overline{P}21$$
$$+\#F5\overline{Q}2\overline{Q}3\overline{Q}4(X1\overline{K}4+U1K4\overline{K}6)$$
$$+K4\overline{K}6Q1Q3Q4[W1\overline{K}5(U2+\overline{Q}2)+X2K5(U2$$
$$+\overline{Q}2)+X1K3\overline{K}4K5Q3Q4(U2+\overline{Q}1+\overline{Q}2)]$$
$$+B2D5Q5+U3Q1\overline{Q}3Q6\overline{P}21+\overline{Q}1\overline{Q}2Q6(X1\overline{B}2$$
$$+UB2B)$$
$$\overline{d}_2=d_2\text{ Inverted}\equiv\#\overline{D}2$$

D3:

$$d_3=U2(\#F2+\#F3+Yf)+\#Ye+U1[\#F1(\overline{Q}1\overline{Q}2$$
$$+Q1Q2\overline{K}4+\overline{Q}4)+K3\overline{K}4\#F5\overline{Q}2\overline{Q}3]$$
$$+\#F4\overline{Q}1[B2(D4B1P0+D6\overline{B}1P0+C2\overline{P}0)$$
$$+U2\overline{B}1\overline{B}2]+F4Q1(U2D5+\#12K6)$$
$$+U2\overline{B}2\overline{Q}1Q6+Q1Q6(D6Q2Q3+D4\overline{Q}3$$
$$+U3Q2Q3)+Q5(U2L1+U2Q3+U1\overline{L}1\overline{Q}3)$$
$$\overline{d}_3=d_3\text{ Inverted}\equiv\#\overline{D}3$$

D4:

$$d_4=U1(\#F2+\#F3\#Yf)+\#Yd+\#F1[W1\overline{K}5Q1Q4$$
$$+X2K5\overline{K}6Q4(K3Q1+K4Q1+K3\overline{K}4Q2$$
$$+U2(\overline{K}4Q1Q2+\overline{Q}1\overline{Q}2+\overline{Q}4)]$$
$$+U2\#F5\overline{Q}2\overline{Q}3\overline{Q}4(\overline{K}4+\overline{K}6)$$
$$+\#F4\overline{Q}1[\overline{B}2\overline{D}5(U2P0+D4\overline{P}0)+C1B2\overline{P}0$$
$$+U1\overline{B}1\overline{B}2D5]+\#F4Q1(U1D5+U1K6$$
$$+\#I2\overline{K}3)+U1\overline{Q}1Q6+Q1\overline{Q}3Q6(U2\overline{P}21$$
$$+U4P21)+Q5(U1L1+U1Q3+U2\overline{L}1\overline{Q}3)$$
$$\overline{d}_4=d_4\text{ Inverted}\equiv\#\overline{D}4$$

D5:

$$d_5=J1\#Q1(L3\overline{K}3+L6K3\overline{K}4)+\overline{K}4K6\#F5\overline{Q}3\overline{Q}4P21$$
$$+D6\#F1+\#F2Q2P21+Q1Q6(\#\overline{A}2P0$$
$$+\overline{Q}3P21)+D6Q5$$
$$\overline{d}_5=\#Q1(\overline{L}3\overline{K}3+\overline{L}6K3\overline{K}4+\overline{J}1)+\overline{D}6\#F1$$
$$+\#A2K3\overline{K}6\overline{Q}1Q2Q3\overline{Q}4P0(B2+\overline{K}5)$$
$$+\#\overline{A}2Q1Q6P0+\overline{D}6Q5(\overline{Q}3+\overline{P}21)$$

D6:

$$d_6=\#F1[W1\overline{K}5\overline{Q}4+U2Q4(\overline{Q}1Q2+K4Q2$$
$$+\overline{K}4\overline{L}1Q1\overline{Q}2)+X1K5\overline{Q}4X2\overline{K}4\overline{K}6(\overline{K}3$$
$$+\overline{Q}1\overline{Q}2)+U4\overline{Q}2(K4+K6\overline{Q}1+L1Q1)$$
$$+X1\overline{K}4K6Q1Q2]+U1\#F2$$
$$+\overline{K}3\overline{K}4\overline{K}5\overline{K}6[B1\overline{P}0(*S1+*S2)+D6(B1+\overline{P}0)]$$
$$+U4Q5+Q6(U4\overline{P}21+\overline{U}2\overline{Q}3P21)$$
$$+D4\#Q1\overline{J}1[K2+\#F4\overline{Q}1(K3+\overline{K}4)]$$
$$d_6=d_6\text{ Inverted}\equiv\#D6$$

K1:

$$k_1=(P8+P21)(K3+\overline{K}4K5+*S1K4+*S1K6$$
$$+\overline{Q}1Q5+\overline{B}1\overline{D}6\overline{K}4\overline{K}6)+K6Q1\overline{Q}3P8$$
$$\overline{k}_1=*\overline{S}1K3P21+(\#I1\overline{S}+\overline{I}1S)(P0/5+P9/14)$$
$$+(\overline{B}1Q6+D5K3\overline{K}4K5\overline{K}6)\overline{Q}1Q2\overline{Q}4\overline{P}0$$

K2:

$$k_2=K1(\#P8+\overline{K}4Q2Q5P0+K4\overline{K}5K6\overline{Q}3P21)$$
$$\overline{k}_2=\overline{K}1\#P8(K3\overline{K}4+\overline{Q}5\overline{Q}6)+\overline{K}1\overline{K}4Q2Q5P0$$
$$+\overline{K}1K4\overline{K}5K6\overline{Q}3P21$$

K3:

$$k_3=K1P21$$
$$\overline{k}_3=K1P21$$

K4:

$$k_4=K3P21(K1+B2\overline{K}5\overline{K}6Q1\overline{Q}3+K2)$$
$$\overline{k}_4=P21(\overline{K}3+\overline{K}1\overline{Q}3\overline{Q}5\overline{Q}6)$$

K5:

$$k_5=P21[(K1+K2)(\overline{K}3Q3+\overline{K}4Q3+\overline{K}4\overline{K}6)$$
$$+K3\overline{K}6(K4Q3+B2\overline{K}4Q1\overline{Q}3)]$$
$$\overline{k}_5=P21[\overline{K}1\overline{K}2(K3\overline{K}4+\overline{K}3K4)$$
$$+\overline{Q}3(K3+K4\overline{K}6+K4Q1+Q1Q2)]$$

K6:

$$k_6=P21[K1\overline{K}2+K3K4+\overline{K}3\overline{K}4K5$$
$$+\overline{Q}3(K4+K5+B2Q1\overline{K}2K3)]$$
$$+\#A2K5\overline{Q}1Q2\overline{Q}4P0$$
$$\overline{k}_6=P21\{K3K4\overline{K}5Q3+(\overline{K}1+K2)[\overline{K}3K4\#F5$$
$$+Q3(\overline{K}3K4+K3\overline{K}4+\overline{K}5)]\}$$

L1:

$$l_1=\#I1,P15[K4K5+\overline{K}5(\overline{K}6+Q3]$$
$$+\overline{Q}3[Q5P21+Q1Q2Q6(U1L2\overline{P}21$$
$$+\#A2L2P0)]+\#F1P21$$
$$\overline{l}_1=\#\overline{I}1P15[K4K5+\overline{K}5(K6+Q3)]$$
$$+Q3[L3\overline{Q}2Q3+Q1Q6(U3+\overline{D}4)]+\#F2P21$$

L2:

$$l_2=\#I1P16[\text{same as } l_1]+\overline{Q}3(L1Q5+U1Q1Q6P21)$$
$$\overline{l}_2=\#I1P16[\text{same as } l_1]+\overline{L}1\overline{Q}3Q5$$
$$+(\#F1+\#F2)P21$$

L3:

$$l_3=\#I1P17[\text{same as } l_1]+Q2\overline{Q}3(Q5+U4Q1P20Q6)$$
$$\overline{l}_3=\#I1P17[\text{same as } l_1]+\overline{Q}3(\overline{Q}2Q5$$
$$+\overline{U}4Q1P20Q6)+\#F1P21$$

L4:

$$l_4=\#I1P6(K1+\overline{K}5\overline{K}6)+\#L1K1\overline{K}5K6\overline{Q}3P21$$
$$\overline{l}_4=\#\overline{I}1P6(K1+\overline{K}5\overline{K}6)+\#\overline{I}1K1\overline{K}5K6\overline{Q}3P21$$

L5:

$$l_5=\#I1P7(K1+\overline{K}5\overline{K}6)$$
$$\overline{l}_5=\#\overline{I}1P7(K1+\overline{K}5\overline{K}6)$$

L6:

$$l_6=\#I1P8(K1+\overline{K}5\overline{K}6)$$
$$\overline{l}_6=\#\overline{I}1P8(K1+\overline{K}5\overline{K}6)$$

B1:

$b_1=\overline{K}3\overline{K}4\overline{K}5\overline{K}6[\overline{K}1\overline{D}6P0+D6P9/14(\#I1,\overline{S}+\overline{I}1S)]+\#Q1J1[L4K2K3+L1\overline{K}3(K2+K1J3)]+\#A2K3\overline{Q}1\overline{Q}2\overline{Q}3\overline{Q}4+\#R1\#F1P0+U3\overline{Q}2Q5(L1+Q3)$ $\overline{b}_1=\overline{K}3\overline{K}4\overline{K}5\overline{K}6(K1P0+D6P8*\overline{S}2)+\#Q1[\overline{L}4K3+\overline{L}1\overline{K}3(K2+K1J3)]+U3Q5(L1+Q3)+B2\overline{Q}1\#F4P20+\#Q1\overline{J}1(K1+K2)$

B2:

$b_2=(L5K3+L2\overline{K}3)\#Q1+\#R1\#F1P1+Q5(U3\overline{L}1L2\overline{Q}3+\overline{L}3Q2\overline{Q}3+Q2Q3\overline{P}21)+K4\#F5\overline{Q}2\overline{Q}3\overline{Q}4+(\overline{W}2SP0/5+W2\overline{S}P5)\overline{K}4\overline{K}5\overline{K}6Q1$ $\overline{b}_2=(\overline{L}5K3+\overline{L}2\overline{K}3)\#Q1+\#F1P0+Q2Q5\overline{P}21+K5\overline{Q}3P0+(W2\overline{S}P0/5+\overline{W}2SP5)\overline{K}4\overline{K}5\overline{K}6$

C1:

$c_1=D1D2\{\overline{P}0[\#F1+\overline{K}6Q4(\overline{Q}1+Q2)]+\overline{Q}3Q5+D5Q1Q6\}+\#F4\overline{Q}1\overline{P}21(U1B1+D1\overline{B}1\overline{P}0)+\overline{D}1D2[\overline{Q}2\overline{P}0(\overline{Q}1\overline{Q}4+Q1Q3)+Q6(\overline{D}5\overline{P}0+\overline{Q}1)+\overline{K}5K6Q3]+\overline{B}1D6Q2Q5P0$ $\overline{c}_1=\overline{D}1\overline{D}2[\#F1+\overline{K}6Q4(\overline{Q}1+Q2)+\overline{Q}3Q5+D5Q1Q6]+\#F4\overline{Q}1(\overline{U}1B1+\overline{D}1\overline{B}1+D1B1+P21)+D1\overline{D}2[\overline{Q}2(\overline{Q}1\overline{Q}4+Q1Q3)+\overline{D}5Q6+\overline{K}5K6Q3]+P0]\overline{K}5\overline{K}6+K5(\overline{B}1+Q1+\overline{Q}2+Q4)+Q1\overline{Q}4]$

C2:

$c_2=\#A1D3\{P0[K5(\overline{Q}3+Q4)+\overline{K}5(\overline{K}6+\overline{Q}4)]+\overline{Q}1Q6+Q5(L1+\overline{L}2)+\overline{K}5K6Q3\}+\#\overline{A}2Q3Q6P0+\#F4\overline{Q}1\overline{P}21[\overline{B}1(D4P0+D2\overline{P}0)+U2B1]$ $\overline{c}_2=\#\overline{A}1\overline{D}3(\overline{K}5+\overline{Q}3+Q4)+P0[\overline{K}5\overline{K}6+Q1\overline{Q}4(\#A2+\overline{Q}3)+K5(Q1+\overline{Q}2+\overline{Q}3+Q4)]+\overline{L}1L2\overline{Q}3Q5+\#F4\overline{Q}1[\overline{B}1(\overline{D}4P0+\overline{D}2\overline{P}0)+\overline{U}2B1+P21]$

D1:

$d_1=B1D6\#F1+\#F2Q2(P19+D1\overline{P}0)+U1\#F4\overline{Q}1\overline{P}21+W1K4\overline{K}5\overline{K}6\overline{Q}1\overline{Q}3+X2K5\overline{K}6[\overline{K}3\overline{K}4Q4(Q1\overline{Q}2+\overline{Q}1Q2)+\overline{Q}2\overline{Q}3\overline{Q}4(\overline{K}4+\overline{Q}1)+Q3Q4(\overline{K}4+\overline{Q}1)]+D6Q5(B1+Q2P0)+Q1Q2\overline{Q}3Q6(U1+D1\overline{P}0+L2\overline{L}3P0)+X2\overline{D}5\overline{Q}1\overline{Q}2Q6$ $\overline{d}_1=d_1$ Inverted≡$\#\overline{D}1$

N1:

$n_1=\#I1K1K3P15(\overline{D}5+\overline{K}4K5+Q1+\overline{Q}3+Q4)$ $\overline{n}_1=\#\overline{I}1K1K3P15(\overline{D}5+\overline{K}4K5+Q1+\overline{Q}3+Q4)$

N2:

$n_2=\#I1K1K3P16$(same as $n_1$)

$\overline{n}_2=\#\overline{I}1K1K3P16$(same as $n_1$)

N3:

$n_3=\#I1K1K3P17$(same as $n_1$)

$\overline{n}_3=\#\overline{I}1K1K3P17$(*same as* $n_1$)

Q1:

$q_1=J3\#Q1+\#F1P21+Q5(P0+\overline{D}4\overline{L}2\overline{Q}3)$ $\overline{q}_1=\overline{J}3\#Q1+\#\overline{A}2D3\overline{L}1L2\overline{Q}3Q5+K2Q3Q5$

Q2:

$q_2=J2\#Q1+\#F1P21+U3Q5(L1\overline{L}3+Q3)$ $\overline{q}_2=\overline{J}2\#Q1+K1\overline{K}3\overline{K}4\#F5Q4P21+L3\overline{Q}3Q5$

Q3:

$q_3=J1\#Q1+\overline{K}5K6L2P21+\overline{Q}1Q6P20$ $\overline{q}_3=\overline{J}1\#Q1$

Q4:

$q_4=\#I1\#Q1+\#F1P21$ $\overline{q}_4=\#\overline{I}1\#Q1$

Q5:

$q_5=\#F1P21$ $\overline{q}_5=Q3P21$

Q6:

$q_6=P21[\#F2+\overline{Q}1\overline{Q}3\overline{Q}4(K3K5+K4\overline{K}6)]$ $\overline{q}_6=Q3P21$

WRITE AMPS.

U1:

$u_1=D4[P0\overline{Q}5\overline{Q}6+Q3Q4\overline{P}0+\#F3+\#F4(B2+D5+Q1)+\overline{K}3\overline{K}4\#F5Q4+\overline{P}0(L2Q5+\overline{Q}1Q6)]+\#A2[\#F1\overline{P}0+\#F5\overline{Q}2\overline{Q}3\overline{Q}4\overline{P}0(\overline{K}4+\overline{K}6)+L2\overline{Q}3Q5+Q5P0+\overline{Q}1\overline{Q}2P0Q6]+\#F2Q2P19+U1\#F4\overline{B}2\overline{D}5\overline{Q}1\overline{P}0+\overline{L}2Q1\overline{Q}3Q6(\overline{D}1P20+U1\overline{P}21)$ $\overline{u}_1=u_1$ Inverted≡$\#\overline{U}1$

U2:

$u_2=\#A2[P0\overline{Q}5\overline{Q}6+\overline{K}3\overline{K}4\#F5Q4+Q3Q4\overline{P}0+\#F2+\#F3+Q6(Q1+\overline{P}0)+L2\overline{Q}3Q5]+D4\#F1\overline{P}0+D4\overline{Q}1\overline{Q}2\overline{Q}3\overline{Q}4[Q6P0+K5\overline{P}0(\overline{K}4+\overline{K}6)]+\#F4\overline{P}0[D3(B2+D5+Q1)+U2\overline{B}2\overline{D}5\overline{Q}1]+Q5[(D4Q1+\overline{D}4\overline{Q}1)\overline{L}2\overline{Q}3+(D4Q1+\overline{D}4\overline{Q}1)Q3P0]$ $\overline{u}_2=u_1$ Inverted≡$\#\overline{U}2$

U3:

$u_3=\#F2Q2P20+\#R1(\#F1+\#F2\overline{Q}2)+\overline{K}5K6U3\overline{L}1+\overline{U}3L1Q6+L1L3Q5$ $\overline{u}_3=u_3$ Inverted≡$\#\overline{U}3$

U4:

$u_4=U4[Q3\overline{Q}5\overline{Q}6+\overline{Q}1\overline{Q}4+\overline{K}3\overline{K}4K5(K6+\overline{L}3Q1\overline{Q}2)+\#F3(K4+\overline{K}5)]+D5\#F1+D6\#F2+\overline{K}3\overline{K}4\overline{K}5\overline{K}6Q4[X2\overline{Q}1\overline{Q}2+U2(\overline{Q}1Q2+L3Q1\overline{Q}2)]+D5Q5+D6Q1Q6$ $\overline{u}_4=u_4$ Inverted≡$\#\overline{U}4$

W1:

$w_1=\{X3\overline{K}3K4+X1K3\overline{K}4+W1\overline{K}3K4+K3K4[X2(K2K6+K5)+W1\overline{K}5(K2+\overline{K}6)]\}*S3+\#Y6$ $\overline{w}_1=w_1$ Inverted≡$\#\overline{W}1$

W2:

$w_2=\{X4\overline{K}3K4+W2(K3+\overline{K}4)[K5K6+\overline{K}5\overline{K}6+Q1+Q4+\overline{Q}2(B1+B2+\overline{K}3+\overline{K}5+\overline{Q}3)+K5Q2(\#A2P0+\overline{D}5Q3+K4)+B1\overline{K}5Q2]+\overline{Q}4\#F5\overline{K}6[X2\overline{K}4Q2(\#\overline{A}2\overline{Q}3+\#\overline{A}2D5+\overline{Q}3\overline{P}0D5\overline{P}0)+\overline{B}1\overline{B}2K3\overline{Q}2Q3(X1K4D5+X2\overline{K}4D5+U2\overline{D}5)]+W1\overline{B}1\overline{Q}1Q6Q2\}*S3+\#Yc$ $\overline{w}_2=w_2$ Inverted≡$\#\overline{W}_2$

X1:

$x_1=B1\overline{B}2K5Q3\overline{Q}4\{Q1Q2[D5\overline{K}4(U1\overline{K}3+U2K3)+U2\overline{K}6(k3+K4)]+\#F5\overline{Q}2(X1D5K4\overline{K}6+X2D5\overline{K}4+\#I2)\}+W1K2\overline{K}3K4\overline{K}5K6L4\overline{Q}3$ $\overline{x}_1=B1\overline{B}2K5Q3\overline{Q}4\{Q1Q2[D5\overline{K}4(\overline{U}1\overline{K}3+\overline{U}2K3)+\overline{U}2\overline{K}6(K3+K4)]+\#F5\overline{Q}2(\overline{X}1D5K4\overline{K}6+\overline{X}2D5\overline{K}4+\overline{K}4\overline{D}5\overline{I}2)\}+\overline{W}1K2\overline{K}3K4\overline{K}5K6L4\overline{Q}3$

X2:

$x_2=B1B2K5Q3\overline{Q}4\{Q1Q2[D5\overline{K}4(U1\overline{K}3+U2K3)+U2\overline{K}6(K3+K4)]+\#F5\overline{Q}2D5(X1K4\overline{K}6+X2\overline{K}4)\}+W1K2\overline{K}3K4\overline{K}5K6\overline{L}4\overline{Q}3$ $\overline{x}_2=B1B2K5Q3\overline{Q}4\{Q1Q2[D5\overline{K}4(\overline{U}1\overline{K}3+\overline{U}2K3)+U2\overline{K}6(K3+K4)]+\#F5\overline{Q}2D5(\overline{X}1K4\overline{K}6+\overline{X}2\overline{K}4)\}+\overline{W}1K2\overline{K}3K4\overline{K}5K6\overline{L}4\overline{Q}3$

EMITTER FOLLOWERS

#A1:

$\#a_1=\overline{C}1\overline{D}1D2+\overline{C}1D1\overline{D}2+C1\overline{D}1\overline{D}2+C1D1D2$ $\#\overline{A}1$:

$\#\overline{a}_1=\overline{C}1D1D2+C1\overline{D}1D2+C1D1\overline{D}2+\overline{C}1\overline{D}1\overline{D}2$

#A2:

$\#a_2=\#\overline{A}1\overline{C}2D3+\#\overline{A}1C2\overline{D}3+\#A1\overline{C}2\overline{D}3+\#A1C2D3$ $\#\overline{A}2$:

$\#\overline{a}_2=\#\overline{A}1C2D3+\#A1\overline{C}2D3+\#A1C2\overline{D}3+\#\overline{A}1\overline{C}2\overline{D}3$

#F1:

$$\#f_1=\overline{Q}3Q4(K4\overline{K}6+K3\overline{K}\overline{4}K5+K4K5Q1)+Q1Q2\overline{Q}3\overline{K}6(K4+K5)$$

#F2:

$$\#f_2=Q1\overline{Q}3\overline{Q}4(K3K5\overline{Q}2+K4\overline{K}6\overline{Q}2+K5K6Q2)$$

#F3:

$$\#f_3=K5[\overline{K}3\overline{K}4(\overline{Q}2+K6Q4+Q1Q3Q4)+K4K5(Q3Q4+\overline{Q}1\overline{Q}3)+\overline{Q}2Q3]+(\overline{K}4\overline{K}5+\overline{Q}2\overline{Q}3)\overline{K}6+\overline{Q}1Q2\overline{Q}3\overline{Q}4$$

#F4:

$$\#f_4=K5Q2Q3\overline{Q}4$$

#F5:

$$f_5=K5\overline{Q}1$$

#I1:

$$\#i_1=W1\overline{K}3\overline{K}4+W2X3\overline{K}3K4$$

#$\overline{\mathrm{I1}}$:

$$\#i_1=\overline{W}1\overline{K}3\overline{K}4+\overline{W}2K3+\overline{X}3\overline{K}3K4$$

#I2:

$$\#i_2=\overline{K}4\overline{D}5(B1\overline{B}2I1+\overline{B}1B2I2+B1B2\overline{I}3+\overline{B}1\overline{B}2\overline{I}4)$$

#Q1:

$$\#q_1=(\overline{K}3K4K5K6\overline{Q}1+\overline{K}4\overline{K}5\overline{K}6+Q3)P21$$

#R1:

$$\#r_1=U2Q1Q4(K4+\overline{Q}2)+W1\overline{K}5(\overline{Q}1+\overline{Q}4)+X1K3\overline{K}4(\overline{Q}1+Q2+\overline{Q}4)+X2K5(\overline{K}3\overline{K}4+K4\overline{Q}1+K4\overline{Q}4)$$

#T*a*:

$$\#t_a=\overline{K}1\overline{K}3\overline{K}4\overline{K}5\overline{K}6(B1+D6)$$

#T*b*:

$$\#t_b=X4\overline{K}3K4$$

#$\overline{\mathrm{T}}b$:

$$\#\overline{t}_b=\overline{X}4\overline{K}3K4$$

#Z1:

$$\#z_1=\overline{B}1B2K5Q3\overline{Q}4\{Q1Q2[(L1\overline{K}3+U2K3)\overline{K}4D5+U2\overline{K}6(K3+K4)]+D5\overline{Q}1\overline{Q}2(X1K3K4+X2\overline{K}4)\}$$

#$\overline{\mathrm{Z}}1$:

$$\#\overline{z}_1=\overline{B}1B2K5Q3\overline{Q}4\{Q1Q2[(\overline{U}1\overline{K}3+\overline{U}2K3)\overline{K}4D5+\overline{U}2\overline{K}6(K3+K4)]+D5\overline{Q}1\overline{Q}2(\overline{X}1K3K4+\overline{X}2\overline{K}4)\}$$

The improved electronic digital computer of the invention is advantageous in that it is constructed to utilize a code structure which reduces the time required to perform many of the computer operations. As described, this particular code structure permits single instructions to select three operands, for example, and also to identify the address of the next instruction. This technique permits the search for the next instruction to be carried out while the operations ordered by the present instruction are being executed. In this manner, the next instruction may be selected and introduced to the instruction register as the final operation of the present instruction is being carried out. The above routine reduces the dead time between the execution of successive instructions essentially to zero.

The code structure of the computer described in the preceding specification also increases the calculation capabilities of each instruction. For example, and as noted above, the increased calculating capabilities of the computer of the invention enables the computer to perform the complete vector magnitude resolution from a single instruction.

The invention provides, therefore, an improved general purpose electronic digital computer which is capable of performing relatively complex computations and calculations in an efficient, rapid and accurate manner. Moreover, the improved general purpose computer of the invention is capable of rapid speed, in that the time between the execution of successive instructions is reduced essentially to zero.

We claim:

1. In a digital computer, the combination of: memory means for storing a plurality of multi-bit binary operands at predetermined locations therein and multi-bit binary instructions at other predetermined locations therein, each of said instructions having a first portion indicating the location in said memory means of at least one corresponding operand and a second portion indicating the location in said memory means of the next instruction to be executed; first register means for storing the first portion of individual ones of said instructions; second register means for storing the second portion of individual ones of the instructions; an arithmetic unit; first scanning circuitry coupled to said first register means and to said memory means for searching said memory means for the operand designated by the first instruction portion in said first register means; second scanning circuitry coupled to said second register means and to said memory means for searching said memory means for the next instruction designated by the second instruction portion in said second register means; first logic circuitry coupled to said first and second scanning circuitry and to said arithmetic unit for introducing the selected operand to said arithmetic unit; second logic circuitry coupled to said second scanning circuitry and to said first and second register means for introducing the selected next instruction into said register means; and a control circuit coupled to said logic circuitry and to said scanning circuitry for causing said second scanning circuitry to search said memory means for said next instruction concurrently with the introduction of the selected operand to said arithmetic unit by said first logic circuitry.

2. In a digital computer, the combination of: memory means for storing a plurality of multi-bit binary operands at predetermined locations therein and multi-bit binary instructions at other predetermined locations therein, each of said instructions indicating the respective locations in said memory means of corresponding first and second operands; register means for storing individual ones of the instructions; an arithmetic unit; scanning circuitry coupled to said register means and to said memory means for scanning said memory means for the first and second operands designated by the instruction in said register means; logic circuitry coupled to said scanning circuitry and to said arithmetic unit for introducing the selected first and second operands to said arithmetic unit; and a control circuit coupled to said logic circuitry and to said scanning circuitry for causing said scanning circuitry to search said memory means for the second operand concurrently with the introduction of the selected first operand to said arithmetic unit by said logic circuitry.

3. In a digital computer, the combination of: memory means for storing a plurality of multi-bit binary operands at predetermined locations therein and multi-bit binary instructions at other predetermined locations therein, each of said instructions having a first portion indicating the respective locations in said memory means of corresponding first and second operands and each of said instructions having a second portion indicating the respective locations in said memory means of a third operand and of the next instruction to be executed; first register means for storing the first portion of individual ones of the instructions; second register means for storing the second portion of individual ones of the instructions; an arithmetic unit; first scanning circuitry coupled to said first register means and to said memory means for searching said memory means for the first and second operands designated by the first instruction portion in said first register means; second scanning circuitry coupled to said second register means and to said memory means for searching said memory means for the third operand and for the next instruction designated by the second instruction portion in said second register means; first logic circuitry coupled to said first and second scanning circuitry and to said arithmetic unit for introducing the selected first and second and third operands to said arithmetic unit; second logic circuitry coupled to said second scanning circuitry and to said first and second register means for introducing the selected next instruction into said first and second register means; and a control circuit coupled to said logic circuitry and to said scanning circuitry for causing said first scanning circuitry to search said memory means for the second operand concurrently with the introduction of the selected first operand to said arithmetic unit by said first logic circuitry.

4. The combination defined in claim 3 in which said control circuit also causes said second scanning circuitry to search said memory means for the third operand concurrently with the introduction of the selected second operand to said arithmetic unit by said first logic circuitry.

5. The combination defined in claim 3 in which said control circuit also causes said second scanning circuitry to search said memory means for said next instruction concurrently with the introduction of the selected third operand to said arithmetic unit by said first logic circuitry.

6. The combination defined in claim 3 in which said control circuit causes said first scanning circuitry to search said memory means for said first operand concurrently with the introduction of the selected next instruction to said first and second register means by said second logic circuitry.

References Cited by the Examiner

UNITED STATES PATENTS

| | | | |
|---|---|---|---|
| 2,799,449 | 7/1957 | Turing et al. | 340—172.5 |
| 2,901,166 | 8/1959 | Hamilton et al. | 235—157 |
| 2,978,679 | 4/1961 | Dieterich | 340—172.5 |
| 3,016,194 | 1/1962 | Bensky et al. | 235—157 |
| 3,024,993 | 3/1962 | Wright et al. | 340—172.5 |
| 3,030,019 | 4/1962 | Smith | 340—172.5 |
| 3,061,192 | 10/1962 | Terzian | 340—172.5 |
| 3,067,406 | 12/1962 | Southard | 340—172.5 |

ROBERT C. BAILEY, *Primary Examiner.*

WALTER W. BURNS, Jr., MALCOLM A. MORRISON, *Examiners.*